(12) United States Patent
Schwantes et al.

(10) Patent No.: US 7,722,940 B2
(45) Date of Patent: *May 25, 2010

(54) ADHESIVELY SECURABLE STOCK PACKAGING MATERIALS

(75) Inventors: Todd Arlin Schwantes, Lena, WI (US); Michael Curley Krzoska, Little Chute, WI (US); Gregory Stephen Kulibert, Oshkosh, WI (US); Adam Gregg Malofsky, Loveland, OH (US); Bernard Miles Malofsky, Bloomfield, CT (US); Nagib Maurice Ward, Appleton, WI (US)

(73) Assignee: Appleton Papers, Inc., Appleton, WI (US)

( * ) Notice: Subject to any disclaimer, the term of this patent is extended or adjusted under 35 U.S.C. 154(b) by 1070 days.

This patent is subject to a terminal disclaimer.

(21) Appl. No.: 11/364,736

(22) Filed: Feb. 28, 2006

(65) Prior Publication Data

US 2006/0228552 A1    Oct. 12, 2006

Related U.S. Application Data

(63) Continuation-in-part of application No. 11/216,516, filed on Aug. 31, 2005.

(60) Provisional application No. 60/665,134, filed on Mar. 25, 2005, provisional application No. 60/692,008, filed on Jun. 17, 2005.

(51) Int. Cl.
  *B32B 33/00* (2006.01)
  *B32B 5/16* (2006.01)
  *B01J 13/02* (2006.01)
  *B05D 1/12* (2006.01)

(52) U.S. Cl. .................... 428/40.2; 428/40.1; 428/98; 428/99; 264/4.7; 427/180

(58) Field of Classification Search .... 428/402–402.24, 428/411.1, 40.1, 98, 99; 264/4–4.7; 427/180
See application file for complete search history.

(56) References Cited

U.S. PATENT DOCUMENTS

| | | | |
|---|---|---|---|
| 2,506,056 A | 5/1950 | Bergstein | |
| 2,588,950 A * | 3/1952 | Willard | 229/306 |
| 2,907,682 A | 10/1959 | Eichel | |
| 3,386,350 A * | 6/1968 | Grodberg | 493/297 |
| 3,489,599 A | 1/1970 | Krieble | 117/132 |
| 3,826,756 A | 7/1974 | Bachmann et al. | 252/316 |
| 4,137,194 A | 1/1979 | McCune et al. | |
| 4,249,978 A | 2/1981 | Baker | 156/291 |
| 4,273,827 A | 6/1981 | Sweeney et al. | 428/307 |
| 4,325,985 A * | 4/1982 | Wallace | 427/520 |
| 4,362,566 A | 12/1982 | Hinterwaldner | 106/85 |
| 4,497,916 A | 2/1985 | Cooke et al. | 523/176 |
| 4,632,944 A | 12/1986 | Thompson | 522/11 |
| 4,867,817 A | 9/1989 | Kneafsey et al. | 156/73.1 |
| 4,886,579 A | 12/1989 | Clark et al. | 162/111 |
| 4,961,811 A | 10/1990 | Haugwitz | 156/344 |
| 5,397,812 A | 3/1995 | Usami et al. | 522/13 |
| 5,573,640 A * | 11/1996 | Frederick et al. | 162/146 |
| 5,794,409 A | 8/1998 | Akridge et al. | 53/460 |
| 6,084,010 A | 7/2000 | Baetzold et al. | 523/210 |
| 6,113,728 A | 9/2000 | Tsukagoshi et al. | |
| 6,126,872 A | 10/2000 | Kommareddi et al. | 264/4.1 |
| 6,375,872 B1 | 4/2002 | Chao | 264/4.33 |
| 6,407,225 B1 | 6/2002 | Mang et al. | |
| 6,436,547 B1 * | 8/2002 | Toft et al. | 428/474.4 |
| 6,451,927 B1 | 9/2002 | Haas et al. | 525/426 |
| 6,592,990 B2 | 7/2003 | Schwantes et al. | |
| 7,496,263 B2 * | 2/2009 | Xie et al. | 385/129 |
| 2002/0134499 A1 | 9/2002 | Wells et al. | 156/277 |
| 2002/0134500 A1 | 9/2002 | Wells et al. | 156/277 |
| 2004/0045666 A1 | 3/2004 | Gong et al. | 156/334 |
| 2004/0163754 A1 | 8/2004 | Nowicki et al. | 156/73.1 |
| 2004/0164134 A1 | 8/2004 | Gong et al. | 229/132 |
| 2004/0166257 A1 | 8/2004 | Pierce et al. | 428/34.1 |

FOREIGN PATENT DOCUMENTS

JP    09238821    7/1997

* cited by examiner

*Primary Examiner*—James Seidleck
*Assistant Examiner*—Saira Haider
(74) *Attorney, Agent, or Firm*—IP&L Solutions; Edward K. Welch

(57) ABSTRACT

Stock packaging materials for manual and/or high speed industrial automated package formation and/or filing and closing applications having a curable pre-applied adhesive compositions applied to one or more seams or closure surfaces wherein the curative for the pre-applied adhesive composition is contained within a carrier which prevents its premature release.

32 Claims, 2 Drawing Sheets

ADHESIVELY SECURABLE STOCK PACKAGING MATERIALS

This application is a Continuation-in-Part application of pending U.S. patent application Ser. No. 11/216,516, filed Aug. 31, 2005, entitled "Encapsulated Cure Systems", the contents of which are hereby incorporated by reference, and claims the benefit of the following U.S. Provisional applications Nos. 60/665,134 filed Mar. 25, 2005 and 60/692,008 filed Jun. 17, 2005, the contents of which are also hereby incorporated herein by reference.

BACKGROUND OF THE INVENTION

1. Field of the Invention

The present invention relates to stock packaging materials having a novel adhesive composition pre-applied to the bonding sections thereof and to methods of making such stock materials as well as forming packages from said stock materials, including the filling and closing of said packages.

2. Description of Related Art

Packaging comes in a nearly infinite variety of shapes, sizes and constructions. Though a number of materials are used to manufacture packaging, including glass, metals and metal foils, plastics and cellulosics, the vast majority of packaging is made from plastics and, more commonly, cellulosics, including hybrid materials of cellulosics and plastic materials either as blend or composite material or in laminate form. For more than a century, and particularly within the last half century, industry has sought and, to this day, continues to seek ways to improve packaging, its construction, design and functionality, as well as the methods and processes by which such packaging is formed and/or filled and closed. While much of this development effort has been focused on improving traditional packaging materials and processes, a large portion has also been directed towards the creation of new packaging with new and improved properties and characteristics for addressing three key objectives. The first is the creation of new packaging for old products, e.g. transitioning milk products from glass containers to cellulosic and plastic based containers. The second is the creation of packaging to accommodate new applications/uses for an old product, e.g., transitioning from traditional frozen food containers to ones that can be reheated in a conventional or microwave oven. Finally, the third is the creation of packaging for entirely new products, e.g., microwave popcorn.

The design and construction of a specific package, including its size, shape, type of material from which it is made, and process by which it is manufactured, etc., turns largely on the application to which the package is to be employed. For example, paperboard packaging for mailers like Express Mail, Priority Mail, FedEx and UPS envelopes will have entirely different performance and materials requirements than corrugated bulk containers, e.g., >10 ft³ cartons, intended for use in packaging plastic pellets, chemical additives and the like. Even within a given class of packaging materials, as with paperboard containers, those to be used for processed dry-good foods like cereals, baking mixes, and the like, will have markedly different materials, performance and manufacturing requirements from those to be used for prepared frozen foods that are to be reheated in their packaging in conventional and/or microwave ovens.

As noted, the compositional make-up and structural design of packaging materials will vary depending upon the particular application to which the packaging is to be applied, e.g., corrugated v. paperboard, laminated v. coated, etc.; however, perhaps one of the most critical elements of packaging design and construction is the selection of the adhesive to be employed in the construction and formation of the packaging. Packaging adhesives vary widely in chemistry, formulation, application, activation, properties, characteristics, performance and the like. Selection of the adhesive is critical to the particular end-use of the packaging and, most often, is determinative of the method and apparatus by which the packaging is to be formed. While certain adhesives are relegated to application during the packaging formation and closure operations, others must be pre-applied to the packaging materials for subsequent activation during the packaging formation and closure operations. Still others have the capability of being used in both process methods.

Although natural adhesives such as natural rubber latexes and colloidal suspensions of proteinaceous materials in water once played a large roll in packaging applications, these have been replaced almost entirely by synthetic adhesives. Even the traditional moisture activated adhesives on consumer envelope closure flaps are being replaced more and more with pressure sensitive adhesives. This shift is being driven by economics and, perhaps more importantly, the broad array of properties and characteristics that make synthetic adhesives better suited for use in a number of applications previously addressed by natural adhesives and suitable for applications that were previously unheard of for natural adhesives. One specific benefit of synthetic adhesives is the ability to custom formulate their composition so as to address the particular needs and performance requirements of the end use application to which it is to be applied: thus ensuring optimal performance.

The four key classes of adhesives employed in industrial packaging applications are solvent based adhesives, heat activated adhesives, hot melt adhesives and reactive adhesives. Each of these traditional classes of adhesives has versatility in use and application, yet each has their limitations and problems and all, in one way or another, create problems or difficulties and/or bottlenecks in high-speed industrial packaging formation and/or closure applications. Although new developments in processes and equipment have been able to address many of the problems associated with each particular adhesive, each such development has added additional costs as well as introduced new concerns and issues as set forth below.

Early on, solvent based adhesives represented some of the more widely used and preferred adhesive materials for packaging applications. These adhesive materials typically comprise either an elastomer or rubber-based material in an appropriate organic solvent or a colloidal suspension of a proteinaceous or other inherently tacky material in water. Of these, the organic solvent based adhesives provided faster bonding times due to their higher concentration of the adhesive material in the organic solvent carrier and the much more rapid rate of evaporation of the organic solvent carrier. In essence, solvent based adhesives typically manifest an immediate tack bond, even without complete evaporation of the solvent. However, given the overriding concerns relative to the use of organic solvents from an environmental, health and safety standpoint, as well as the concerns relative to the affect of such solvents on any printing, surface coatings, and the like of such packaging materials, solvent based adhesives have largely gone out of favor.

Though the aqueous based colloidal type adhesives do find some success in packaging applications; their use is limited and not relevant to high-speed, industrial applications. As mentioned, water is too slow to evaporate and will absorb into the packaging material where it may deleteriously affect the structure and/or strength of the packaging materials, especially those wholly or mostly comprised of cellulosic materials. Although the use of radiant heaters, which accelerate the rate of water evaporation, has addressed these disadvantages to some extent, such diffuse heating, particularly with the higher temperatures needed to speed evaporation, has increased the risk of adverse consequences to the packaging materials themselves, especially any coatings, printing, and the like that may have been applied to their surfaces, as well as to the operating components of the assembly apparatus in the immediate area of the radiant heaters.

As is apparent from the foregoing, typical solvent based adhesives are applied in-line and, with the exception of pressure sensitive-type adhesives, are incapable of being pre-applied. Although pressure sensitive adhesives may be pre-applied, they are impractical for industrial packaging formation due to the need to apply a release paper or like material over the pre-applied adhesive to prevent premature bonding. Thus, their use in packaging is essentially limited to use on the closure means of packaging, especially paperboard envelopes intended to be filled and sealed by the consumer: not in a high-speed industrial filling and closing process. Regardless, generally speaking, solvent based adhesives have limited utility and desirability due to their relatively poor adhesive performance and/or strength.

The class of packaging adhesives having the broadest array of chemistries and applications are those known as the heat activated adhesives. Heat activated adhesives belong to two distinct, yet very broad, subclasses of adhesive chemistry, namely thermoplastic and thermoset adhesives. Heat activated adhesives also have the greatest versatility in use as well as application and are capable, generally, of being applied in-line or pre-applied.

The subclass of thermoplastic adhesives embraces a broad spectrum of chemistries including polyethylene and ethylene copolymers, especially ethylene acrylic acid copolymers; polyvinylacetate and vinyl acetate copolymers, especially ethylene vinyl acetate copolymers and vinyl acetate acrylic acid copolymers; polyesters and sulphonated polyesters; and the like. Thermoplastic adhesives are typically applied in the form of a suspension or emulsion of discrete domains of the thermoplastic material in water, oftentimes as a colloidal suspension, although the pre-application of a film by extrusion/co-extrusion is also known. The thermoplastic adhesive may be applied in-line to the intended bond site of the packaging material just prior to or concurrent with the package formation step or, more commonly, pre-applied to the packaging material or blank for subsequent activation during the packaging formation. Pre-application of the thermoplastic adhesive may be to the whole or substantially the whole of the packaging surface or just to the intended bond site. With respect to the former, besides acting as the adhesive or bonding agent, these thermoplastic coatings and films also serve as barriers and protective coatings to the packaging materials and can be further used in providing decorative benefits to the packaging.

Activation of the thermoplastic adhesive is achieved by heating the thermoplastic material to a temperature at or above that at which the thermoplastic becomes tacky and/or melts, typically its glass transition temperature and/or melt temperature. Preferably, bonding is achieved by melting the thermoplastic material so that the liquid melt may wet and/or physically infiltrate the substrate surface(s) of the bond site. In the case of the thermoplastic adhesives applied as a suspension, the heat also drives off the water carrier. The bond itself is formed upon the cooling of the thermoplastic melt.

Although heat activated thermoplastic adhesives have achieved great success; they are not without their limitations. For example, they are not suitable for use in high temperature applications due to the fact that such high temperatures may soften, if not melt, the adhesive leading to a weaker bond or a failed bond altogether. Similarly, these thermoplastic adhesives are not suitable for use in applications where the packaging is to be subject to freezing conditions due to the fact that any trapped water will expand upon freezing, causing the bond to fail. Though this is less of a problem for pre-applied thermoplastic adhesives, for in-line applied adhesives short dwell times in the heat activation stage oftentimes is insufficient to allow for complete evaporation of the water carrier. While the selection of higher melt temperature adhesives and longer heating times may address the foregoing, these introduce new problems. For example, higher temperatures as well as longer dwell times will require longer cool down periods before the bond forms. Thus, the production line must be slowed down, extended to provide a longer dwell time in the cool down cycle and/or modified to introduce accelerated cooling means.

The other key subclass of heat activated adhesives, and one that overcomes many of the limitations and deficiencies of thermoplastic adhesives, is that of the thermoset adhesives. Like thermoplastic adhesives, thermoset adhesives embrace a broad array of chemistries including epoxy resins, novolak resins, polyvinyl butyral resins, acrylic resins, and thermosetting polyester resins. These materials have especially high temperature resistance, much higher than found with typical thermoplastic adhesives, and are particularly suited for use in high temperature packaging applications, especially in the packaging of prepared and frozen foods, most especially for those prepared and frozen foods to be reheated in their packaging in conventional and/or microwave ovens. Like thermoplastic adhesives, thermosetting adhesives can be pre-applied or applied in-line as a liquid; though use as a pre-applied is essentially limited to those thermoset chemistries that are solid and dry-to-the-touch at room temperature and soften/liquefy and then cure or set at higher temperatures. Perhaps the most common of the pre-applied thermoset adhesives are the thermoset polyester resins. These materials may be applied to the intended bond site or, like thermoplastic coatings, as a coating over the whole or substantially the whole of the packing surface, especially the inner surface where it provides excellent high temperature resistance for use in food packaging. In particular, these thermoset coatings provide excellent barrier properties to hot liquids, greases and the like and resist the high temperatures generated during filling, sealing and cooking operations.

While thermoset adhesives have a much higher temperature resistance than the thermoplastics, and, thus, much broader uses, they also have a markedly higher activation temperature, oftentimes two or more times that needed for the thermoplastic adhesives. Indeed, many thermoset adhesives require surface temperatures on the order of 225° C. to 550° C. in order to achieve a suitable bond. Such high temperatures create additional concerns relative to the heating apparatus, the affect of the higher temperatures on the packaging materials as well as the proximate components of the assembly apparatus. Additionally, while thermoplastic packaging adhesives raise concerns relative to the cool down time, thermoset adhesives have long cure or set times to be dealt with. As with the thermoplastic adhesives, longer cure or set times mean slower production speeds and/or more expensive and complicated equipment. Though there are those, such as Baker (U.S. Pat. No. 4,249,978), who apply a fine mist of a colloidal suspension of a thermoplastic adhesive over the thermoset film or coating so that a tack bond may be formed while the thermoset material sets up or cures, such a process introduces weaknesses in the bondline and reintroduces concerns relative to trapped water.

However, issues and concerns relative to the limitations and problems associated with a given heat activated packaging adhesive are not the only issues and concerns befalling packaging and packaging processes. Indeed, the activation of such adhesives, or more precisely the method and means of activation, introduces many additional and, perhaps, greater concerns.

Early on, activation of heat activated adhesives was dependent upon radiant heating, especially radiant heating generated by quartz lamps and RF induction. However, radiant heat had many limitations including the maximum temperatures attainable and the length of time needed to attain the activation temperature needed for the chosen adhesive. Additionally, the equipment was such that it was difficult, if not impossible, to localize the heat and, consequently, prevent adverse effects on the packaging materials themselves, particularly in areas away from the bond site, as well as on various elements of the assembly line that were also exposed to the radiant energy. For example, radiant heating also resulted in the melting of thermoplastic materials near, but removed from, the intended bond site. Similarly, components of the assembly or manufacturing apparatus within the field of the radiant heat would also heat up and, consequently, shorten their life or maintenance cycles. Furthermore, radiant heating was costly, consuming high levels of energy due to low heat generation and poor utilization efficiencies.

A major evolution in packaging technology, and one driven, at least in part, by the advent of and advances in thermoplastic and thermoset adhesives, was the transition from radiant heating to localized, directed heating through the use of hot air streams, most typically as applied through one or more or a series of directed nozzles. While these directed nozzles addressed many of the concerns with radiant heating, especially the temperatures attainable and the speed with which those temperatures could be attained, they failed, in whole or in part, to address other concerns such as the impact on the packaging and the elements of the assembly line. Indeed, because higher temperatures were now being generated, even more concern arose relative to charring or deleterious effects on the packaging, especially coatings and printing thereon, as well as of the handling equipment itself. Specifically, oftentimes these heater nozzles were fixed and, when the assembly line stopped or there was a gap between packaging components on the assembly line, high heat built up in the packaging or the components of the assembly line, especially the conveyor belts and associated mechanical components. With the former, charring and, possibly, fire could result. In the latter, the high temperatures shortened the life of the conveyor belts as well as degraded the lubricants in the equipment, thus shortening their life or the cycle time between repairs and maintenance. Although these issues could be addressed by turning off the heaters, such action resulted in longer delays between shut down and restart of the assembly line to enable the heater to reach its activation temperature.

Eventually, many of these concerns were partially addressed by the subsequent development of hot air heaters that retracted or moved away from the surface of the conveyor when there was a large gap between successive packaging materials or in the event the assembly line itself were stopped. Although such retraction means moved the hot air stream away from the packaging materials, it oftentimes redirected the stream of hot air to the conveyor belts and other components of the apparatus itself. Thus, while one problem was being addressed, another arose or, if pre-existing, was oftentimes exacerbated or more pronounced.

Nevertheless, additional advances were still being made to address these new concerns. One especially successful advance was the incorporation of cooling means into the apparatus in the same region as the heater nozzles to draw heat away from the packaging material and to cool the hot air streams as they passed from the adhesive materials to which they were directed. A second advance was the incorporation of shielding and/or exhaust means that redirected and/or captured, respectively, the hot air stream as it passed from the adhesive material so that it could not affect the apparatus or the packaging materials. Though each certainly aided in addressing the concern with the hot air streams, they did not completely address the matter. For that reason, Landrum et. al. (U.S. Pat. No. 5,562,795), among others, employed aspects of both cooling and exhaust to maximize relief from and minimize any deleterious effects of the hot air streams.

While the advances in packaging formation and closure technology and heat activated adhesive technology have synergistically paralleled one another; it is evident that each advancement brought with it new challenges and issues as well as the improvements and benefits thereof. Though the latest technologies have addressed many of the outstanding issues and concerns, they are not entirely alleviated. For example, while the dual adhesive systems of Baker ('978), as mentioned above, did a lot to address the bottleneck created by faster activation achieved with the hot air stream nozzles, their application introduced new issues. Specifically, although a majority of the fine mist will deposit where intended, there is always some percentage that wafts off, eventually depositing on other sections of the package or, worse, the equipment where it builds up over time to cause problems necessitating shut down for cleaning and/or repair.

Perhaps the greatest achievement of these advances in both adhesive chemistry and application/activation means was the concurrent and marked increase in line speeds, enabling greater output over a given time. Indeed, although individual developments have, on occasion, caused a retraction or loss of line speed, the overall trend has been a marked increase going from, for example, the 8.25 second per box production time so proudly touted by Gobalet in 1958 (U.S. Pat. No. 2,984, 598) to the 150 to 200 carton per minute production rate of Landrum et. al. in 1995 (U.S. Pat. No. 5,562,795). While these advances have found great success in providing more secure boxes faster, each successive generation and advancement has also added new complexity to the package formation and closing apparatus, more and expensive components that could be new problem areas, and additional spatial needs to accommodate ever-increasing assembly line apparatus to address bottlenecks: all of which have markedly increased the costs and commitment of capital resources to said packaging operations.

Furthermore, despite all the benefits and attributes of the advanced heat activated adhesives and their activation systems; they are not a panacea for the packaging industry. Although their high temperatures and thin film adhesives allow for quick activation with little heating of the underlying packaging, these thin films of adhesive, whether in a pre-applied state or as applied in-line, have essentially no profile or thickness and, therefore cannot accommodate gaps of any note resulting from surface variations in the packaging surfaces to be mated. Indeed, as seen in Heinz (U.S. Pat. No. 5,632,712), their use in closing packaging having shied flaps requires specialized closing apparatus in order to apply uniform pressure across the whole of the flap or bond site so as to accommodate the rise where the one flap overrides the end of the other. However, this specialized apparatus will not address surface variations in the flaps themselves. For example, the surface of corrugated cardboard oftentimes has a series of ridges and valleys corresponding to the underlying corrugation in the cardboard. While a thin film of thermoplastic or thermoset adhesive would allow for a contact bond at intersecting ridges, the thickness of the adhesive would most often be insufficient to span the gap between opposing valleys; thus, resulting in weak bonds. Efforts to increase the thickness of the adhesive film will only slow down line speed or necessitate longer heating sections of the assembly line in order to allow sufficient heating to ensure complete activation or melting of the thicker adhesive. The resultant longer residence time in the heating step will also markedly increase the likelihood that the surface of the packaging will itself be heated to an adverse temperature. Similarly, since more adhesive is present, the cooling period in the case of thermoplastic adhesives or the cure or set period in the case of thermoset adhesives will be longer which means that the residence time in the mating and bonding step will be lengthened as well. Thus, while certainly critical to the packaging industry, traditional heat activated thermoplastic and thermoset adhesives are not entirely without their shortcomings.

Finally, yet another subclass of heat activated, pre-applied thermoplastic adhesives are those known as reactivatable adhesives. Such adhesives are more clearly described in, for example, Gong et. al. (US 2003/0041963 A1; US 2004/0164134 A1; US 2004/0164135 A1 and US 2004/0166309 A1); Nowicki et. al. (US 2004/0163754 A1; US 2004/0163768 A1; and US 2004/0166238 A1) and Pierce et. al. (US 2004/0166257 A1), among others. In their simplest of embodiments these reactivatable adhesives are pre-applied thermoplastic materials, especially hot melt type materials as further described below, which are activated by an induced or internally or proximately generated heat. In essence these reactivatable adhesives are reactivated by exposing the same to sufficient energies, typically in the form of ultrasound, near infrared radiation (NIR) or electromagnetic energies, to melt the pre-applied material. Induction reactivation requires the presence of susceptors in or next to the adhesive material: thus, introducing new elements into the adhesive and/or the packaging construction. Although these adhesives and reactivation systems avoid the problems associated with hot air nozzles, the reactivation processes introduced a number of new problems, particularly health and safety problems, since one needs to protect the workers and apparatus from the deleterious effects of, e.g., ultrasound and NIR. Also, each of these adds new costs with respect to the ultrasound and NIR generating equipment and associated protective equipment needed.

Furthermore, reactivation processes appear to adversely impact the line speeds that may be realized and are limited with respect to the types of apparatus and package forming systems with which they may be used. For example, Nowicki et. al. (US 2004/0163768 A1) teaches that reactivation will take place within 10 seconds, preferably less than 5 seconds, most preferably less than 3 seconds, of its exposure to the reactivation energy and that a suitable bond will thereafter be formed upon compression for less than 30 seconds, more preferably less than 15 seconds. Even if one is able to achieve the preferred rates, these methods represent a tremendous loss in production rate, especially as compared to the 150-200 per minute carton production rate claimed by Landrum et. al. (U.S. Pat. No. 5,562,795), which uses hot air activation, as discussed above.

The third key class of packaging adhesives, and clearly, from a volume standpoint, the most successful of adhesive technologies in the packaging industry, is the hot melt adhesives. Though generally thermoplastic, hot melt adhesives are characterized as involving the in-line application of a bead of a melt of a thermoplastic adhesive material to the bondline prior to mating of the surfaces to be boned. Like other adhesives, the class of hot melt adhesive materials embrace a wide array of chemistries, e.g., polyethylene and ethylene copolymers, polyvinylacetates and vinylacetate copolymers, polyamides and the like, each having different performance and property profiles. Their versatility in performance as well as their relative ease of applicability has made them a favored choice in many packaging applications. For example, their relative viscous state combined with the ability to adjust the die of the nozzle head from which the hot melt material is exuded allows for controlled variation of the bead of adhesive dispensed, facilitating conformation to and accommodation of surface variations in the packaging materials, particularly gaps at the bond site, as well as various bond width and the like.

Despite all their attributes, the hot melt adhesives and packing methodologies employing the same are not without their problems, including relatively low heat resistance. Even though reactive hot melts will have improved high temperature performance, they still do not achieve the high heat resistance of many of the thermosetting materials, thus making them inappropriate for food packaging intended to be reheated in microwave or conventional ovens. Furthermore, the equipment needed for maintaining and dispensing the hot melt adhesive is expensive and not without its problems as well. For example, long residence times in the holding tank/ melt chamber may lead to degradation in performance of the hot melt adhesive and/or, in the case of reactive hot melts, premature cross-linking. Additionally, the dispenser nozzles have a tendency to clog, particularly as a result of the presence of solid particles such as dirt, debris and other contaminants that may be present in the hot melt or enter the tank or chamber in which the molten hot melt is held prior to dispensing. Such clogging may also occur as a result of temporary stoppages in the assembly/production line or in the event of large gaps between packages on a given line whereby dispensing is stopped for a sufficient period of time to allow the hot melt on the nozzle tip or die to cool. Clogging becomes of particular concern with reactive hot melts where one may have to shut down and clean out the whole hot melt dispenser apparatus before restarting. Regardless, any shut down of a high speed packaging and filling line, even one of relatively short duration and for such a seemingly innocuous process as a cereal box filling and closing operation, may cost hundreds of thousands of dollars in lost production revenue.

The use of hot melt adhesives also has a substantial capital cost in initially setting up such a production line which also necessitates a lengthy cool down section since hot melts are traditionally applied in thicker amounts than typical heat activated adhesives: thus necessitating longer cool down period for the bond to form. Additionally, hot melts and their dispensing equipment also present a number of concerns from a health and safety standpoint due to the large dispensing equipment involved, which is maintained at temperatures above the melt temperature of the hot melts. Workers attempting to clean the hot melt dispensing equipment or other proximate equipment during routine maintenance or in the event of a problem on the production line are exposed to the hot dispensers, as well as the molten hot melt. While the heaters could be turned off and allowed to cool, such an event would mean that the hot melt contained in the equipment will also cool down and, thus, start up of the production line will be further delayed in order to bring the hot melt back to dispensing temperature.

Notwithstanding the foregoing, perhaps one of the most persistent problems with the use of hot melts is the stringing of the hot melt adhesive after dispensing is stopped. These strings or drools of the hot melt fall on other areas of the packaging materials and, worse, the assembly line itself and its integrated equipment. While the former may lead to rejected parts, which can easily be identified and discarded, the latter may lead to line shut downs to allow for proper cleaning. Efforts have been put forth to address these issues, at least in part. For example, Baker (U.S. Pat. No. 3,511,138) employed a specialized advancing and retracting dispenser so that the string of adhesive falls back upon the previously applied adhesive as the dispenser is retracted. This, however, is not suited for a continuous, especially a high-speed continuous, assembly line operation.

The fourth class of packaging adhesives is that know as the reactive adhesives. These comprise one and two-part curable adhesive systems that cure under ambient conditions: though heat may accelerate their cure. Like the aforementioned classes of packaging adhesives, these too include a broad array of chemistries including, for example, acrylic esters, polyurethanes, phenol formaldehydes, cyanoacrylates, and the like. For the most part, reactive adhesives are applied in-line as "100% solids" liquid, i.e., they do not have a non-reactive liquid carrier or solvent like the solvent based adhesives; rather, the curable components are themselves liquid or are soluble in one or more of the co-reactive components of the adhesive. These adhesives typically are found in three forms, one part systems, multi part systems (most often two-part systems) and encapsulated systems.

Cure or setting of one-part reactive adhesive is often slow due to the fact that they rely upon an environmental condition to effectuate cure. For example, those that rely upon exposure to moisture require long open times before the surfaces to be bonded may be mated. Additionally, the fact that an adhesive wetted surface is open presents and opportunity for foreign matter to fall upon the adhesive wetted surfaces which foreign matter can interfere with the bond and/or result in a commercially unacceptable product. Adhesive systems that rely upon anaerobic conditions, while able to be mated immediately, cure very slowly due to residual oxygen inhibition. Besides their slow cure, these reactive adhesives tend to be of fairly low viscosity such that the adhesive material may run out of the bond interface or be absorbed and/or wicked into the packaging substrate. Consequently, there may be insufficient adhesive material at the bondline to effectuate a good bond.

Two-part adhesive systems are better suited for industrial applications as their cure speed is or can be made much faster. However, these adhesive systems require expensive and complex dispensing equipment that mixes the two parts immediately prior to or concurrent with dispensing of the same. Here, because viscosity builds once cure is initiated, run out and wicking is less of a problem; however, great concern arises in the event of a temporary stoppage of the production line, even for a few seconds, as cure of the adhesive composition will occur in the dispensing equipment. Unlike hot melts that can be readily removed by reheating the hot melt, these reactive adhesives are thermoset in nature and cleaning of the apparatus, if cleanable, is time consuming. Thus, the risks associated with such two-part dispensing systems make them in appropriate or undesirable for high speed industrial packaging applications.

In order to address many of the problems associated with the aforementioned reactive adhesives while retaining the faster cure speeds capable with such systems, the industry has employed pre-applied encapsulated adhesives, albeit to a very limited extent. Typically these encapsulated adhesives comprise a plurality of microcapsules containing liquid curable adhesive materials with at least one of the primary activators or curatives for effecting polymerization or cure being incorporated into different microcapsules or into the binder material which holds the microcapsules to the surface to which they are applied. Cure is initiated by fracturing the microcapsules so as to allow the reactive components to intermix and react. Fracturing is typically accomplished by first mating the two surfaces to be bonded, one of which has the encapsulated adhesive pre-applied to its mating surface, and then subjecting the area of the intended bond to compressive forces, such as by passing the mated surfaces through one or more pinch rollers or under a stationary blade or by manually scraping the mated bondline area with, e.g., a coin edge, a razor or straight edge, etc. The compressive forces fracture the microcapsules, thereby releasing and/or enabling the intermixing of the curative with the remainder of the reactive components, and create a flow of the liquid components whereby the components of the liquid curable adhesive composition are intermixed with the curative and cure, and thus bonding, is effectuated.

Although encapsulated adhesives have found great success in the assembly of machinery and the like, especially as thread locking materials, they have found very little and very limited use in packaging. Essentially, their use has been limited to paper bonding applications, especially in the production and/or closure of paper envelopes for letters, junk mail and the like, as shown in Akridge et. al. (U.S. Pat. No. 5,794, 409) and Haugwitz (U.S. Pat. No. 4,961,811). Even here, their use is limited and not optimal despite their traditionally strong bond due to a number of factors including the low viscosity of the liquid curable components combined with the porosity of typical packaging materials. As noted above, wicking of the liquid curable components into the packaging substrate leaves very little curable material in the bond gap or interface to create the bond. This is not such a problem with the thinner paper and very planar surfaces found with envelopes where the liquid materials often saturate the surface layer of the paper, which saturation provides sufficient adhesive material to effectuate the bond. However, a different result is found with thicker packaging materials, such as paperboard and especially cardboard, where the liquids often absorb or wick deep into the subsurface, leaving little liquid curable material at the interface, and certainly an insufficient amount to address surface irregularities often found with these materials.

Another factor limiting the use of encapsulated adhesive in packaging applications, other than paper envelopes, is the inability to provide sufficient compressive forces to ensure good microcapsule fracture. Most packaging materials tend to have good absorption of compressive forces. This is especially true for thicker paperboard and corrugated cardboard. The absorption or cushioning of the compressive forces leads to poor and/or insufficient fracturing of the microcapsules; thus, reducing the amount of liquid curable materials released at the bond interface to cure. Although higher compressive forces could be used to increase microcapsule fracture and flow characteristics, such forces will likely have an adverse effect, especially disfigurement, on the surface appearance of the packaging.

Notwithstanding the foregoing, perhaps one of the most telling of limitations for the use of encapsulated adhesives in packaging is the inability to even apply compressive forces to the mated surfaces due to package design and construction.

Other than envelopes, as mentioned above, unless the packaging has flanges or is tube-like, both of which support crimping, there is little opportunity to provide the requisite support or back pressure to the underlying surface to ensure sufficient compression at the bondline. For example, if one were endeavoring to bond opposing top flaps to a cereal box using an encapsulated adhesive, compressive forces needed to fracture the encapsulated adhesive would like lead to the collapse of the box, with both flaps being pushed into the interior of the box, absent a backstop or counter force. Furthermore, because of the fragility of the microcapsules, especially in order to ensure the presence of sufficient liquid curable material to create the bond, concern also arises with respect to the premature and/or unintended fracturing of the microcapsules due to rough handling, stacking, processing and the like, especially as may be found in high volume, high speed industrial applications. Thus, while traditional encapsulated adhesives and their method of activation would appear, in retrospect, to offer a solution to many of the issues found with traditional packaging adhesives, they too have their limitations and appear inappropriate for use with other than thin paper packaging such as envelopes.

While each of the aforementioned prior art adhesive systems and their respective methods of application and activation, if appropriate, have found their niches in the packaging industry, none may be considered as or be considered to approach that of a universal adhesive system for the packaging industry. Those of the prior art systems that seem to offer the broadest performance characteristics and versatility, especially the heat activated systems and the hot melts, have one common element, each requires heat, especially high heat, to apply and/or activate/reactivate the adhesive composition. As noted, the use of heat, though necessary, has a number of adverse or potentially adverse consequences from a health and safety standpoint, particularly with respect to potential exposure of line workers to the heat generating means, the hot air streams, etc. during normal operation as well as in addressing potential problems in those areas of the assembly and filling lines where they are employed. Additionally, such high temperatures, especially if the heat is misdirected, may adversely affect the packaging materials themselves as well as the package forming and closing apparatus. The former is especially of concern with respect to any coatings, especially varnishes, and print or graphics that may be applied to the surfaces thereof, as well as the packaging substrate itself, especially in the case of an assembly line stoppage which may lead to charring and burning. The latter is of concern where there are large gaps between packaging blanks on the assembly line or in the event of an assembly line stoppage. Consequently, in addition to the high energy costs associated with merely generating the heat as well as the costly heat generation equipment itself, additional expense is incurred in installing appropriate safety equipment for shielding the equipment and personnel, for dissipating and/or exhausting the heat, and/or for added maintenance on the apparatus, as appropriate.

Thus, there exists a need in the packaging industry for an adhesive system that, if not universally applicable, is applicable to a broad spectrum of packaging substrates, designs and applications. In following, there exists a need in the packaging industry for such an adhesive system that does not require heat for activation/reactivation or application but which is fast curing and is capable of forming a bond within fractions of a second. Furthermore, there exists a need in the industry for an adhesive system that can be pre-applied to packaging stock materials and blanks, thereby removing the adhesive application from the forming, filling and closing operations.

In following with the foregoing, there exists a need for packaging stock materials, including packaging blanks, having pre-applied to the bonding surfaces thereof an adhesive system that addresses the aforementioned needs.

There also exists a need for such packaging stock materials wherein the pre-applied adhesive material is such that it is not susceptible to premature activation or release upon exposure to high temperatures or moderate forces experienced in the work, storage or transport environment, including as a result of stacking or rough handling associated with high speed industrial packaging formation and filling operations.

In addition, there is a need in the packaging industry and the packaging industry would be greatly benefited from a package forming and/or closing process which avoids the need for the application of an adhesive, particularly liquid or molten adhesives, and relies instead on the use of packaging stock materials having pre-applied thereto a dry to the touch, fast curing adhesive material.

Further, the packaging industry would be much benefited from packaging stock materials having a pre-applied adhesive thereon which adhesive does not require the use of heat, whether by direct application of heat or indirect or induced, as with radiation (especially NIR) or ultrasonic energy, to activate or reactivate the pre-applied adhesive material. In following, it would be desirable to have a high speed industrial package formation, filling and closing process which does not suffer bottlenecks as a result of open times, cure time or cool down times needed to effectuate a proper cure and/or achieve a suitable tack bond with the packaging adhesive.

Further, there is a need in the packaging industry for a package forming, filling and closing process wherein the bonding steps for the package formation and/or closing are near instantaneous, if not instantaneous, at room temperature.

In addition, the packaging industry is in need of and would be greatly benefited by a packaging formation, filling and/or closing apparatus which is simplified and avoids the need for specialized equipment for generating and applying heat to heat activated/reactivated adhesives or for applying a molten hot melt adhesive, which eliminates the need for protective equipment and apparatus for protecting the assembly line, the operators thereof as well as the packaging materials themselves, and which allows for instantaneous or near instantaneous bonding without need for heat up and cool down cycles, the latter of which especially adds to the length of the assembly line and complexity of the packaging apparatus.

Finally, it would be especially desirable and the packaging industry would be especially benefited from a packaging forming and/or closure apparatus which addresses the many problems and shortcoming associated with current packaging adhesives and associated packaging formation apparatus and does so in a way that is no more expensive and/or capital intensive than traditional methods and does not adversely affect the through put speed of such a process. In particular there is a need in the packaging industry for a packaging process which is less expense and/or capital intensive; faster with less risk of bottlenecks, line stoppages, etc., and more versatile in terms of applications, substrates, formation and closure processes and the like.

Accordingly, it is a primary objective of the present invention to provide packaging stock materials, including blanks, that have a pre-applied adhesive which adhesive and stock materials overcome or significantly address all or most all of the aforementioned problems and concerns associated with the prior art packaging adhesives, stock materials and processes. It is also a primary objective of the present invention to provide a packaging formation, filling and/or closing process which employs such packaging stock materials and which overcomes many of the problems associated with the prior art processes. It is also an object of the present invention to provide a packaging forming apparatus which does not require the use of heat, direct or induced, for curing and/or activating an adhesive in the package formation and closing operations and, if heat is employed, such heating is merely ancillary to the cure or polymerization process and of relatively low temperature and limited duration. Finally, it is an object of the present invention to provide a packaging forming apparatus which eliminates the complicated and oftentimes lengthy equipment associated with current packaging apparatus.

SUMMARY OF THE INVENTION

According to the present invention there are provided stock packaging materials having a dry-to-the-touch, pre-applied adhesive composition on at least one bonding surface thereof wherein said pre-applied adhesive composition comprises an encapsulated liquid curable or polymerizable component and a separately encapsulated curative complex, said curative complex comprising at least one curative capable of effecting, directly or indirectly, the cure or polymerization of the aforementioned liquid curable or polymerizable component and being substantially non-flowing in the absence of external forces or conditions impacting upon said curative complex. More specifically, the present invention relates to stock packaging materials wherein said encapsulated liquid curable or polymerizable component comprises a liquid curable monomer, oligomer and/or prepolymer and said encapsulated curative complex comprises the aforementioned curative contained in a carrier material, the physical properties of which account for the substantially non-flowing characteristic of the curative complex. The carrier is typically a natural or synthetic material or composition that is (a) soft, putty-like or gel-like in character or (b) a solid or semi-solid that is (i) soluble in or is softened by a liquid curable matrix component of the curable composition with which they are to be used, (ii) softened by the reaction and/or environmental conditions under which the curable composition is cured or polymerized or (iii) is softened by the method or process by which the curative is to be made available to the curable, polymerizable or cross-linkable component of said adhesive or sealant. In the most preferred embodiments, heat, radiation and/or ultrasound is not necessary for softening the carrier complex; although if present, such environmental factors may enhance or speed up the softening process and/or lend other beneficial attributes to the overall bonding process.

The curative or curatives, if more than one is present in the carrier, may be any of a number of materials known for effectuating, directly or indirectly, the cure or polymerization of the curable component(s). These curatives may be liquid, solid or semi-solid materials that are dispersed as a discrete phase in the carrier or are wholly or partly soluble in or miscible with the carrier. Alternatively, the curative may be combined with one or more of the precursor or starting materials from which the carrier is formed in which case it is incorporated into the carrier concurrent with the formation thereof. The present invention is applicable to any type of curable or polymerizable adhesive or sealant composition that is capable of being encapsulated, including traditional one-part as well as two-or more part liquid curable compositions.

The present invention is applicable to most any type of stock packaging material provided that the surface to which the adhesive is pre-applied is capable of being acted upon by an activator means which is capable of generating and impacting upon the pre-applied adhesive sufficient shear forces to not only fracture the microcapsules but also provide adequate shear and kneading or mixing of the carrier to expose the therein contained curative to the remainder of the curable or polymerizable composition to effectuate cure or polymerization thereof. The stock materials may be in the form of bulk rolls, sheets, packaging blanks and the like In one embodiment of the present invention, the stock materials are paper, paperboard, cardboard and other cellulose-based stock materials used in the construction of packaging and containers including cartons, boxes, cases, trays, bags, envelopes, mailers, tubes, cups, and the like. Alternatively, the stock packaging materials may be comprised of various polymer compositions, especially thermoplastic polymer compositions such as those based on polypropylene, polyethylene (including low density, high density and linear low density polyethylenes), styrene, PET, etc. in film, sheet and/or fiber form, provided that the encapsulated adhesive composition is one that is capable of forming strong adhesive bonds with the substrate material. In these situations, it may be necessary to pre-treat the surface upon which the pre-applied adhesive is applied and/or the mating surface with an appropriate primers and/or pretreatments.

The present invention is also directed to the use of said stock packaging materials in the manufacture and/or assembly of various packaging materials, including semi-finished stock packaging, as well as the method of package formation and/or closure using said stock packaging materials, including the semi-finished stock packaging, wherein the stock packaging materials have an adhesive of the type mentioned above pre-applied to at least one of two opposing surfaces to be mated in the course of the package formation and/or closure process. The present invention is especially directed to the use of such stock packaging materials in industrial high-speed packaging formation and/or closing processes, especially industrial high-speed packaging formation, filling and closing processes, as well as the packaging formation and/or closing methods themselves. Such processes and methods may be discontinuous in nature, i.e., where the assembly line stops and goes at one or more steps of the forming, filling and or closure operations. Alternatively, and advantageously, they are especially adapted for use in continuous-type processes where there is no pause or delay in the progression of the packaging material during the formation, filling and/or closure operations. Yet a further alternative is a process that has elements that are both continuous and others that are discontinuous. An especially preferred process for the use of the stock materials of the present invention is in food packaging operations where the container or packaging for the foodstuff is formed, filled and closed or sealed in a single, continuous in-line operation. These operations may further include the step of inserting an inner packaging or bag into the basic box which bag may be pre-filled and sealed prior to insertion into the box or filled and sealed after insertion into the box, but prior to closure of the box.

DETAILED DESCRIPTION

Figure 1:
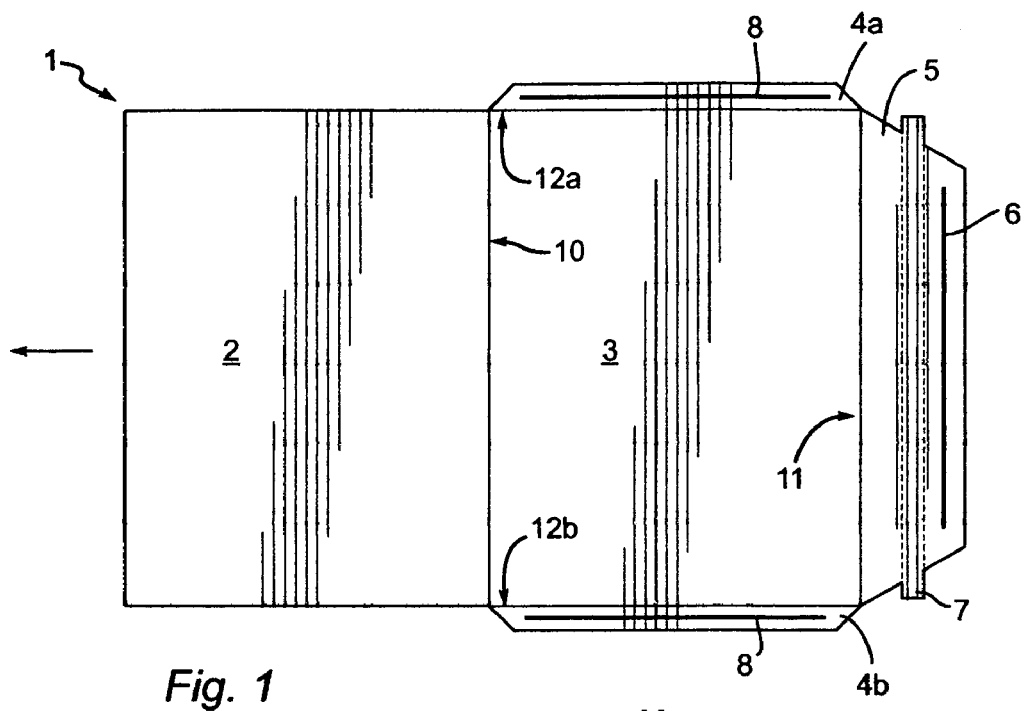
FIG. 1 is a plan view of a mailer blank.

Generally speaking, the present invention is directed to stock packaging materials having a dry-to-the-touch, encapsulated liquid curable or polymerizable adhesive or sealant composition pre-applied to at least one bonding surface thereof, or at least a portion of said bonding surface or surfaces, wherein the pre-applied adhesive or sealant composition comprises at least two different types of microcapsules, one of which is an encapsulated liquid curable or polymerizable component and the other an encapsulated curative complex comprising a curative for effecting, directly or indirectly, cure of the liquid curable or polymerizable component and a carrier material containing said curative wherein said carrier material is non-flowing, or substantially non-flowing, in the absence of external physical and/or environmental forces or conditions.

As used herein the terms "stock packaging material" and "stock packaging materials" are meant to include bulk materials, packaging blanks and semi-finished packaging that are stored or capable of being stored prior to use, most notably filling and closure. Stock packaging materials are typically in the form of bulk rolls, sheets, and blanks and are employed in making packaging or containers of various types and configurations including cartons, boxes, cases, trays, bags, envelopes, mailers, tubes, cups, and the like. Bulk rolls include rolls of broad sheet from which the packaging is stamped or cut during the forming step or rolls of strip material which is wound on a mandrel or the like to form the packaging material, e.g., tubes. In this latter case, the packaging material to be formed may not be an outer package, e.g., a hollow mailing tube, but could just as easily be core tubes used to wind e.g., toilet paper, paper towels, etc. Similarly, the sheets of packaging stock materials may be individual sheets from which a single or a portion of a single package is stamped or cut or it may be large enough that multiple packages, or portions thereof, are cut from a single sheet. Packaging blanks are typically pre-cut stock material which only needs to be formed/shaped and glued to the form the finished packaging.

Stock packaging materials in accordance with the teaching of the present invention also include semi-finished packaging materials, i.e., those that have been partially formed or manufactured, but whose manufacture and/or formation is not complete. In a preferred respect, the semi-finished packaging materials are precursors to the finished packaging where certain bonds have already been made but due to scoring, folds and the like, the same are able to lie flat or, if not capable of lying flat, preferably have contoured shapes that allow them to be stacked one inside the other much in the same way that pie tins stack one inside the other, for ease of storage. Semi-finished packaging materials also refers to packaging materials that are fully assembled or formed except that the portion or portions thereof forming the closure member of the packaging is not yet sealed so as to allow for filling before sealing.

A number of natural and/or synthetic or man-made materials may be used in manufacturing the stock packaging materials. Perhaps the most pertinent of packaging materials to the present invention are those which are comprised of or are based upon cellulosic materials including paper, paperboard, corrugated paperboard, chipboard, boxboard, cardboard, paperboard laminates (including laminates with synthetic materials), multi-ply paperboard and the like, as well as chemically modified cellulosics, especially fibers thereof, such as rayon and cellulose acetate. Alternatively, suitable packaging materials may comprise any number of synthetic materials, especially thermoplastic materials, such as polyesters, polypropylenes, polyethylenes (including low density, high density and linear low density polyethylenes), styrene, and polyamides (particularly nylons), and the like, especially in the form of non-woven fabrics or sheets of synthetic fibers of the foregoing, such as those based on Tyvek® polyethylene. Most preferably the present invention is directed to those stock materials comprised of or based upon cellulosic and/or the chemically modified cellulosic materials.

Depending upon the application to which the packaging material is to be applied, the stock materials may have one or more layers of a coating material, especially a thermoplastic material, on at least one or both of their major surfaces and/or may comprise a laminate or composite structure of the base stock material and a thermoplastic polymer film or sheet and/or a foil, particularly metal foils such as aluminum foils. Thermoplastics from which the coatings, films and/or sheets are formed include polyethylene, polypropylene, Mylar, polyvinylidene chloride, ethylene vinyl acetate, waxes, and the like. Alternatively, or in addition to the foregoing, the stock materials may also have applied to one or both surfaces other coatings such as thermoset coatings, varnishes, clays, and the like. The use of coatings and/or films is especially common with paperboard stock, one form of which is oftentimes referred to as paperboard laminates due to the presence of such other layers, especially cast or bonded polymer films. All of such materials, coatings and the like are well known to those skilled in the art.

Typically the raw, stock packaging materials are flat or have planar or substantially planar surfaces that are easily acted upon by an appropriate activator means for effectuating activation of the pre-applied adhesive material, as discussed further below. This construction allows for ease of activation and is especially suited for use in continuous high-speed packaging operations, including such operations used to produce the semi-finished stock packaging materials. Here, for instance, a stationary activator means may be employed which merely activates the adhesive as the stock packaging material traverses through the activation station.

On the other hand, semi-finished stock materials may or may not be planar in shape. In those instances, it is important that the surface upon which the pre-applied adhesive material is present be planar or substantially planar and its orientation be such that the pre-applied adhesive is capable of being acted upon in such a manner that sufficient high shear and/or mixing forces are impacted upon the adhesive material to activate the novel adhesive systems during assembly or immediately prior thereto. Preferably, the pre-applied adhesive will be on a surface, flap or flange of the stock packaging material that is planar or substantially so and is unobstructed, i.e., is oriented such that it is capable of being activated upon by a stationary activator means as the stock packaging material traverses through the activation work station, especially on a continuous assembly line.

Although the present invention is especially suited for stock packaging materials having the aforementioned configurations, it is also applicable to those stock packaging materials, especially semi-finished stock packaging materials, wherein the surface upon which the pre-applied adhesive lies is obstructed, i.e., the stock packaging material is unable to pass a stationary activator means without the means interfering with some structure or component of the packaging material. In these instances, the apparatus to be employed would have an activator means attached to a robotic arm or assembly that places the activation means at the site of activation and then retracts the same following activation. Absent the use of complex and expensive machinery and apparatus, this process would likely require a pause in the advancement of the assembly line, or at least in the activation station, to allow the robotic arm to extend and retract for each piece of stock material as it traverses through the activation station of the assembly line. Unless there were multiple activation stations with staggered activation operations, essentially operating in parallel, each of which delivers the activated stock material to the assembly line, this would result in slower through put that a fully continuous system.

As noted above, the surfaces upon which the pre-applied adhesive is applied is planar or substantially planar. By use of the term "substantially planar" we are referring to surfaces that are truly planar as well as those having minor imperfections or variations in the surface or which have an intentional surface texture, e.g., a rugose or etched surface. Because the activated adhesive and sealant compositions employed in the practice of the present invention have higher, preferably substantially higher, viscosities than found with traditional liquid curable pre-applied adhesives and sealants following their activation, concern for the adhesive or sealant wicking into or being absorbed by the packaging material or leaking out of gaps or into crevices or voids caused by ridges, peaks, undulations, and/or other surface imperfections on the bond surface or failing to fill the gap or void between opposing surfaces at the bond interface is less of a concern. Thus, the adhesives and sealants of the present invention are able to accommodate the rough or undulating surfaces often seen with cardboard packaging. In using the term "substantially planar" we also are intending to refer to surfaces that have an intentional surface texture, e.g., a rugose or etched surface, as well as the aforementioned surface imperfections and the like.

Generally speaking, the adhesives and sealants of the present invention are such that surface imperfections or variations having gaps or voids on the order of up to 2 mm, preferably no more than about 1 mm, more preferably no more than about 0.5 mm, and most preferably no more than about 0.26 mm exist may between the opposing faces of the bond surfaces once they are mated. Thus, because the critical factor is the gap or void, it is allowed that substantially planar surfaces whose overall contour is non-planar, e.g., tubes, oval or round packaging, etc., may be employed so long as the surface to which it is to be mated has a corresponding contour or surface characteristic.

The pre-applied adhesives and sealants to be employed in the practice of the present invention vary widely and, essentially, include any of the known liquid curable adhesive or sealant compositions provided that the same are capable of being microencapsulated. Certainly, to the extent such compositions have previously been employed in forming encapsulated adhesives or sealants, they can be adapted for use in the practice of the present invention. However, even liquid curable adhesive and sealant compositions not traditionally used in an encapsulated system may also be adapted for use in the practice of the present invention. For example, adhesive and sealant compositions that involve constituents, additives, curatives or the like that resulted in undesired interactions with or incompatibility with the encapsulating materials or process may, in many instances, now be used with little, if any, adverse consequence. Here the carrier serves to isolate the one from the other and whatever amount of material that may be exposed at the carrier surface is unlikely to be sufficient to adversely disrupt or affect encapsulation.

Similarly, traditional one-part liquid adhesive and sealant compositions may be readily adapted to the preparation of a two-part pre-applied encapsulated composition in accordance with the teaching of the present invention. For example, one-part liquid adhesive and sealant compositions that cure or polymerize upon exposure to heat, light, the absence or oxygen or the like may now be used in a pre-applied application by isolating at least one of the critical curatives from the remainder of the composition. This isolation of the curative from the remainder of the composition means that even if an incidental exposure of the stock material with the encapsulated adhesive or sealant pre-applied thereto to conditions which would otherwise initiate or effectuate cure or polymerization of the one-part adhesive or sealant composition were to occur, no curing or polymerization would take place.

As is evident, the practice of the present invention is applicable to a broad array of adhesive and sealant compositions. Exemplary of the adhesive and sealant compositions suitable for use in the practice of the present invention are those described in pending U.S. patent application Ser. Nos. 11/216,516 60/606,720, of Schwantes et. al., filed on Aug. 31, 2005 and claiming priority from U.S. Provisional Application Nos. 60/606,720 filed Sep. 1, 2004; 60/665,134 filed Mar. 25, 2005 and 60/692,008 filed Jun. 17, 2005, all of which are incorporated herein by reference.

Selection of the specific adhesive or sealant composition to be used with any given stock packaging material depends upon a number of factors including, but not limited to, (a) the stock packaging material itself and its end-use application, (b) the mechanism by which the adhesive or sealant is to be cured or polymerized and the compatibility of the same with the activation means, assembly process in which they are to be employed, and the like, (c) the process or method by which the curative is to be made available to the remainder of the curable composition, (d) the selection of the carrier and the compatibility of the same with the curative, the remainder of the curable compositions, the activation method, etc. Those skilled in the adhesive and sealant art will readily recognize other factors to consider in selecting the appropriate curable composition for the intended application.

For convenience, unless otherwise stated or as is obvious from the context in which it is employed, as used herein and the appended claims, the terms "curable composition" and "curable compositions" shall mean all such curable, polymerizable and/or cross-linkable liquid adhesive and sealant compositions. In the same light, unless the context of the text or claim makes clear that the specified term is being employed in its traditional meaning, the terms "cure", "polymerize" and "cross-link" shall be used interchangeably in this specification and in the appended claims. Similarly, unless otherwise stated or as is obvious from the context in which it is employed, as used herein and the appended claims, the terms "curative", "curatives", "cure agent" and "cure agents" shall refer generally to those classes of materials, additives, co-constituents, etc. which are critical to initiate, effectuate and/or perpetuate, directly or indirectly, the cure, polymerization or cross-linking of the liquid curable monomers, oligomers, prepolymers and/or low molecular weight polymers of the curable composition.

One class of curing agents suitable for use in the compositions employed in the practice of the present invention includes those involved with the cross-linking of polymer and pre-polymer materials including cross-linkers, curatives and hardeners as well as agents used in conjunction therewith for initiating, accelerating, catalyzing, etc. the cross-linking or hardening of the polymer and pre-polymer materials. Another class of curing agents include those involved with the polymerization of one or more polymerizable monomers, oligomers, prepolymers and/or low molecular weight polymers including, for example, activators, co-activators, accelerators, co-accelerators, catalysts, co-catalysts, initiators and co-initiators; especially those involved with free-radical polymerization. In each instance, it is understood that such curing agents may or may not directly initiate or effectuate cure or polymerization; however, no or essentially no cure will occur in the absence thereof (at least from a commercially viable standpoint). For example, a curing agent may undergo a chemical reaction that affects another curing agent which then directly initiates or effectuates cure or polymerization. Specific examples of the various curatives are disclosed in more detail below in relation to the discussion on the various adhesive and sealant systems with which they are employed.

As stated above, the curable compositions employed in the practice of the present invention vary widely. Among the various classes of curable compositions suitable for use within the practice of the present invention are, for example, those that undergo vinyl polymerization, i.e., those having at least one vinyl group CH2=CHX— and/or reactive unsaturation (i.e., —C=C—); unsaturated polyesters; urethanes; epoxy resins; polysulfides; isocyanates; silicones; polyethers, polyurethanes and polyolefins having silanol moieties capable of undergoing silanol condensation or hydrosilation reactions; and phenoxy resins. The present invention is also applicable to combinations of curable compositions within the same or different classes, regardless of whether they cure by the same or a different mechanism. With the latter, the curative for each curable composition may be in the same or a different encapsulated carrier component. Alternatively, especially where the cure mechanism for one of the curable compositions is a longer term, secondary type cure mechanism, the curative for that curable composition may be encapsulated with the curable component for the other curable composition. Additionally, the curable compositions of the present invention may be capable of bi-modal cure or polymerization, i.e., they are able to cure or polymerize through two different cure mechanisms. For example, it may be especially desirable to have a curable composition that forms linear polymer chains by one mechanism and cross-links by another. Furthermore, such compositions may include a copolymerizable component and/or a secondary polymerizable component that co-polymerizes or co-reacts with the primary component or with secondary reactive sites on the primary polymer, respectively.

The curable compositions are based on low molecular weight, reactive monomers, oligomers, pre-polymers and/or polymers that can be cured or polymerized. Pre-polymer formulations typically include additional co-polymerizable monomers and/or oligomers and are essentially a pre-adhesive and/or pre-sealant. While the present invention is certainly, and in certain applications preferably, applicable to step growth polymerizable compositions, the requirement for proper stoichiometry of the primary polymerizable component and the hardener or co-reactive component makes these curable compositions more difficult to use. Furthermore, depending upon the molecular size of the hardener or co-reactive component, such compositions may require a much larger weight percent of the carrier particles than addition polymerizable compositions where the curatives tend to be low or lower molecular weight materials. Thus, the present invention is especially applicable to addition polymerizable compositions.

Preferred addition polymerizable curable compositions are those that undergo vinyl addition, including those based on styrene and substituted styrenes such as alpha-methyl styrene; acrylamides; nitriles such as cyanoacrylates and methacrylonitriles; vinyl ketones such as ethyl vinyl ketone; vinyl esters such as vinyl acetate and vinyl proprionate; olefins such as ethylene, propylene and isobutylene; halogenated olefins such as vinyl chloride and vinylidene chloride; and diene monomers such as butadiene, isoprene and chloroprene as well as copolymers of the foregoing such as vinyl chloride-vinyl acetate copolymer. Oftentimes it is desirable that such components be used in their oligomeric form, wherein the oligomer has residual unsaturation or another reactive moiety or functional group, for example, hydroxyl, amino, carboxylic, epoxy and the like groups, which enables further polymerization or cross-linking. For instance, an amine functionalized polystyrene oligomer may be employed whereby initial cure or polymerization occurs at the point of unsaturation concurrent with or followed by cross-linking at the amine functionality with, for example, an isocyanate.

Especially preferred additional polymerizable components are the poly- and mono-functional acrylate and methacrylate esters, i.e., monomers, oligomers and prepolymers having one or more acryloyl (i.e., $CH_2=C(R)COO$—) and/or methacryloyl (i.e., $CH_2=C(CH_3)COO$—) terminal or pendent moieties. For convenience, as used herein and in the appended claims, reference to the term "(meth)acrylate" is to be understood as referring to both the acrylate and the methacrylate versions of the specified monomer, oligomer and/or prepolymer, (for example "allyl (meth)acrylate" indicates that both allyl methacrylate and allyl acrylate are possible). Such materials encompass a broad spectrum of polymerizable components including, for example, polyester poly(meth)acrylates, urethane and polyurethane poly(meth)acrylates (especially those prepared by the reaction of an hydroxyalkyl (meth)acrylate with a polyisocyanate or a urethane polyisocyanate), methylcyanoacrylate, ethylcyanoacrylate, diethyleneglycol di(meth)acrylate, trimethylolpropane tri(meth)acrylate, ethylene glycol di(meth)acrylate, allyl (meth)acrylate, glycidyl (meth)acrylate, (meth)acrylate functional silicones, di-, tri- and tetraethylene glycol di(meth)acrylate, dipropylene glycol di(meth)acrylate, polyethylene glycol di(meth)acrylate, di(pentamethylene glycol) di(meth)acrylate, ethylene di(meth)acrylate, neopentyl glycol di(meth)acrylate, trimethylol propane tri(meth)acrylate, ethoxylated bisphenol A di(meth)acrylates, bisphenol A di(meth)acrylates, diglycerol di(meth)acrylate, tetraethylene glycol dichloroacrylate, 1,3-butanediol di(meth)acrylate, neopentyl di(meth)acrylate, trimethylolpropane tri(meth)acrylate, polyethylene glycol di(meth)acrylate and dipropylene glycol di(meth)acrylate. While di- and polyacrylates and methacrylates, especially the dimethacrylates, are the generally preferred materials. Mono-functional acrylates, i.e., those containing only one acrylate group, may also be advantageously used. Typical monoacrylates include 2-ethylhexyl (meth)acrylate, 2-hydroxyethyl (meth)acrylate, cyanoethyl (meth)acrylate, 2-hydroxypropyl (meth)acrylate, p-dimethylaminoethyl (meth)acrylate, lauryl (meth)acrylate, cyclohexyl (meth)acrylate, tetrahydrofurfuryl (meth)acrylate, chlorobenzyl (meth)acrylate, and glycidyl (meth)acrylate. Of course mixtures of (meth)acrylates or their derivatives as well as combinations of one or more (meth)acrylate monomers, oligomers and/or prepolymers or their derivatives with other copolymerizable monomers, including acrylonitriles and methacrylonitriles may be used as well.

(Meth)acrylates are typically polymerized by a free radical reaction. Initiators of free radical polymerization useful in the practice of the present invention include, but are not limited to peroxides, hydroperoxides, peresters, peracids, peroxycarbonates, peroxyketones, azo compounds and redox initiators, and derivatives of the foregoing. Exemplary initiators include benzoyl peroxide, cumene hydroperoxide, t-butyl hydroperoxide, dicumyl peroxide, decanoyl peroxide, lauroyl peroxide, di-(n-propyl)peroxide, t-butyl peroxide acetate, t-butyl perbenzoate, t-butylperoxybenzoate, t-butylperoxyacetate, di-t-butyl azodiisobutyronitrile, t-amyl peroxyneodecanoate, dichlorobenzoyl peroxide, methylethylketone hydroperoxide, t-butyl peroxide, t-amyl peroxypivalate, t-amyl peroxy-2-ethyl-hexanoate, t-butyl peroxyisobutyrate, di-sec-butyl peroxydicarbonate, di-(2-ethylhexyl)peroxydicarbonate, 1,1-dimethyl-3-hydroxybutyl peroxyneodecanoate, a-cumyl peroxyneoheptanoate, t-amyl peroxyneodecanoate, t-amyl peroxypivalate, t-butyl peroxypivalate, t-amyl peroxy-2-ethylhexanoate, t-amyl peroxyacetate, t-amyl perbenzoate, di-t-butyl peroxide, 2,2'-azobis(2-methylbutyronitrile), 2,2'-azobis(isobutyronitrile), 2,2'-azobis(2,4-dimethylpentanenitrile), 2,2'-azobis(2,4-dimethylvaleronitrile), 2,2'-azobis(2-methylpropanenitrile), 1,1'-azobis(cyclohexanecarbonitrile), 1,1'-azobis (cyanocyclohexane) and the like. Especially preferred initiators are the peroxides, hydroperoxides, peresters and peracids, most preferably benzoyl peroxide. Typically such initiators are present at a level of from about 0.01% to about 10%, preferably from about 0.5% to about 3.0%, most preferably from about 0.1% to about 2%, by weight based on the weight of the component(s) curable by the free radical polymerization.

In addition to the initiator, such free radical polymerizable compositions further include an accelerator of free radical polymerization. Commonly known accelerators include amines and sulfimides. Tertiary amines, such as N,N-dimethylparatoluidine, triethylenetetramine, diethylenetriamine, N,N-dimethylaniline, N,N-diethylparatoluidine, and N,N-diethylaniline, and sulfimides such as 3-oxo-2,3-dihydrobenz-[d]isothiazole-1,1-dioxide (saccharin) are particularly useful. Useful accelerators also include the aldehyde-amine reaction products such as butyraldehyde-aniline and butyraldehyde-butylamine. The most preferred accelerators, however, are the organometallic compounds known as metallocenes, especially the ferrocenes, and the organometallic polymers containing at least one metallocene, preferably ferrocene, moiety. Exemplary organometallic accelerators include ferrocene, butyl ferrocene, titanocene and cupricene. Accelerators are typically used at levels of from about 0.01% to about 1.0% by weight based on the weight of the component(s) curable by free radical polymerization.

A preferred class of (meth)acrylate based curable compositions suitable for use in the practice of the present invention is those know as anaerobic adhesive and sealant compositions. These compositions typically comprise a free radically polymerizable monomer, oligomer and/or pre-polymer, a free radical initiator and a free radical accelerator, with or without a stabilizer or inhibitor such as polyhydric phenols, quinones, and the like. Especially preferred polymerizable monomers, oligomers and prepolymers include 2-hydroxyethyl (meth)acrylate, 2-hydroxypropyl (meth)acrylate, mono-, di-, tri- and tetra-ethylene glycol di(meth)acrylate, trimethylol propane tri(meth)acrylate, ethoxylated bisphenol A di(meth)acrylates, polyester (meth)acrylates and their derivatives, polyethylene glycol (meth)acrylates and their derivatives and polyurethane (meth)acrylates and their derivatives. Suitable quinones include hydroquinones, benzoquinones, naphthaquinones, phenanthraquinones, anthraquinones and substituted compounds of the foregoing. These inhibitors preferably are present in the adhesive composition in only very small amounts, usually from about 10 to 1000 parts per million (ppm), and more preferably from about 50 to 500 ppm. The anaerobic compositions may also include chelators such as beta-diketones, ethylenediamine tetraacetic acid and the sodium salt thereof. Anaerobic compositions are especially suited for applications where concern exists for premature curing or polymerization of the curable components prior to mating of the substrates to be bonded or cured.

The present invention is also applicable to a broad array of epoxy resins including, but certainly not limited to, those of the types disclosed in Deckert et. al. (U.S. Pat. No. 3,746,068); Hart et. al. (U.S. Pat. No. 4,536,524); Earls et. al. (U.S. Pat. No. 5,510,431); and Siebert et. al. (U.S. Pat. Nos. 5,157,077 and 5,140,068), all incorporated herein by reference. Generally speaking, suitable epoxy resins typically comprise a mixture of low molecular weight oligomers containing, on average, two or more epoxide groups per molecule: though they may also comprise oligomeric prepolymers of the foregoing. The most common epoxy resins are those based upon glycidyl compounds, especially the glycidyl ethers such as those based on bisphenol A or on resorcinol and, to a lesser extent, the diglycidyl esters, especially the diglycidyl esters of phthalic acid, hexahydrophthalic acid and tetrahydrophthalic acid. Other suitable epoxy resins include the novolak-epoxy resins, particularly those based on the phenol novolaks or cresol novolaks, the glycidyl ethers of glycerol, polypropylene glycol or pentaerythritol, as well as the glycidyl esters, glycidyl amines, epoxidized diene polymers and the cycloaliphatic epoxy resins.

The epoxy resins may be polymerized by treatment with a hardeners or curing agents that react with the epoxide group. Suitable curing agents include aliphatic primary and secondary amines such as diethylenetriamine, triethylenetetramine, and diethylaminopropylene; aromatic amines such as m-phenylenediamine, 4,4"-diaminodiphenylmethane and diaminodiphenylsuphone; anhydrides, especially acid anhydrides, such as phthalic, tetrahydrophthalic, hexahydrophthalic, maleic, pyromellitic, trimellitic, nadic methyl, dodecenylsuccinic and chlorendic anhydrides and fatty polyamides. Other suitable curing agents include dicyandiamide, melamine, and imidazole derivatives; modified amines such as ethylene oxide- and acrylonitrile-epoxy resin adducts and ketimines, Lewis acids such as boron trifluoride-monoethylamine complex and Lewis bases such as o(diethylaminoethyl)phenol, tris-(dimethylaminomethyl)phenol and 2-ethyl-4-methyl imidiazole. For chemically curing or polymerizing the epoxy compounds and resins, a number of cationic initiators may be used including HCl, HBr, HI, $C_6H_5SO_3H$, $HSbF_6$, $HAsF_6$, $HBF_4$ or Lewis acids such as metal halide salts. The amount of curing agent added depends upon the specific curing agent employed, but is typically 0.85 to 1.0 moles per epoxy stoichiometry, especially in the case of anhydrides or in stoichiometric amounts in the case of amines, or from about 0.01% to about 10%, preferably from about 0.1% to about 3% by weight, based on the weight of the curable epoxy, in the case of cationic initiators for chemical curing. With the anhydrides, about 1% of a tertiary amine is also employed as a catalyst. Those skilled in the art will readily appreciate the proper selection and quantity of hardeners and catalysts to employ.

Oftentimes, and preferably depending upon the application, an epoxy prepolymer is reacted with a polyol and most preferably a polyester or polyether polyol. Polyether polyols include linear and/or branched polyethers having a plurality of ether bonds and at least two hydroxyl groups. Examples of the polyether polyol include polyoxyalkylene polyol such as polyethylene ether glycol, polypropylene ether glycol, polybutylene ether glycol and the like. Suitable polyols include homopolymers and copolymers thereof, especially copolymers of the polyoxyalkylene polyols. Particularly preferable copolymers of the polyoxyalkylene polyols may include an adduct with at least one compound selected from the group consisting of ethylene glycol, propylene glycol, diethylene glycol, dipropylene glycol, triethylene glycol, 2-ethylhexanediol-1,3,glycerin, 1,2,6-hexane triol, trimethylol propane, trimethylol ethane, tris(hydroxyphenyl)propane, triethanolamine, triisopropanolamine, ethylenediamine, and ethanolamine, with at least one compound selected from the group consisting of ethylene oxide, propylene oxide and butylene oxide.

Polyester polyols are formed from the condensation of one or more polyhydric alcohols having from 2 to 15 carbon atoms with one or more polycarboxylic acids having from 2 to 14 carbon atoms. Examples of suitable polyhydric alcohols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, dodecanediol, octanediol, glycerol monoallyl ether, glycerol monoethyl ether, diethylene glycol, 1,3-bis-(2-hydroxyethoxy)-propane and the like. Examples of polycarboxylic acids include phthalic acid, isophthalic acid, terephthalic acid, maleic acid, octadecenylmaleic acid, fumaric acid, trimellitic acid, adipic acid, malonic acid, glutaric acid, and the corresponding acid anhydrides, acid chlorides and acid esters such as phthalic anhydride, phthaloyl chloride, and the dimethyl ester of phthalic acid. Preferred polycarboxylic acids are the aliphatic and cycloaliphatic dicarboxylic acids containing no more than 14 carbon atoms and the aromatic dicarboxylic acids containing no more than 14 atoms.

The curable compositions may also be based on unsaturated polyesters, many of which are derived from the same monomers as the aforementioned polyester polyols. Such unsaturated polyesters oftentimes exist as combinations thereof with an unsaturated monomer as a diluent, such as styrene. The unsaturated polyester resins are usually the product of a reaction between one or more unsaturated dibasic acids and one or more dihydric alcohols, including those noted in the prior paragraph. Curing or polymerizing the unsaturated polyesters typically requires an initiator and an accelerator; however, once free-radical polymerization is initiated, such polymerization is self-sustaining. Suitable accelerators include materials such as diethylaniline, dimethylaniline and N,N-dimethyl toluidine. Suitable initiators include such materials as benzoyl peroxide, ethylmethyl ketone peroxide, cumene hydroperoxide and dichlorobenzoyl peroxide. Of course other accelerators and initiators for the unsaturated polyesters may be used as well and are well known to those skilled in the art.

Another class of curable polymeric resins to which the present invention is applicable is the polyurethane prepolymer resins. Such polyurethane prepolymer resins include free isocyanate moieties or groups as the reactive or polymerizing moiety of the molecule and are typically the reaction product of poly(alkylene) glycols and polyisocyanates. Specific polyurethane prepolymers include, for example, the reaction product of poly(1,4-butylene oxide)glycol and tolylene diisocyanate and/or methylene diisocyanate. Such resins may have as much as 5 percent, by weight, of free isocyanate groups available for reaction. Curing agents suitable for use with the polyurethane prepolymer resins include methylene-bis-(o-chloroaniline), polyols (such as 1,4-butanediol), or trimethylolpropane, or even water. Other suitable polyurethane resins include those that have free hydroxyl or olefinic functionality and cure through free radical polymerization. Suitable catalysts for the polyurethanes include, among others, tin carboxylates, organosilicone titinates, alkyl titinates, bis carboxylates, tertiary amines, amidines, tin mercaptides, and naphthenates or alkanoate salts of lead, cobalt, manganese, bismuth or iron. Specific catalysts include tin(II) diacetate, tin(II) dioctanoate, tin(II) dilaurate, dibutyltin diacetate, dibutyltin dilaurate, dibutyltin maleate, stannous octoate, stannous oleate, stannous acetate, stannous laureate, 2,3-dimethyl-3,4,5,6-tetrahydropyrimidine, triethylamine, tributylamine, dimethylbenzylamine, N,N,N', N'tetramethethylenediamine, 1,2-dimethylimidazole, triethylenediamine, tetrabutyl titanate, tetrapropyl titanate, etc.

The curable compositions may also be based upon liquid polysulfide prepolymers comprising an oligomeric polysulfide terminated with thiol groups. Such polysulfides typically have the chemical structure: $HS(R-S_x)_nH$ where x is either 1 or a small number of 2-4; x is an integer of 1 to 25 and R is an alkylene, arylene or alkoxyalkylene, including, in particular, $-CH_2CH_2-$ and/or $-CH_2(OCH_2CH_2)_2-$ often times further included the branching group $-CH_2CHCH_2-$. Preferred oligomeric polysulfides are those based on the polyalkylene sulfides such as polyethylene sulphide and polypropylene sulfide as the polyarylene sulfides such as poly(2,4-tolylene sulfide), poly(4,4'-biphenylene sulfide), and poly(phenylene sulfide) (PPS). The thiol terminated oligomeric polysulfide may be polymerized or cured by reacting with epoxy or phenolic resins or compounds as well as with diisocyanates. Preferred polysulfide adhesives can be formed by reaction of a thiol terminated polysulfide with a di- or polyfunctional epoxide such as the diglycidyl ether of bisphenol-A. Alternatively, polymerization may be effected by reaction of the terminal thiol groups with an olefin, including various (meth)acrylates such as polyethylene glycol dimethacrylate. Curing agents for curable polysulfides also include manganese dioxide, lead dioxide, antimony trioxide, and tellurium dioxide.

Further, the present invention is also applicable to adhesive and sealant compositions based upon silicone materials. These silicon-containing materials typically have a hydroxyl group or a hydrolytically unstable group bound to a silicon atom. Cross-linking of these materials typically occurs through the formation of siloxane bonds. Suitable curing agents include tin octoate, lead octoate, and dibutyltin dilaurate. These curable compositions are particularly useful as sealing compositions where weathering resistance and heat resistance is important.

As noted above, the curable compositions may comprise mixtures of monomers, oligomers and/or prepolymers of the same general chemical class or of different classes so long as the systems are compatible and the resultant cured or polymerized adhesive or sealant has efficacious properties. Where combinations or mixtures of monomers, oligomers and/or prepolymers are used, there are three mechanisms by which the secondary component is incorporated with or into the composition of the primary curable component. First, the second polymerizable component may have a plurality of reactive or functional sites for co-reacting or co-polymerizing with the first component. Second, the second component may have polar groups such as oxygen, amine, ether, ester, hydroxyl, ketone, epoxy or carboxyl, which form hydrogen bonds with the cured or polymerized primary component. Third, the second component may be such as to stericly entangle or hinder the movement of opposing chains of the primary component.

Suitable secondary components which co-react or co-polymerize with the primary curable component include, for example, allyl (meth)acrylates, alkene glycol di(meth)acrylates, alkyldiol di(meth)acrylates, alkoxy alkanol di(meth)

acrylates, and trialkanol tri(meth)acrylates, especially allyl (meth)acrylate, triethylene glycol di(meth)acrylate, ethylene glycol di(meth)acrylate, tetraethylene glycol di(meth)acrylate, polyethylene glycol di(meth)acrylate, 1,4-butanediol di(meth)acrylate, diethylene glycol di(meth)acrylate, 1,6-hexanediol di(meth)acrylate, neopentyl glycol di(meth)acrylate, polyethylene glycol di(meth)acrylate, 1,3-butylene glycol di(meth)acrylate, tripropylene glycol di(meth)acrylate, ethoxylated bisphenol di(meth)acrylate, dipropylene glycol di(meth)acrylate, alkoxylated hexanediol di(meth)acrylate, alkoxylated cyclohexane dimethanol di(meth)acrylate, pentaerythritol tri(meth)acrylate, and the like, and mixtures thereof. Of course other suitable materials include those previously mentioned with respect to each class of polymerizable component. Exemplary secondary components having polar groups for forming hydrogen bonds include, for example, alkoxy acrylate, alkoxy methacrylate, polyester acrylate, polyester methacrylate, acrylalkoxy phthalic acid, methacrylalkoxy phthalic acid, glycidyl methacrylate, glycidyl acrylate, cycloalkoxy acrylate, cycloalkoxy methacrylate, and the like. Finally, suitable secondary components that result in steric entanglement or that sterically hinder the movement of opposing chains of the forming adhesive polymer include, for example, alkyl (meth)acrylates of greater than 14 carbons, cycloalkyl (meth)acrylates, multicyclic alkyl (meth) acrylates, aralkyl (meth)acrylates, cycloalkoxy (meth)acrylates and the like. Specific examples include stearyl acrylate, stearyl methacrylate, isobornyl methacrylate, benzyl acrylate, cyclohexyl methacrylate, and cetyl acrylate.

The foregoing sets forth but a brief overview of the myriad of curable compositions to which the present invention is applicable and is not intended to be limiting to the aforementioned classes of curable compositions nor to the specific polymerizable components mentioned therein. The curable compositions may further contain a number of other optional constituents such as terpene resins, including, for example, terpenes, wood rosin resins, esters of gum rosin, styrenated terpene, and terpene phenolic resins, as tackifiers and/or liposoluble additives, such as limonene, dipentene, terpene resins, or oil of turpentine, for improving the adhesive strength of the curable composition on oily metal sheets. Such additives are typically included in an amount of 1-10 percent by weight, relative to the weight of the curable composition. Of course such curable compositions may optionally contain any number of other known additives therefore including dyes, pigments, plasticizers, stabilizers, inhibitors, thickeners, solvents, surfactants, emulsifying agents and the like, as is well known to those skilled in the art.

Additional curable compositions, which can be modified or adapted for use in accordance with the teaching of the present invention to provide the benefits and attributes of the present invention, are well know and readily recognized by those skilled in the art. Exemplary curable compositions are further disclosed in, for example, Mahdi et. Al. (US 20020010272), Bachmann et. al. (U.S. Pat. No. 3,814,156), Chernack (U.S. Pat. Nos. 4,940,852 and 4,808,639), Wallace (U.S. Pat. Nos. 4,428,982 and 4,081,012), Krieble (U.S. Pat. Nos. 3,489,599 and 3,746,068), Newell (U.S. Pat. No. 4,252,708); Kropp et. al. (U.S. Pat. No. 6,573,328), Matsuo (U.S. Pat. No. 6,025,074); Fryd et. al. (U.S. Pat. No. 4,980,410); Azevedo (U.S. Pat. No. 4,417,028), Cooke et. al. (U.S. Pat. No. 4,497,916), Chao (U.S. Pat. No. 6,375,872); Usami et. al. (U.S. Pat. No. 5,397,812), Wolinski et. al. (U.S. Pat. No. 4,126,504), Siebert et. al. (U.S. Pat. Nos. 5,140,068 and 5,157,077), Deckert et. al. (U.S. Pat. No. 3,746,068), Hart et. al. (U.S. Pat. No. 4,536,524), Earls et. al. (U.S. Pat. No. 5,510,431), Hilbelink et. al. (U.S. Pat. No. 3,725,501), Sweeney (U.S. Pat. Nos. 4,830,558 and 4,555,206) and Rich et. al. (U.S. Pat. Nos. 5,635,546 and 5,853,520), among others, all of which are hereby incorporated herein by reference.

Though many of the foregoing curable compositions may have been used or adapted for use in a pre-applied form, the primary critical and distinguishing aspect of the pre-applied curable compositions of the present invention is the fact that at least one curative therefore is present as an encapsulated curative complex wherein said curative complex (i) comprises at least one curative for effecting, directly or indirectly, the cure or polymerization of the liquid curable or polymerizable component and (ii) is substantially non-flowing in the absence of external forces or conditions impacting upon said curative complex. The carrier may be any of a number of different materials depending upon the process and materials to be used for encapsulating the curative complex, the chemistry of the curable compositions and the end-use applications in which they are to be used, and the process or method by which the curative is to be made available to the curable, polymerizable or cross-linkable component of said curable composition. Generally speaking the carrier will be selected from natural and synthetic materials or compositions that are (a) soft, putty-like or gel-like in character or (b) solid or semi-solid so long as the solid or semi-solid carrier material is (i) soluble in or is softened by the liquid curable matrix component of the curable composition with which they are to be used, (ii) is softened by the reaction and/or environmental conditions under which the curable composition is cured or polymerized and/or (iii) is softened by the method or process by which the curative is to be made available to the curable, polymerizable or cross-linkable component of said adhesive or sealant.

The carrier may be comprised of substantially polymeric or oligomeric components and/or monomeric components provided that the carrier composition itself exhibits the aforementioned characteristics. Furthermore, it is understood that a given curative complex may include two or more curatives or there may be two or more different curative complexes, each with the same or a different curative or the same of a different carrier. It is also contemplated that the carrier may be or may generate in-situ a thixotropic material or latent thixotropic material; however, because of the small particle size of the microcapsules, thixotropy must be inherent or made inherent to the composition or material comprising the carrier. Traditional inorganic thixotropic additives which are added to liquid systems, such as fumed silica, are, at this time, generally considered inappropriate for use in the preparing the microencapsulated cure systems due to the relatively large particle size of current day inorganic thixotropic additives as compared to the particle size of the microencapsulated cure systems. Alternatively, or in addition, the carrier composition may include or comprise one or more non-thixotropic gelling or thickening agents that act latently such that the carrier or carrier precursor material immediately prior to or during the encapsulation process is of a low viscosity and following encapsulation is of an increased viscosity, generated in-situ.

As used in this application and the appended claims, the terms "soft" and "putty-like" mean that the referenced materials do not flow or deform without moderate force, generally without a force of at least 1 psi, preferably at least 5 psi. These soft or putty-like materials may have no or little to moderate elasticity, preferably a consistency and degree of elasticity of from that of cake frosting to that of bread dough, so that as sufficient and repetitive forces are acted upon the encapsulated carrier, more of the curative within the carrier material is exposed and/or made available. Similarly, reference to softening of the carrier material means that the carrier material becomes soft or putty-like or even flowable upon exposure to certain materials and/or conditions including, for example, upon exposure to liquid components of the curable composition in which the carrier is wholly or partly soluble, miscible or swellable or to heat or by mastication in the case of a rubbery carrier material.

Exemplary of the materials that may be suitable for use as a carrier include any of a number of low Tg materials including hot melts, pressure sensitive adhesives, rubber materials and other low Tg polymers, semi-solid and solid resins, starches and starch-based polymers, hydrogels, and low temperature waxes provided that the foregoing meet one or more of the aforementioned characteristics and do not interfere with the cure or polymerization or cross-linking of the curable compositions or materially degrade the desired adhesive or sealant properties of the so cured, polymerized or cross-linked compositions. Though the absence of heat for activation and/or cure is an especially desirable benefit of the present invention, in an alternate embodiment, it is envisioned that the carrier could be a low melting temperature wax, e.g. a wax having a melting point less than 150° F., preferably less than 130° F., most preferably less than 120° F. For example, therapeutic paraffin waxes could be used as the carrier.

As noted above, the carrier may also comprise or include organic and inorganic thixotropic, thickening and gelling agents, particularly those used commercially to control the flow and rheology characteristics of, for example, paints, adhesives, sealants, engine and industrial oils, and food products. Suitable organic polymeric thickening or gelling agents include styrene/olefinic block copolymers sold under the Kraton brand, and a variety of small molecules that can associate chemically or physically, such as various plasticizers, thickeners, flow control agents, and the like. As noted previously, current conventional inorganic thixotropic, thickening and gelling agents are typically not suitable for use in the preparation of the microencapsulated cure system unless the particle size of such inorganic additive is extremely small and the particle size of bead of the carrier material or carrier precursor material to be encapsulated is very large. However, should technology evolve whereby nano-sized inorganic thixotropic, thickening and gelling agents are capable of being produced, it is certainly contemplated that those materials will have applicability in the practice of the present invention.

It is also contemplated that the carrier or the components thereof may be co-reactive with the curable composition and/or the curative. For example, with respect to the former, the carrier may have a functional group that serves as a reactive or cross-link site with which the polymerizable monomers, pre-polymers and/or polymers of the curable composition react during polymerization or cure.

Alternatively, and preferably, the carrier composition may comprise (a) a mixture of one or more liquid mono- and/or poly-functional monomers, oligomers and/or prepolymers that copolymerize with the liquid curable components of the curable compositions and (b) a viscosity modifier which is (i) a slow acting, latent gelling or thickening agent, (ii) a temperature activated gelling or thickening agent (no gel at elevated temperatures) and/or (iii) a shear sensitive gelling or thickening agent. In this embodiment, the carrier composition is subjected to conditions whereby the composition is of low viscosity, i.e., where the viscosity modifier has no or substantially no effect, at that point during the encapsulation process wherein the fine beads or droplets of the mixture (a) containing the viscosity modifier (b) are prepared for encapsulation and returns to or becomes of a much higher viscosity, exhibiting the characteristics of the carrier as defined earlier, subsequent thereto. For example, the elevated temperature or shear forces that lower the viscosity may be removed following formation of the droplets and prior to, concurrent with, or subsequent to the application or deposit of the shell wall or shell wall forming material. Alternatively, following formation of the droplets, the emulsion, dispersion, suspension, colloid, etc. of the mixture (a) and viscosity modifier (b), the droplets may then be subject to such conditions as effectuate or accelerate the gelling or thickening properties of the latent gelling or thickening agent. Employing carriers comprised of the mixture (a) has the added benefit of maximizing the amount of liquid curable components in the final curable composition and minimizing the amount of other inert ingredients and/or ingredients which may affect or modify the properties of the cured or polymerized curable composition.

It should be noted that where the carrier is a thickened or gelled or thixotropic material, the viscosity at the time of formation of the beads is low such that low or moderate shear forces create fine droplets, consistent with the desired particle size and particle size distribution of the to be formed encapsulated curative complex. In their thickened, gelled or thixotropic state, the viscosity is such that even moderate to high shear forces will not allow for the preparation of fine, preferably substantially uniform, droplets or for droplets having a narrow, traditional bell curve particle size distribution.

As noted above, the curative may also take part in the polymerization of certain or all components of the carrier composition provided that the amount of curative incorporated into the carrier precursor composition is sufficient so that adequate amounts remain following completion of the polymerization of the carrier so as to be able to effectuate cure of the curable composition. Preferably, though, the curing agent for the curable composition is not, or is not to any meaningful extent, involved with the cure or polymerization of the carrier. Instead, the carrier precursor composition includes one or more other curing agents for affecting its cure, leaving the encapsulated curing agent available for effecting cure or polymerization of the curable composition. In any event, it is important that the curative to be incorporated into the carrier not react with the carrier once formed so as to ensure long-term shelf stability and efficacy of the curative in the encapsulated carrier. Of course, the curative may, and most likely is, involved with the chemical reaction between the carrier and the curable components of the curable composition, if any. The key is that the curative not be reactive with the carrier in its encapsulated form.

Furthermore, the carrier complex may have incorporated therein other components of the adhesive or sealant or other additives pertinent to the carrier itself including, for example, plasticizers to enhance the pliability or softness of the carrier and/or tackifier resins. Again, however, it is important that such other components not interfere with the cure or polymerization or cross-linking of the curable compositions or materially degrade the desired adhesive or sealant properties of the so cured, polymerized or cross-linked compositions. Suitable plasticizers include phthalates, adipates, hydrocarbon resins, oils, and fatty acid esters, including for example methyl palmitate and methyl stearate. Especially preferred plasticizers are those based on polybutenes and combinations thereof, alone or together with other additives such as aliphatic lactate esters as taught in Wyffels (U.S. Pat. No. 5,688, 850), incorporated herein by reference. Suitable tackifier resins include aliphatic and/or aromatic hydrocarbon resins and terpene resins.

While the carrier may be an inert material from the perspective of bonding or sealing, it is preferred that the carrier itself participate in the bonding or sealing performance of the overall adhesive or sealant system in which it is incorporated. Specifically, it is oftentimes desirable for the carrier to possess inherent or latent adhesive or sealant properties. For example, the carrier may be or contain a hot melt adhesive, a pressure sensitive adhesive, an elastomer/tackifier composition, a thickened or gelled mass of one or more monomers, oligomers or mixtures thereof, etc. By employing a carrier which has adhesive characteristics, the carrier is able to provide an initial and immediate bond between two substrates to be bonded, holding the two in proper alignment while providing sufficient time for the curable composition to cure, polymerize or cross-link, as appropriate. This is particularly beneficial in high speed, industrial bonding applications where only a very brief time, on the order of fractions of a second, are possible to apply pressure between the two substrates to be bonded, especially in those instances where the substrates to be bonded have forces, whether inherent in the product design and/or materials of which they are made or unrelated to the substrates, that, in the absence of an immediate tack bond, would cause the two substrates to come apart, thus, making a bond impossible. For example, in bonding opposing end flaps of a cereal box whose natural tendency is to open, the use of a carrier with adhesive characteristics will hold the flaps together while the curable or polymerizable material cures or polymerizes to form the formal bond.

As mentioned above, it is also contemplated that the curing system of the present invention may comprise a mixture of two or more different microencapsulated carriers each containing the same or a different curing agent and/or carrier material. For example, one may tailor the adhesive characteristics contributed by the carrier by employing a combination of carrier particles, some of which contain a higher percentage of material with latent adhesive properties and others with a carrier material of low or no adhesive properties. Alternatively, a portion of the carrier particles may comprise a gel containing a mixture of mono- and/or or poly-functional monomers that are co-polymerizable with the curable composition and the remainder comprise an adhesive. Such compositions provide limited, quick bonding capability with more liquid curable components so as to enhance the adhesive composition while lessening the amount of non-participating, non-reactive carrier. In essence, the use of mixtures of different carrier particles enables one to balance the immediate and latent adhesive properties of the ultimate adhesive composition.

As noted, the carrier material may be a hydrogel. Suitable hydrogels include, but are not limited to, those derived from gelatin, polysaccharides, alginates, cross-linked polyacrylamide polymers, hydroxyethylmethacrylate polymers, cross-linked polyhydroxyethylacrylate, polymerized, cross-linked 2-acrylamido-2-methylpropane sulfonic acid polymers and their salts, including particularly the sodium and potassium salts, cross-linked polyvinylpyrrolidone, polyacrylic acid, copolymers of the foregoing with each other and/or other polymers such as polystyrene or other non-hydrogel forming polymers. An exemplary hydrogel is that based on poly-2-hydroxyethylmethacrylate, preferably cross-linked with ethylene glycol dimethacrylate.

The carrier may also be an elastomer composition. Exemplary elastomers are those exhibiting a second order glass transition temperature (Tg), or a softening point, of less than 25° C., preferably less than –0° C., especially those soluble in (meth)acrylate ester monomers. Such elastomers are synthetic high polymers with exhibit plastic flow, particularly, polychloroprene and copolymers of butadiene or isoprene with styrene, acrylonitrile, (meth)acrylate esters, and the like. Additional useful elastomers include copolymers of ethylene and (meth)acrylate esters, homopolymers of epichlorohydrin and copolymers of epichlorohydrin and ethylene oxide. Specific examples include CR-neoprene-polychloroprene, NBR-nitrile rubber-butadiene-acrylonitrile copolymer, styrene-butadiene copolymer, acrylic rubber acrylate butadiene copolymer, and copolymers of ethylene and acrylate esters such as methylacrylate and ethylacrylate. Of course, higher Tg materials may be used, especially where the curable composition is to be activated at higher temperatures or otherwise experiences higher temperatures during activation, e.g., where friction of mixing or the activator means creates higher temperatures. Also included in this class of materials are the so-called rubber resin adhesives that comprise an elastomeric ingredient such as crude natural rubber, styrene-butadiene elastomer, a polybutadiene, polyisobutylene and polysiloxane and a tackifying resin such as glyceryl esters of hydrogenated rosin, thermoplastic terpene resins, petroleum hydrocarbon resins, coumarone-indene resins, synthetic phenol resins, low-molecular weight polybutenes and tackifying silicone resins.

The carrier may also be an adhesive or pressure sensitive adhesive material having a low Tg or low softening point, preferably less than 25° C. and having an elastic modulus of less than about $5\times10^5$ dynes/cm$^2$ at 70° C., as measured using a dynamic mechanical thermal analyzer Model RSA II (available from Rheometrics Co.). Suitable adhesives include the acrylate-based pressure sensitive adhesives, particularly those that generally do not require the addition of a tackifier resin. Such acrylates typically have alkyl chains of from 1 to 14 carbon atoms per molecule, preferably from 4 to 12 carbon atoms per molecule. A mixture of different acrylate monomers may be used, but at least a major portion of the alcohol residue forming the alkyl tails of the molecules generally have carbon-to-carbon chains of at least four carbon atoms terminating at the ester linkages. Examples of useful acrylate-based polymeric materials are the homo- and co-polymers of methyl isoamylacrylate, isooctyl acrylate, commercial fuse oil acrylate and 2-ethylhexylacrylate. The copolymers may include acrylic acid, methacrylic acid, acrylamide, methacrylamide, acrylonitrile and methacrylonitrile as co-monomers. Other acrylic materials include multi-component compositions comprising, for example, a low Tg acrylate monomer such as n-butyl acrylate, ethyl acrylate, 2-methylbutyl acrylate, isobutyl acrylate, isooctyl acrylate, 2-ethyl hexyl acrylate and the like, a functional monomer such as N,N-dimethyl (meth)acrylamide, N,N-diethyl(meth)acrylamide, N-vinylpyrrolidone and the like, and a higher Tg acrylate monomer such as 3,5-dimethyladamantyl (meth)acrylate, isobornyl (meth)acrylate, 4-bipheny (meth)acrylate, and 2-nephthyl (meth)acrylate. Still another class of pressure sensitive materials are the acrylic hot melt PSAs of Mancinelli (U.S. Pat. No. 5,225,470), incorporated herein by reference.

The present invention is particularly suited for those carrier materials that are polymerized in-situ concurrent with or subsequent to encapsulation of the carrier complex, including, e.g., pressure sensitive adhesive carrier materials. Exemplary systems include those disclosed in, for example Schwantes (U.S. Pat. No. 6,592,990) and Nagai et. al. Such systems generally comprise addition polymerizable pre-polymers, including, for example, alkyl (meth)acrylate, aralkyl (meth) acrylate, cycloalkyl (meth)acrylate, alkoxy (meth)acrylate, cycloalkoxy (meth)acrylate, bicycloalkyl (meth)acrylate, and alkoxy(alkoxy)$_n$(meth)acrylate, wherein the alkyl moieties have from 1 to 16 carbon atoms, the cycloalkyl moieties have from 4 to 8 carbon atoms, and n is an integer from 1 to 6.

Especially suitable addition polymerizable pre-polymers for use in the formation of the carrier complex include those whose homopolymer has a Tg of less than about 0° C., a flash point of at least 75° C., and a boiling point of at least 175° C., including, for example, n-pentyl acrylate, 2-methyl butyl acrylate, 2-ethylhexyl acrylate, n-octyl acrylate, n-decyl acrylate, n-dodecyl acrylate, lauryl methacrylate, lauryl acrylate, 2-ethylhexyl methacrylate, n-octyl methacrylate, iso-octyl acrylate, iso-octyl methacrylate, isononyl acrylate, isodecyl acrylate, 2-ethoxyethyl methacrylate, butyl diglycol methacrylate, tetrahydrofurfuryl acrylate, 2-phenoxyethyl acrylate, isohexyl acrylate, tridecyl acrylate, tridecyl methacrylate, ethoxylated nonyl phenol acrylate and the like and mixtures thereof.

Optionally, the in-situ formed carrier may contain a terpene resin in addition to the polymerizable prepolymer. Terpene resins function as tackifiers and, for purposes of the invention, include wood rosin resins, esters of gum rosin, styrenated terpene and terpene phenolic resins (including CAS #259094-71-8). Examples of terpene resins include modified terpene resins, such as those sold under the Sylvares™ and Zonatac™ tradenames (Arizona Chemical, Panama City, Fla.), as well as the ester-modified or polyol ester modified terpene resins such as Sylvalite™ (CAS#8050-26-8) and the like.

Optionally, the composition from which the in-situ formed carrier is derived may include a second substantially water insoluble polymerizable pre-polymer which pre-polymer is multifunctional having at least two addition polymerizable sites. By "substantially water insoluble" is meant that the material has a solubility in water of less than about 2% more preferably less than 1 % by weight. The addition polymerizable sites of said prepolymers interact with other addition polymerizable sites in the transformation of the pre-polymers to an encapsulated tacky adhesive material. Exemplary second substantially water insoluble polymerizable pre-polymers include allyl methacrylate, alkene glycol dimethacrylate, alkyl dimethacrylate, alkyldiol dimethacrylate, alkoxy alkanol diacrylate, trialkanol triacrylate, alkoxy(alkoxy)$_n$ alkyl triacrylate, alkoxy(alkoxy)$_n$ alkyl dimethacrylate, aralkyl dimethacrylate, cycloalkyl dimethacrylate, alkoxy dimethacrylate, bicycloalkyl dimethacrylate, cycloalkoxy dimethacrylate, allyl acrylate, alkene glycol diacrylate, alkyl diacrylate, alkyldiol diacrylate, alkoxy alkanol dimethacrylate, trialkanol trimethacrylate, alkoxy(alkoxy)$_n$ alkyl trimethacrylate, alkoxy(alkoxy)$_n$ alkyl diacrylate, aralkyl diacrylate, cycloalkyl diacrylate, alkoxy diacrylate, bicycloalkyl diacrylate, cycloalkoxy diacrylate, wherein the alkyl moieties are of 1 to 16 carbons, the cycloalkyl moieties are of 4 to 8 carbons, n is an integer from 1 to 6. More specifically, the second substantially water insoluble polymerizable pre-polymer having at least two addition polymerizable sites can be selected from any of allyl methacrylate; triethylene glycol dimethacrylate; ethylene glycol dimethacrylate; tetraethylene glycol dimethacrylate; polyethylene glycol dimethacrylate; 1,3 butylene glycol diacrylate; 1,4-butanediol dimethacrylate; 1,4-butanediol diacrylate; diethylene glycol diacrylate; diethylene glycol dimethacrylate; 1,6 hexanediol diacrylate; 1,6 hexanediol dimethacrylate; neopentyl glycol diacrylate; neopentyl glycol dimethacrylate, polyethylene glycol diacrylate; tetraethylene glycol diacrylate; triethylene glycol diacrylate; 1,3 butylene glycol dimethacrylate; tripropylene glycol diacrylate; ethoxylated bisphenol diacrylate; ethoxylated bisphenol dimethacrylate; dipropylene glycol diacrylate; alkoxylated hexanediol diacrylate; alkoxylated cyclohexane dimethanol diacrylate; propoxylated neopentyl glycol diacrylate, trimethylolpropane trimethacrylate; trimethylolpropane triacrylate, pentaerythritol triacrylate, ethoxylated trimethylolpropane triacrylate, propoxylated trimethylolpropane triacrylate, propoxylated glyceryl triacrylate, di-(trimethylolpropane)tetraacrylate, dipentaerythritol pentaacrylate, ethoxylated pentaerythritol tetraacrylate, and the like, and mixtures thereof.

The second substantially water insoluble polymerizable pre-polymer can have at least three different mechanisms for forming a tacky adhesive with the first pre-polymer. The second polymerizable pre-polymer can have two reactive sites or polyfunctional sites for reacting with the first pre-polymer. Alternatively, the second pre-polymer can be selected to have polar groups such as oxygen, amine, ether, ester, alcohol, ketone, hydroxy, epoxy, carboxylic acid, or aryl acid, without limitation, for purposes of hydrogen bonding with other polar groups of the adhesive forming polymer. Yet a third alternative is to select the second pre-polymer such that it sterically entangles or hinders the movement of opposing chains of the adhesive being formed.

Suitable second substantially water insoluble polymerizable pre-polymers having polar groups can be selected from the group consisting of alkoxy (meth)acrylates, polyester (meth)acrylate, alkoxy(alkoxy)$_n$ alkyl (meth)acrylate, (meth)acrylalkoxy phthalic acid, glycidyl (meth)acrylate, cycloalkoxy (meth)acrylate, and acyloxy (meth)acrylate wherein said alkyl moieties are from one to sixteen carbons, wherein the cycloalkyl moieties are from four to eight carbons, wherein n is an integer from one to six. Specific examples of the second substantially water insoluble polymerizable pre-polymer includes materials selected from the group consisting of butyl diethyleneglycol methacrylate, 2-methoxyethyl acrylate; 2-ethoxyethyl methacrylate; butyl diglycol methacrylate; t-butylaminoethyl methacrylate; 2-(2-oxoimidazolidin-1-yl-ethyl)methacrylate; tetrahydrofurfuryl methacrylate; tetrahydrofurfuryl acrylate; 2-phenoxyethyl acrylate; 2-phenoxyethyl methacrylate; glycidyl methacrylate; ethoxylated nonyl phenol acrylate; ethoxylated hydroxyethyl methacrylate; alkoxylated tetrahydrofurfuryl acrylate; ethoxylated nonyl phenol methacrylate; alkoxylated nonyl phenol acrylate; caprolactone acrylate; 2-acryloxy ethoxy-o-phthalic acid; 2-acryloxy-1-methylethoxy-o-phthalic acid and 2-acryloxy-1-methylethoxy-o-dihydro-(3,6)-phthalic acid.

As stated above, another alternative for the second substantially water insoluble polymerizable pre-polymers are pre-polymers that result in steric entanglement or that stericly hinder the movement of opposing chains of the adhesive forming polymer. Such prepolymers include, for example, alkyl (meth)acrylates of greater than 14 carbons, cycloalkyl (meth)acrylates, multicyclic alkyl (meth)acrylate, aralkyl (meth)acrylate, and cycloalkoxy (meth)acrylate, wherein the alkyl moieties are of at least 14 carbons, and wherein the cycloalkyl moieties are of at least 6 carbons. Exemplary of the substantially water insoluble polymerizable pre-polymer which stericly hinders the first water insoluble polymerizable pre-polymer are stearyl acrylate; stearyl methacrylate; acrylate C 18-22, dicyclopentenyloxyethyl methacrylate; dicyclopentyl oxyethyl methacrylate; isobornyl methacrylate; isobornyl acrylate; benzyl acrylate; benzyl methacrylate; cyclohexyl acrylate; cyclohexyl methacrylate; and cetyl acrylate. Some of the materials identified as participating in hydrogen bonding earlier, such as tetrahydrofurfuryl methacrylate and acrylate, and also for example, 2-phenoxy ethyl acrylate and methacrylate can also function as stericly hindering pre-polymers.

For effecting in-situ polymerization of the carrier, the carrier precursor composition typically includes a catalytically effective amount of a substantially water insoluble free radical initiator along with the addition polymerizable pre-polymer(s) and, if present, solvent. The solvent provides a medium in which the various prepolymer materials can undergo polymerization. Suitable solvents include petroleum oils, vegetable oils, vegetable oil esters, liquid hydrocarbon resins, liquid plasticizers and blends thereof. The free radical initiator is selected to have a half-life of at most 10 hours at 25° C., and more preferably at most 1 hour at 25° C. The free radical initiator needs to be soluble in the polymerizable pre-polymer material and solvent. The free radical initiator can be selected from the group of initiators comprising an azo initiator, peroxide, dialkyl peroxide, alkyl peroxide, peroxyester, peroxycarbonate, peroxyketone and peroxydicarbonate. More particularly the free radical initiator is selected from 2,2'-azobis(isobutylnitrile), 2,2'-azobis(2,4-dimethylpentanenitrile), 2,2'-azobis(2,4-dimethylvaleronitrile), 2,2'-azobis(2-methylpropanenitrile), 2,2'-azobis(methylbutyronitrile), 1,1'-azobis(cyclohexanecarbonitrile), 1,1'-azobis(cyanocyclohexane), benzoyl peroxide, decanoyl peroxide; lauroyl peroxide; benzoyl peroxide, di(n-propyl)peroxydicarbonate, di(sec-butyl)peroxydicarbonate, di(2-ethylhexyl) peroxydicarbonate, 1,1-dimethyl-3-hydroxybutyl peroxyneodecanoate, α-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di(2-ethythexanoyl peroxy)hexane, t-amyl peroxy-2-ethyl-hexanoate, t-butyl peroxy-2-ethylhexanoate, t-butyl peroxyacetate, di-t-amyl peroxyacetate, t-butyl peroxide, di-t-amyl peroxide, 2,5-dimethyl-2,5-di-(t-butylperoxy)hexyne-3, cumene hydroperoxide, 1,1-di-(t-butylperoxy)-3,3,5-trimethyl-cyclohexane, 1,1-di-(t-butylperoxy)-cyclohexane, 1,1-di-(t-amylperoxy)-cyclohexane, ethyl-3,3-di-(t-butylperoxy)-butyrate, t-amyl perbenzoate, t-butyl perbenzoate and ethyl 3,3-di-(t-amylperoxy)-butyrate.

In yet another alternative embodiment of the present invention, the carrier material may be one that is heat sensitive, i.e., one that transforms from a solid or semi-solid state to a liquid or putty-like state upon exposure to relatively low elevated temperatures. In particular, such carriers have a melting point or range above ambient temperature (~25° C.) and are substantially insoluble in the encapsulating medium and, preferably, will have substantial, or at least partial, solubility in the curable composition at temperatures above the melting point, or in and above the melting range. Preferably the carrier has a melting point or range in the range 35° C.-150° C., more preferably in the range 40° C.-85° C. Suitable heat sensitive carrier materials include polyethylene glycols, preferably having molecular weights in the range 4000 to 20,000; acid waxes; stearic acid and stearates. A particularly suitable material is polyethylene glycol of average molecular weight 4000, which is a wax. Other suitable materials are described in Cooke et. al. (U.S. Pat. Nos. 4,497,916 and 3,547,851), incorporated herein by reference.

Finally, other suitable carriers include, for example, the core materials disclosed in Gosiewski et. al. (U.S. Pat. No. 5,206,288), Cahalan et. al. (U.S. Pat. No. 4,768,523), Sataki et. al. (U.S. Pat. No. 5,814,685), Everaerts et. al. (U.S. Pat. Nos. 5,905,099 and 5,612,136), Mudge (U.S. Pat. No. 4,908,268), Sanderson et. al. (U.S. Pat. No. 4,077,926), Mancinelli (U.S. Pat. Nos. 5,225,470 and 5,006,582), Iovine et. al. (U.S. Pat. No. 4,721,748), and Petras et. al. (U.S. Pat. No. 4,061,826), all of which are herein incorporated by reference.

The encapsulated curative employed in the practice of the present invention is prepared in a two-step process, the first being the incorporation of the curative in the carrier and the second the encapsulation of the modified carrier. As will be readily apparent to those skilled in the art, any number of a variety of methods may be used for accomplishing both of these steps. However, the selection of the specific processes will depend upon a number of factors including, in particular, the materials to be used, the point at which the curative is to be incorporated into the carrier, and the manner by which such carrier materials are converted into particle form. In one embodiment where the carrier is a solid or semi-solid material, the curative is compounded or kneaded into the carrier material and, if the resultant material is sufficiently rigid, ground to the desired particle size or if not rigid, frozen and then ground to the desired particle size. For example, the curative may be incorporated into a polymer melt of the carrier or, if the carrier were a wax, the curative would be blended into the liquefied wax and then the mix hardened. Yet again, the curative could be kneaded into a soft, pliable or malleable polymeric or elastomeric carrier using a roll mixer, Banbury mixer or the like. In essence any of the known methods for incorporating a solid or semi-solid into another solid or semi-solid may be employed provided that the processing conditions are such as not to adversely affect or degrade the curative.

Where the curative is a liquid or in solution, it is possible to use a solid or semi-solid carrier that absorbs or is swelled by the liquid curative or solvent of the curative solution. In this process, the carrier acts much like a sponge, whereby liquid curative is absorbed into the carrier or, if a solution, the solvent brings the curative into the carrier. In those cases involving a curative solution, the solvent is preferably allowed to evaporate prior to encapsulating, or if the carrier following such evaporation is not in the proper particulate form, grinding the carrier prior to encapsulation. However, it is not always necessary to drive off the solvent or all of the solvent where the solvent of the curative solution acts as a plasticizer for the carrier, thus, softening the carrier to facilitate access to or exposure of the curative upon activation, without interfering with or having a detrimental impact on the performance or desired properties of the cured adhesive or sealant.

Alternatively, where the carrier itself is in solution, the curative may be added thereto before driving off the solvent and recovering the modified carrier. Alternatively, depending upon the carrier and the nature of the carrier solution, certain additives, pH adjustments and/or temperature changes and the like can be employed to precipitate out the modified carrier, Another approach to the incorporation of the curative into the carrier is by dispersing or dissolving, whether wholly or partly soluble or miscible, the curative in one or more of the precursor materials or reactants that are used to form the carrier material. If the curative is also effective in initiating, accelerating or facilitating the cure or polymerization of the carrier, then sufficient excess of the curative must be used to ensure that adequate curing agent remains in the carrier following its formation. This reaction mix may then be cured or polymerized to form the modified carrier and the so formed mass ground to the desired particle size. Alternatively, the aforementioned reaction mix or the components thereof may be added to an appropriate liquid medium and subjected to shear mixing so as to form a colloidal solution, suspension or emulsion. The colloidal solution, suspension or emulsion may then be subject to the appropriate conditions for effecting cure or polymerization of the reaction mix to form the modified carrier particles prior to encapsulation or an appropriate encapsulating material may be added to the solution for effecting encapsulation of the reaction mix droplets and thereafter forming the capsule or shell wall, with or without concurrent in-situ polymerization or cure of the carrier material. Any of the known methods for encapsulating a liquid may be employed including techniques based on interfacial polymerization, coacervation, and the like.

The amount of curative to be incorporated into the carrier depends upon the specific curative or curatives to be employed and the curable composition with which it is to be used, the method by which initiation of cure of the curable composition is to be accomplished, the anticipated weight ratio of curable composition to encapsulated cure system and, as noted above, whether the curative also participates in or is consumed by the cure or polymerization of the carrier material and/or shell wall. Generally speaking, the amount of curative will be consistent with those levels typically used to effectuate cure of the given curable composition. However, where the process by which the carrier and curable composition are mixed involves intimate mixing, e.g., repetitive kneading or mastication, it is often possible to employ lower levels of the curative for the same volume of curable composition than would be used with traditional (including traditional encapsulated) forms of the curable compositions, due to the more efficient exposure of the curative to the curable components.

When the encapsulated curative is to be employed in addition polymerizable curable compositions, the curative will be present in an amount of from about 0.1 wt. percent to about 25 wt. percent, preferably from about 1 wt. percent to about 20 wt. percent, most preferably from about 5 wt. percent to about 15 wt. percent of the carrier. Higher amounts are also contemplated; however, with such higher amount, less of the encapsulated carrier will be incorporated into the curable composition for a given particle size. Alternatively, it may be desirable to use such higher amount without changing the amount of the encapsulated curative where the level of curative is directly related to the cure speed and a higher than normal cure speed is desired. For example, extremely high-speed industrial applications may be such that cure must be instantaneous or nearly instantaneous.

Where the curative is a cross-linking or hardening agent, typically employed with step growth polymerization reactions, the amount of such curatives in the microcapsules will be considerably higher. Such curatives will typically be present in an amount of from about 2 wt. percent to about 50 wt. percent, preferably from about 10 wt. percent to about 30 wt. percent, most preferably from about 15 wt. percent to about 25 wt. percent of the carrier. More importantly, the amount of these curatives typically is dependent upon the stoichiometry requirements for the curable composition and the degree of cross-linking, as appropriate, that may be desired. Thus, higher or lower amounts may be used in the carrier particles with proper adjustment of the amount of carrier particles to be incorporated into a given amount of curable composition.

Generally speaking, the encapsulated carrier microparticles of the present invention serve as microdomains of the curing agent in a highly concentrated amount. Where the curative also serves as the curative for the carrier and/or the microcapsule walls, the curative is typically incorporated at a level that is at least 2 times, preferable at least 5 times and most preferably at least 10 times that necessary for effectuating cure of the carrier and/or wall material. In this instance, the amounts recited in the prior two paragraphs refer to the amount of curative following polymerization and/or cure of the carrier and/or cell wall, as appropriate.

The particle size of the encapsulated cure system of the present invention may vary widely depending upon the intended end-use application, the method by which the cure of the curable composition with which they are to be used is initiated and the constraints of the method by which the particles are formed. Typically, the volume weighted median particle size will range from about 2 microns to about 200 microns, preferably from about 5 microns to about 50 microns, most preferably from about 10 microns to about 20 microns. Volume weighted median particle size is determined using an Accusizer 788, made by Particle Sizing Systems of Santa Barbara, Calif.

Encapsulation of the carrier complex may be by any means known in the art. While the following discussion is predominately directed towards the encapsulation of the carrier, the same is equally applicable to the encapsulation as discrete microcapsules or domains of other components of the curable compositions, including, specifically, the liquid curable components as discussed further below. Suitable techniques include coacervation, interfacial polymerization, in-situ polymerization, air suspension, centrifugal extrusion, spray drying, pan coating, and by forming a dispersion of core material and shell material and applying a pressure shock wave to the dispersion as described in Redding Jr. (U.S. Pat. No. 5,271,881, incorporated herein by reference). The specific selection of the method and the materials depends upon the nature, including the physical state and/or chemistry, of the material to be encapsulated, e.g., whether the carrier material is in a liquid form or a solid, semi-solid or gel-like particulate form. Exemplary methods and materials are set forth in the following paragraphs as well as in, for example, Schwantes (U.S. Pat. No. 6,592,990), Nagai et. al. (U.S. Pat. No. 4,708,924), Baker et. al. (U.S. Pat. No. 4,166,152), Wojciak (U.S. Pat. No. 4,093,556), Matsukawa et. al. (U.S. Pat. No. 3,965,033), Matsukawa (U.S. Pat. No. 3,660,304), Ozono (U.S. Pat. No. 4,588,639), Irgarashi et. al. (U.S. Pat. No. 4,610,927), Brown et. al. (U.S. Pat. No. 4,552,811), Scher (U.S. Pat. No. 4,285,720), Shioi et. al. (U.S. Pat. No. 4,601, 863), Kiritani et. al. (U.S. Pat. No. 3,886,085), Jahns et. al. (U.S. Pat. Nos. 5,596,051 and 5,292,835), Matson (U.S. Pat. No. 3,516,941), Chao (U.S. Pat. No. 6,375,872), Foris et. al. (U.S. Pat. Nos. 4,001,140; 4,087,376; 4,089,802 and 4,100, 103), Greene et. al. (U.S. Pat. Nos. 2,800,458 and 2,730,456), Clark (U.S. Pat. No. 6,531,156), Saeki et. al. (U.S. Pat. Nos. 4,251,386 and 4,356,109), Hoshi et. al. (U.S. Pat. No. 4,221, 710), Hayford (U.S. Pat. No. 4,444,699), Hasler et. al. (U.S. Pat. No. 5,105,823), Stevens (U.S. Pat. No. 4,197,346), Riecke (U.S. Pat. No. 4,622,267), Greiner et. al. (U.S. Pat. No. 4,547,429), and Tice et. al. (U.S. Pat. No. 5,407,609), among others and as taught by Herbig in the chapter entitled "Encapsulation" in Kirk Othmer, Encyclopedia of Chemical Technology, V. 13, Second Edition, pages 436-456 and by Huber et. al. in "Capsular Adhesives", TAPPI, Vol. 49, No. 5, pages 41-A44A, May 1966, all of which are incorporated herein by reference.

The first step in the encapsulation process is the preparation of the discrete particles, domains or beads of the carrier material or carrier precursor materials. Where such materials are in solution or liquid form and the encapsulation is to be by way of, e.g., coacervation, interfacial polymerization, etc., the solution or liquid containing the carrier or carrier precursor material is subjected to high shear mixing or agitation to create a suspension, emulsion or colloidal system of discrete domains of the carrier or carrier precursor of the requisite size. Where the carrier is a heat sensitive material, e.g., a wax or wax-like material, the carrier, with the therein incorporated curative, is heated above its melt temperature and then subjected to a similar high shear mixing or agitation in a liquid medium, preferably water, to create discrete droplets of the carrier and then cooled to allow the solid particles to form, before encapsulating. Where the curative is incorporated into a solid or substantially solid carrier, the carrier may be ground and sorted to the desired particle size before encapsulation. Such methods, as well as additional alternative methods for preparation of the particles or discrete domains for encapsulation are widely used in industry and well known to those skilled in the art.

One preferred microencapsulation technique is coacervation wherein the material to be encapsulated is dispersed or emulsified in a liquid solution of the material to be used as the wall material. The solution is perturbed to cause a phase separation of the wall material, or at least a portion thereof, from the solvent with all or some of the wall material coating the dispersed material to be encapsulated. In this process, the wall forming material may directly separate out onto the emulsified or dispersed core material or it may form its own emulsion with the droplets of the wall material subsequently depositing on the droplets of the core material. In either case, the liquid wall material deposits itself as a continuous coating about the dispersed droplets of the internal phase or capsule core material and the wall material is then solidified. Solution perturbation can be any that affects the solubility of the wall material including changes in temperature and addition of another solvent, including, for example, the addition of a non-solvent for the wall material. It should be readily understood by those skilled in the art that the foregoing may be accompanied by a pH shift with wall materials such as gelatin to promote the phase separation in the wall formation step, as taught in Green (U.S. Pat. Nos. 2,800,457 and 2,800,458, incorporated herein by reference).

In coacervation encapsulation, the material to be coated is typically a liquid and is emulsified in the solvent to form droplets that are then coated with the wall material. Oftentimes it is advantageous to also employ an emulsification agent to assist with the emulsification of the carrier materials or precursors thereof. Preferred emulsification agents that can be used are amphiphilic, that is, they contain both hydrophilic and hydrophobic groups in the same molecule. Exemplary emulsification agents include, but are not limited to, partially hydrolyzed polyvinyl alcohol, starch derivatives, cellulose derivatives, polyacrylamide, and the like. A preferred emulsification agent for use in the invention is partially hydrolyzed polyvinyl alcohol. In a preferred method, high shear agitation is provided to the aqueous mixture to achieve a droplet size of less than about 250 microns, preferably less than 100 microns.

The conditions for encapsulation will vary based upon the choice of the material used for encapsulating the carrier complex or, as appropriate, other components of the curable composition. Selection of the encapsulating composition or materials depends upon a number of factors including the desired properties of the shell wall to be formed, the chemical composition and state of the material to be encapsulated or, in the case of a carrier to be cured or polymerized in-situ after or concurrent with formation of the shell wall, the carrier precursor materials, including the curative, and the method employed for the encapsulation process. Desired properties of the shell wall include strength, breakability, and impermeability, at least with respect to the curative in the case of the encapsulated carrier complex, particularly where the carrier is of a composition that allows for the migration of the curative within the carrier or the blooming of the curative from within the carrier. Suitable materials for forming the polymer shell include any of those know in the art for encapsulation, particularly the encapsulation of liquid droplets or solid particles. Exemplary shell wall materials include natural materials such as gelatin, gum arabic, starches, sugars, shellac, and rosin; cellulose derivatives, such as ethyl cellulose and carboxymethylcellulose; paraffin; tristearin; polymers such as polyvinyl alcohol, polyethylene, polypropylene, polystyrene, polyacrylamides, polyethers, polyesters, polyamides, polybutadiene, polyisoprene, silicones, epoxies, and polyurethanes; formaldehyde resins such as reaction products of formaldehyde with phenols, urea, and melamine; and copolymers such as polyurethane copolyethers. Polyvinyl alcohol is a preferred wall material for use in coacervation encapsulation. Specific shell wall materials will be described in greater detail below.

The shell wall may be a rigid material or a flexible material so long as the wall ruptures under the conditions for initiating polymerization, curing or cross-linking of the curable composition. For the purpose of this application, it is understood that reference herein to "initiation" or "initiating" polymerization, curing or cross-linking includes that step where the curative is brought into direct contact with or otherwise made available to the polymerizable components of the curable composition, regardless of whether actual polymerization, curing or cross-linking is concurrently effected. For example, in activated anaerobic curable compositions, the polymerization is 'initiated'; however, polymerization is inhibited due to the presence of oxygen. Similarly, a heat-activated curative may be intimately mixed with the curable component of the curable composition, but polymerization does not occur until the proper temperature is attained to effectuate heat activation. In essence, but for the absence of a physical or environmental condition or a chemical co-reactant which is inherently supplied by the substrate upon which the adhesive is applied or to be applied, polymerization or cure would commence.

The thickness of the shell wall may vary widely and may range from an extremely thin film that provides no or little structural effect but merely serves as an impermeable or low permeability barrier for the curative to a shell wall having structural integrity of its own. Such thin walls are particularly suitable for those curing systems wherein the carrier is a stiff or rigid material. Alternatively, thicker shell walls may be employed, especially where the microcapsules during the formulation or application of the adhesive or sealant composition or the substrates to which it is applied are subject to extensive shear conditions, strong forces, excessive handling, etc. Thicker walls are also appropriate where the carrier is very soft or thixotropic in nature and, by itself, provides little or less than desired resistance to deformation.

Permeability refers to the ability of the shell wall to provide adequate protection against the ingress and/or egress of materials into or from the microcapsule that may otherwise affect the shelf life of the microcapsules and/or the adhesive or sealant formulation into which they are incorporated. Thus, the shell wall may be permeable to certain materials so long as it does not adversely affect the utility and efficacy of the microcapsules for their defined life, which life is typically three months, preferably six months or more.

Generally speaking, it is an objective of the present invention to employ thin shell walls, especially shell walls thinner than are traditionally used for or found with current microencapsulated one-part adhesive systems; though, of course, such thinner walls are not required and traditional thickness walls may also be used. However, the use of thin shell walls is especially desirable as their use means that more of the components necessary for forming the adhesive or sealant and less inert, filler material, as represented by the shell wall, are present in a given volume of adhesive or in the bond site. Typically, in accordance with the practice of the present invention, the shell wall will comprise from about 0.8 wt. percent to about 25 wt. percent, preferably from about 2 wt.

percent to about 12 wt. percent, most preferably from about 4 wt. percent to about 10 wt. percent of the whole of the curing system.

Dyes, pigments, fillers, plasticizers, cross-linking agents, binding agents, and other additives can be incorporated in the capsule wall or applied to the capsule wall surface. One important parameter to keep in mind when formulating wall materials is permeability. Generally, the wall material should have low permeability, at least with respect to the material to be encapsulated. No or low permeability of the capsule wall is particularly important with respect to the curative in the carrier so as to prevent loss of the curative and premature polymerization of the curable composition. Likewise, it may be important for the capsule wall to be impermeable or of low permeability to the curable component of the curable composition so as to prevent any ingress of the same into the carrier particles. Dependent upon the encapsulated material, it may also be desirable to formulate the wall material to have low permeability to certain gases such as oxygen or low permeability to liquids such as water or solvents such as toluene or tetrahydrofuran. The requisite permeation rates will vary for each system, but can be met by judicious choice of the wall material and by degree of cross-linking of the wall material. Generally, as cross-linking increases, the permeation rate decreases.

As noted above, any or a number of different processes may be used to encapsulate the components of the curable compositions and curative complex. One preferred technique is to polymerize the capsule wall material in-situ. In this technique, monomers or oligomers are dispersed on the material to be encapsulated and then polymerization is effected by addition of a reactive species, such as a co-monomer or radical initiator, a curing agent or by heat or ultraviolet radiation. Optionally, the capsule wall material may be cross-linked in-situ by addition of cross-linking agents or by treatment with heat or ultraviolet radiation or radical initiators. The method of polymerizing or cross-linking the capsule wall material will vary based upon the choice of wall materials and based upon the material being encapsulated. A number of specific methods and shell wall forming compositions are as set forth below.

When the walls of the microcapsules are comprised of polyamide or polyurea, a preferred encapsulation technique is interfacial polymerization. This can be effected by mixing the adhesive monomer or monomers to be microencapsulated together with either an acid chloride or an isocyanate. The resultant mixture is emulsified with an emulsification agent to obtain an oil-in-water emulsion. A polyfunctional amino compound is then added into the emulsion, whereby microcapsule walls are formed around each microparticle of oil. When an acid chloride is mixed with the polyfunctional amino compound, a polyamide microcapsule is produced— when an isocyanate is used, polyurea capsules are formed. Though reference is made to microparticles of the oil phase, it is also understood that the dispersed phase is also referred to herein as "domain", "bead" or "droplet" and the like.

Acid chlorides that can be used in the invention to produce polyamide microcapsules include, but are not limited to: terephthaloyl chloride, isophthaloyl chloride, 1,3,5-benzenetricarboxylic acid chloride, sebacyl dichloride, 4,4-sulfonyidibenzoyl chloride, 1,3-benzenedisulfonyl chloride, 1,4-benzenedisulfonyl chloride, or mixtures thereof. A preferred acid chloride for use in the invention is a mixture of isophthaloyl chloride and terephthaloyl chloride.

Isocyanate compounds that can be used in the invention to produce polyurea microcapsules include, but are not limited to: 2,4- and 2,6-diisocyanatotoluene, 4,4'-diisocyanatodiphenyl methane, 1,3,5-trimethylbenzene-2,4-diisocyanate, 1,6-diisocyanatohexane, polymethylene polyphenyl isocyanate, polyisocyanates which additionally contain biuret-, allophanate-, and carbodiimide groups, and the like.

Examples of polyfunctional amines that can be used in the invention include, but are not limited to: ethylene diamine, diethylene triamine, triethylene tetramine, tetraethylene pentamine 1,6 hexanediamine, polyethyleneimine, bis-hexamethylenetriamine, and the like.

Matson (U.S. Pat. No. 3,516,941) teaches polymerization reactions in which the material to be encapsulated, or core material, is dissolved in an organic, hydrophobic oil phase which is dispersed in an aqueous phase. The aqueous phase has dissolved aminoplast resin forming materials that upon polymerization form the wall of the microcapsule. A dispersion of fine oil droplets is prepared using high shear agitation. Addition of an acid catalyst initiates the polycondensation forming the aminoplast resin within the aqueous phase, resulting in the formation of an aminoplast polymer that is insoluble in both phases. As the polymerization advances, the aminoplast polymer separates from the aqueous phase and deposits on the surface of the dispersed droplets of the oil phase to form a capsule wall at the interface of the two phases, thus encapsulating the core material. Polymerizations that involve amines and aldehydes are known as aminoplast encapsulations. Urea-formaldehyde, urea-resorcinol-formaldehyde, urea-melamine-formaldehyde, and melamine-formaldehyde, capsule formations proceed in a like manner. In interfacial polymerization, the materials to form the capsule wall are in separate phases, one in an aqueous phase and the other in an oil phase. Polymerization occurs at the phase boundary. Thus, a polymeric capsule shell wall forms at the interface of the two phases thereby encapsulating the core material. Interfacial polymerization is particularly useful for wall materials such as polyesters, polyamides, and polyureas.

Gelatin and gelatin containing microcapsules wall materials are well known and are typically used in coacervation and phase separation encapsulation processes. One preferred technique for gelatin/gum arabic encapsulation involves first emulsifying the core material into a gelatin solution to obtain an oil-in-water emulsion. The emulsion is mixed with a gum arabic solution. The system is then pH adjusted or diluted to cause the gelatin/gum arabic to coacervate. Thereafter, the capsules are post-treated with a cross-linking agent, such as formaldehyde, glutaraldehyde, or other similar known compounds.

Wall materials made of melamine-formaldehyde can be made by first emulsifying the core material into a carboxyl methylcellulose solution or a poly(styrene-maleic anhydride) solution to obtain an oil-in-water emulsion. The emulsion is then mixed with a melamine-formaldehyde precondensate solution. The system is then pH adjusted, followed by heating to initiate polymerization of the precondensate to a high molecular weight compound. The presence of the carboxyl methylcellulose or poly(styrene-maleic anhydride) solution helps the polymerized melamine-formaldehyde to deposit onto the core material surfaces, thereby encapsulating the core. An alternative method polymerizes the melamine and formaldehyde in the presence of a styrene sulfonic acid. Yet, another alternative and a preferred embodiment of the melamine-formaldehyde resin wall forming process employs polyacrylic acid and/or polyacrylic acid derivatives and the like as emulsifiers to assist in forming the oil in water emulsions. Such emulsifiers preferably have an HLB value of from about 8 to 18.

Alternatively, the wall material can be formed by free-radical polymerization and/or cross-linking. This is especially useful for wall materials such as polyvinyl chloride, polystyrene, acrylic esters (e.g. alkyl acrylate-acrylic acid copolymers), unsaturated polyesters and the like. The free radical reaction can be initiated by heat, ultraviolet radiation or by addition of initiators such as benzoyl peroxide, t-amyl peroxyneodecanoate, t-amyl peroxypivalate, t-amyl peroxy-2-ethyl-hexanoate, t-butyl peroxyisobutyrate, t-amyl perbenzoate, di-t-butyl peroxide, 2,2'-azobis(2-methylbutyronitrile), 2,2'-azobis(2,4-dimethylvaleronitrile), 2,2'-azobis(2-methylpropanenitrile), and the like.

When the walls of the microcapsules are comprised of epoxies, suitable components include difunctional or polyfunctional epoxies such as vinylcyclohexene dioxide, 3,4-epoxycyclohexylmethyl-3,4-epoxycyclohexanecarboxylate, bis-phenol-A-digylcidyl ether and the like. These can be used in combination with polyols such as glycerol. One convenient method of forming microcapsules involves forming an emulsion of the material to be encapsulated, adding a combination of the di- or polyfunctional epoxide with the polyol to coat the material to be encapsulated and then adding an acid to effect the polymerization and form the polyepoxide. Suitable acids include Bronsted acids such as hydrochloric acid or sulfuric acid and also Lewis acids such as boron trifluoride, antimony pentafluoride and the like.

The pre-applied adhesive and sealant compositions employed in the practice of the present invention may be prepared by any of the known methods for formulating and preparing pre-applied adhesive and sealants. As noted above, the key aspect according to the practice of the present invention is the use of the herein described encapsulated carrier complex. Typically, the encapsulated materials or microcapsules, as they are often referred to, are dispersed in an appropriate binder. The choice of the binder will depend upon a number of factors including the composition of the wall material and the substrate to which they are to be applied, the environment in which they are to be applied and/or used, and the method by which the pre-applied adhesive is to be applied to the surface of the stock material.

As noted above, in preparing the adhesive and sealant compositions for application to the stock material the capsules are dispersed in a binder material. It is possible that each type of microcapsules may be dispersed in a separate portion or component of the binder system and then combined, each may be added sequentially to the binder system or they may be added concurrently. Because of the use of the carrier complex, concerns of premature curing due to fracturing the microcapsules during preparation are lessened, if not eliminated; however, it is still desirable to minimize the shear forces exerted on the microcapsules, especially those containing the liquid curable component. This becomes more of an issue with higher viscosity binder systems as opposed to the low viscosity binders comprising a polymer binder in solution.

The binder system may be a curable binder system using the same or similar curable or polymerizable materials as are useful for forming the shell wall and/or the adhesive or sealant. Suitable curable binder systems include those based on the reaction of an anhydride and arylenes, alkylenes, alkoxylenes, alkarylenes, aralkylenese, alkoxyalkylenes, aryloxyalkylenes and aryloxyarylenes.

Alternatively, suitable binders also include water-soluble binding agents such as polyvinyl alcohol, styrene-maleic anhydride copolymers and gelatin as well as solvent soluble binding agents such as chloroprene, polyester acrylates, urethane acrylates, carboxyl- or hydroxy-modified vinylchloride-vinylacetate copolymer, cellulose actetate, epoxides, polyterpenes, hydroxypropylcellulose, hydroxyethylcellulose, sodium carboxymethylcellulose, poly(glycolic acid), poly(lactic acid), copolymers of the foregoing, poly(aliphatic carboxylic acids), polycaprolactone, poly(acetals), poly(lactic acid-caprolactone), poly(glycolic acid-caprolactone), polyanhydrides, albumin, casein, butyrate resins, polyvinylacetate, polyesters of dibasic acids and diols, polyvinylchloride, polyvinylbutyral, polyvinyl formal, varnish-based and tar-base resins, and waxes and the like. Organic solvents for the latter include chlorinated solvents such as trichloroethylene, trichloroethane, methylenechloride; chlorinated/fluorinated hydrocarbons solvents such as monofluorotrichloroethane and dichlorodifluoroethylene; hydrocarbon solvents such as hexane, and pentane; alcohols such as ethanol and isopropanol, and lacquer solvents such as methyl ethyl ketone, toluene, and benzene.

Additional binder systems are disclosed in, for example, Park et. al. (U.S. Pat. No. 5,827,924), Matsuo (U.S. Pat. No. 6,025,074), and Bachmann et. al. (U.S. Pat. No. 3,814,156), herein incorporated by reference and elsewhere and are well known to those skilled in the art.

Particularly desirable binder systems are those that are photopolymerizable, i.e., cure or polymerize upon exposure to light, preferably UV light. Such binder systems may comprise any of the above-mentioned free-radically curable monomers, oligomers and/or pre-polymers and an appropriate photoinitiator therefore and/or a photosensitizer. Suitable photoinitiators include, among others, benzoin and its derivatives, benzophenones and their derivatives, xanthones, benzyl, benzilketals (especially benzildimethylketal), acetophenones and their derivatives (especially $\alpha,\alpha$-diethoxyacetophenone), $\alpha$-hydroxyalkylphenones, o-acyl-$\alpha$-aminoketones, acylphosphine oxides especially 2,4,6-trimethylolbenzoyidiphenyphosphine oxide) and acylphosphonates. Additional photoinitiators include substituted pyrylium salts or anthracene and derivatives thereof, e.g., substituted anthracenes, or anthraquinone or ketocoumarine derivatives. Photoinitiators are typically used in an amount within the range of about 0.5% to about 10% by weight of the composition, with about 2% to about 4% or greater by weight of the total composition being desirable. Alternatively or in addition, the photopolymerizable binder may include a photosensitizer. Suitable photosensitizers include benzophenone or dyes like eosin, fluorescein, thiazole dyes, thiazine dyes, oxazine dyes, azine dyes, aminoketone dyes, xanthene dyes, acridinium dyes or phenazine dyes. Inclusion of such photosensitizers often lessens the intensity and/or duration of exposure to the radiation used to initiate cure. As a general guide, for photoinitiated polymerizations, it is also desirable to use a photoinitiated radical generating component, such as peroxides, peresters, azo compounds, benzoin derivatives, alpha-halo acetophenones, or acylphosphine oxides, in an amount within the range of about 0.005% to about 4% or greater (desirably within the range of about 0.01% to about 1.5%) by weight of the total composition.

Though the foregoing discussion has been primarily with respect to free-radical photopolymerization, it is also understood that suitable binder systems may be photoionically activated as well. Suitable cationic photoinitiators include the iodonium salts, especially the diaryliodonium salts. Such iodonium salts are described in U.S. Pat. Nos. 3,729,313; 3,741,769; 3,808,006; 4,250,053 and 4,394,403. The iodonium salt can be a simple salt, containing an anion such as chloride, bromide, iodide, antimony pentafluoride or arsenic hexafluoride or the like. Mixtures of iodonium salts can be used if desired. Typically the iodonium cationic photoinitiators are used in combination with a sensitize and an electron donor compound. Accordingly, selection of a particular iodonium salt may depend to some extent upon the particular polymerizable component, sensitize and donor chosen.

The binder compositions may also include other ingredients including curatives and additives for the adhesive or sealant composition provided that in the case of curatives, the curative contained in the binder is not such that premature rupture of the microcapsules containing the curable components of the curable compositions will allow premature curing or polymerization thereof. Thus, for example, an accelerator may be dispersed in the binder so long as the initiator for the given curable composition is in the carrier.

The amount of the encapsulated components to be incorporated into the binder varies depending upon the method and rate of application, the nature and/or composition of the binder, and the amount of adhesive or sealant material needed to effectuate the desired bond or seal. Binders comprising a binder polymer in solution will generally have lower levels of the encapsulated components than liquid curable binder systems. For example, the binder in solution based pre-applied adhesive and sealant compositions may comprise less than about 30%, preferably less than about 25%, or the binder, based on the total weight of the binder solids and encapsulated materials. On the other hand, with 100% solids binders, e.g., UV curable binders, the binder may comprise about 40% or more, preferably about 45% or more of the 100% solids binder, based on the total weight of the binder and encapsulated materials.

Typically, it is preferred to minimize the amount of binder material while concurrently maximizing the amount of the curable composition to allow for the most efficacious bond or seal. Generally speaking, the amounts will be consistent with those used with conventional encapsulated adhesives and sealants. As to the ratio of encapsulated carrier complex to encapsulated liquid curable component, that ratio depends upon a number of different parameters including the type of curable composition, i.e., whether it is an addition polymerizable system or a step growth polymerization system; the degree of polymerization or cure desired; the amount and/or stoichiometry of the curable components, the amount of curative in the carrier particles, and the like. Those skilled in the art will readily recognize or be able to determine the proper level of incorporation. Most often one would employ that amount of encapsulated carrier complex particles which contains the same amount of curative as would be employed were the carrier not present, i.e., in a traditional encapsulated system.

The encapsulated adhesive compositions may be applied to the stock packaging materials by any conventional process using conventional "converting" or application equipment and machinery. Exemplary methods include, without limitation, roll coating, painting, extrusion, dry-brushing, spraying, slot-coating, swirl spraying, printing (e.g., ink jet printing), flexography printing, gravure printing, screen printing, stencil printing and the like. Preferably the method is one of the printing methods. The adhesive composition may be applied in the desired pattern to preformed blanks, or to the bulk raw stock packaging materials, e.g., large rolls and sheets of the stock material from which the blanks are cut. In each of the latter cases, the rolls or sheets will be indexed so that when the stock material is fed to the cutting apparatus, the cuts will properly align with the pre-applied adhesive pattern, as appropriate. The stock packaging materials with the pre-applied adhesive may then be stored or shipped to another facility for storage and/or immediate use.

The specific method and equipment employed for applying the pre-applied adhesive depends upon a number of factors such as the nature and type of stock packaging material to be converted; the nature of the adhesive composition to be applied; the size, shape, placement, pattern, amount, etc. of the adhesive to be applied; the method of cure of the binder; etc. Though the adhesive may be applied in a number of different patterns, including dots, raised pyramids, etc., preferably the adhesive is applied in strips or lines, oftentimes with a plurality of side-by-side lines or strips, at the bonding site: the specific pattern depending upon the use of the packaging and the amount of adhesive needed at the bond site. Those skilled in the art will readily recognize the needed pattern for the particular application as well as suitable application methods and apparatus for providing the needed pattern. Furthermore, simple experimentation, as well as past experience with traditional adhesives, will allow the user to readily determine the amount of adhesive to be pre-applied for any specific application. In this respect, application rate refers not only to the pattern but to the amount of adhesive to be applied per linear inch of the bond seam as well.

Figure 2:
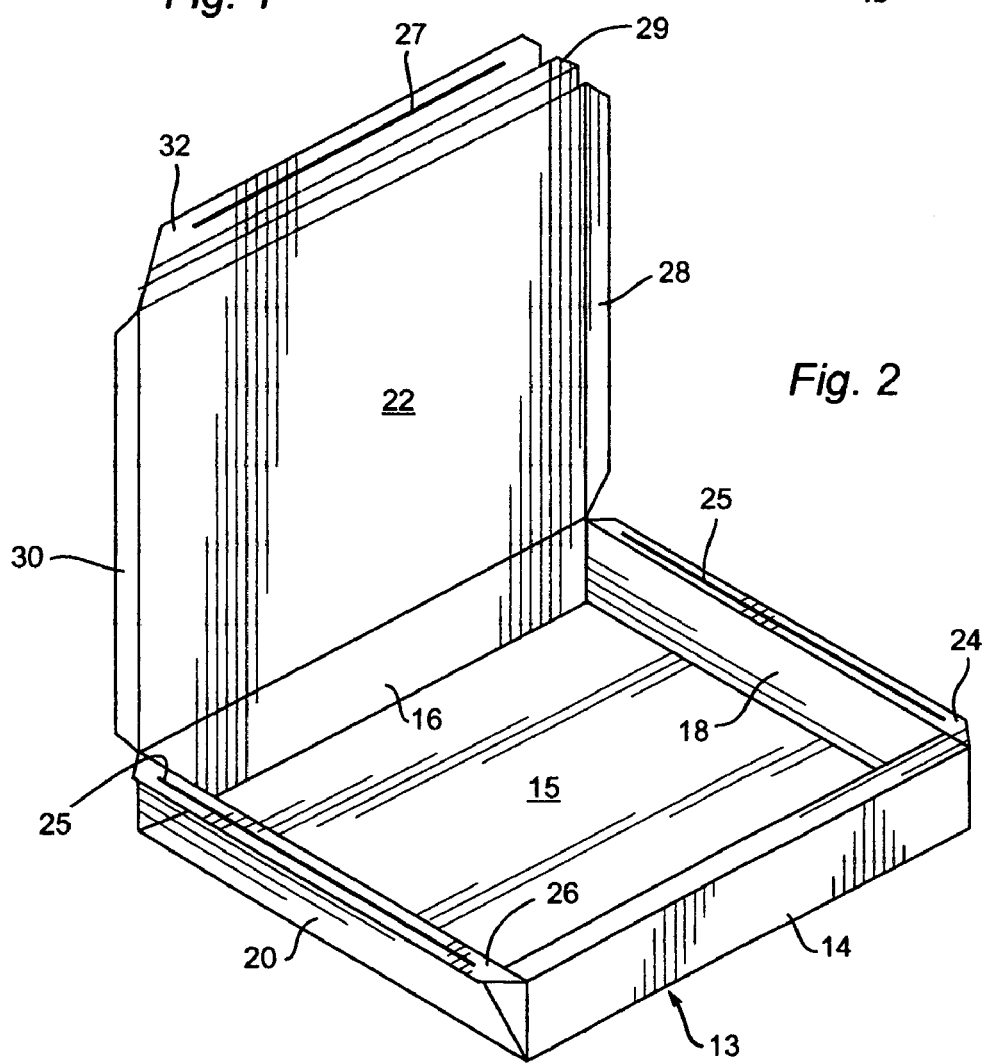
FIG. 2 is an elevated perspective view of a partially formed top-lid box.

Generally speaking, the adhesive composition will be applied in-line in a high-speed industrial converting process whereby the stock packaging materials are prepared/converted for subsequent use in packaging forming and packaging forming, filling and closing operations. Another preferred embodiment is that where the same high-speed industrial conversion process also includes a step for the partial assembly or formation of the final packaging, e.g., the formation of a food tray, as shown in FIG. 2, that is stored for use in a subsequent filling and closing operation. Here, the application of the adhesive is performed at one of possibly several workstations in the conversion process. In both instances, the stock packaging materials having the pre-applied adhesive are then shipped, transported and/or stored on-site or elsewhere until needed in the final assembly and, preferably, filling and closing processes. By these methods, even if problems are encountered in the conversion process, particularly with the application of the adhesive, there is no impact upon the actual packaging manufacturing and/or filling/closing processes since those processes employ the already finished and stored stock packaging materials. Furthermore, any adversely affected converted stock materials can be readily identified and removed from the production output before they find their way to their end-use application.

The conversion processes, like the end-use application processes, may be continuous or discontinuous, i.e., stop and go, to allow for each workstation to complete its intended task. For example, following the workstation at which the adhesive is applied, there may be a workstation which provides environmental conditions favorable for the cure or setting of the binder composition so that the pre-applied adhesive is securely bonded to the stock material and dry-to-the-touch or substantially so. Following conversion, the stock materials made in accordance with the practice of the present invention are stored at the conversion site or shipped and stored in a storage facility or at the point of end use until needed.

As noted at the outset, the practice of the present invention is applicable to a number of different types and configurations of packaging. For convenience and to better help in understanding the present invention, FIGS. 1 through 5 depict a number of different stock packaging materials, including semi-finished packaging materials, within the scope of the present invention.

FIG. 1 shows a typical courier or express mail type paperboard envelope blank 1 having two panels 2 and 3 (each having an inner and an outer face, the former of which is visible in the figure); two side-flaps 4a and 4b, each having a pre-applied adhesive 8 according to the invention; and a closure flap 5. The first step in forming the envelope is to fold the two panels along seam 10 so that the inner faces oppose each other. Then the adhesive 8 on each of the side-flaps is activated by an appropriate activator means (not shown) and the side-flaps are quickly folded along seams 12a and 12b onto the outer surface of panel 2, thereby creating a pouch or envelope. Although these operations could be done manually, they are preferably done in an automated package forming system where the packaging blank moves along a conveyor in the direction of the arrow with each side-flap along or extending over the edge of the conveyor so as to be readily accessible to an activator means. The envelope or pouch may then be stored for subsequent distribution and/or use. For example, these envelopes may be employed as Express Mail, FedEx, UPS mailers and the like. In this instance, the closure flap 5 will have a pre-applied pressure sensitive adhesive with a protective release liner overlaying the pressure sensitive adhesive 6. During use, the sender will insert the appropriate materials into the envelope, remove the release liner and fold the closure flap 5 along seam 11 to mate with the outer surface of panel 2 and thereby sealing the envelope. The recipient will open the envelope by pulling on tear strip 7.

Alternatively, the packaging blanks of FIG. 1 are especially suited for use in high-volume, high-speed industrial mailing operations where the packaging blank or the semi-finished packaging envelope formed above, is automatically stuffed and closed. In this instance, the closure flap 5 preferably has a strip of the pre-applied encapsulated adhesive 6. As in the preceding paragraph, the packaging blank moves along the conveyor in the direction of the arrow through the envelope forming stations. Rather than removing the semi-finished envelope, the envelope then proceeds to a workstation that rotates the envelope 90° so that the opening is to one edge of the conveyor so as to allow a stuffing apparatus to insert the appropriate materials. Alternatively, rotation may be accomplished by passing the envelope from one conveyor to another, each of which moves perpendicular to the other. The stuffed envelope then passes through a second activator station which activates the adhesive 6 following which a closure station folds closure flap 5 onto the outer surface of panel 2. In a finishing step, the sealed packages then may pass through a printing or label means that applies the appropriate address to the packaging. Alternatively, the stuffing and sealing may be done on two different assembly lines in the same or different locations whereby the operation employs a semi-finished envelope, as formed in the preceding paragraph, having the pre-applied encapsulated adhesive rather than the pressure sensitive adhesive.

FIG. 2 shows a semi-finished carton 10 typical for prepared foods that are to be frozen for storage and subsequently reheated for consumption. Such packaging are typically made of paperboard and are coated on their internal surfaces with a heat resistant coating, most typically a thermosetting polyester of about 1 mil thickness. The carton 10 has four side panels, 14, 16, 18 and 20, a closure panel 22 and a bottom panel 15. Preferably, the lengths of the bottom edges of the side panels along the bottom panel are shorter than the lengths of the upper edges that mate with the closure panel so that the carton tray defined by the side panels and the bottom panel will easily stack, one inside the other. Extending from side panels 18 and 20 are flanges 24 and 26, respectively, which have an encapsulated pre-applied adhesive 25 according to the present invention. These flanges will mate with corresponding flanges 28 and 30 extending from the sides of the closure panel 22. Closure panel 22 also has a closure flap 32 extending from its free edge, i.e. that opposite side panel 16, having a pre-applied adhesive 27 for mating the closure flap 32 to the outer surface of side panel 14. Typically, the closure panel will also have an integrated tear strip 29 for ease of opening.

The semi-finished cartons 10 of FIG. 2 can be readily employed in high-volume, high-speed industrial filling and closing operations, particularly food packaging operations, whereby a conveyor means carries the semi-finished carton past a filling station that fills the carton tray with the foodstuff and, subsequently, sequential activator and closure means for sealing the filled carton. Though not critical, it is preferred that the respective flange elements are first sealed before the closure flap. In a continuous operation, the carton will be rotated 90° to allow for activation of the one following activation of the other. Because such packaging is already formed, filled and closed using conventional packaging adhesives, those skilled in the art will readily recognize the alterations that will be needed for integrating the activator means into the conventional apparatus while concurrently removing the prior art adhesive dispensing and/or heating means.

Figure 3:
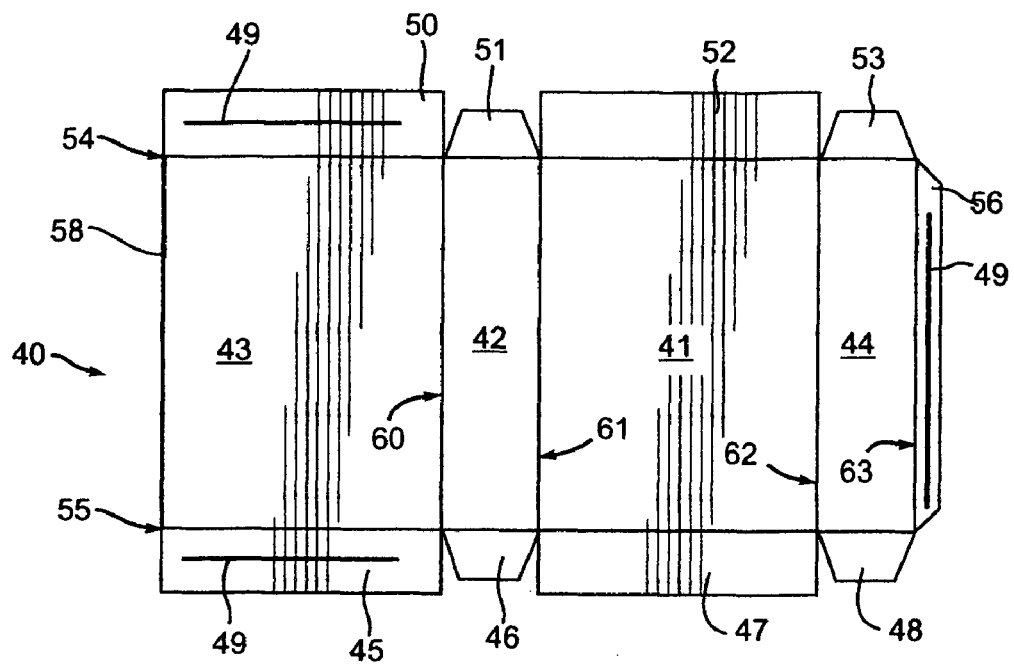
FIG. 3 is a plan view of a carton blank.
Figure 4:
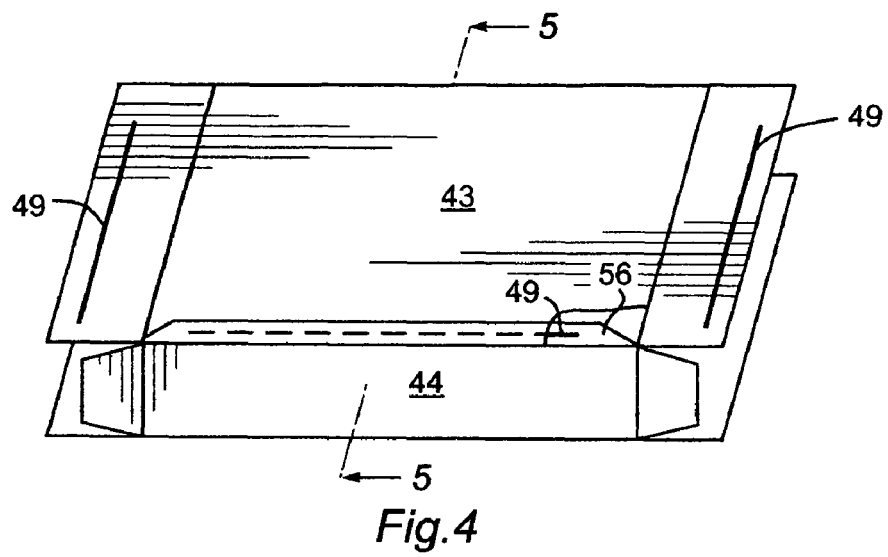
FIG. 4 is a perspective view of a partially formed paperboard carton.
Figure 5:
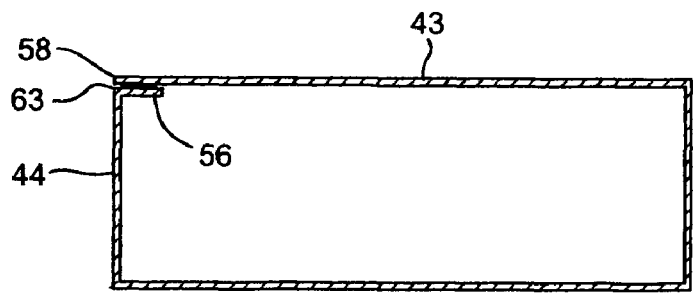
FIG. 5 is a cross-sectional view of the partially formed paperboard carton of FIG. 4 along line 5-5.

FIGS. 3 through 5 show a shied flap paperboard packaging typical for use in packaging of dry goods, such as cereals, cake mixes, cookies and the like at various stages of construction. FIG. 3 shows the raw packaging blank 40 having a front panel 41; a back panel 43; two side panels 42 and 44; upper and lower minor flaps 51 and 53 and 46 and 48, respectively; upper and lower inner major flaps 50 and 45, respectively; upper and lower outer major flaps 52 and 47, respectively; and seam flap 56 extending from side panel 44. As shown, lower inner major flap 49, upper inner major flap 50 and seam flap 56 all have a pre-applied encapsulated adhesive on their outer surfaces. Of course, the adhesive could just as easily be applied to the inner surfaces of the upper and lower outer major flaps. The upper flaps all extend from the upper edge of each of the front, back and side panels along fold 54. Similarly, the lower flaps all extend from the lower edge of each of the front, back and side panels along fold 55.

In forming the carton, the first step is the activation of the adhesive 49 on the seam flap 56 and folding the blank inward along folds 60, 61, 62, and 63 so that the activated adhesive on seam flap 56 comes in contact with the inner surface of the back panel 43 such that fold 63 overlies and is parallel with edge 58. This configuration is more clearly shown by the cutaway section in FIG. 4 as well as the cross-sectional view of FIG. 5 taken along line 5-5 of FIG. 4. The resultant construction is that of a rectangular tube, which is readily collapsible into a flat paperboard semi-finished blank along folds 61 and 63 or 60 and 62 for storage and/or transport.

The second step in forming the carton is to square the carton blank, if folded or collapsed, and then the folding in of lower minor flaps followed by the sequential folding in of the lower inner major flap 45 and, subsequently, lower outer major flap 47 with activation of the adhesive taking place prior to, concurrent with or following the folding in of the lower inner flap but prior to folding in or the mating of the same with the lower outer major flap 47. The semi-finished package resulting from this second step is an open-ended carton. This open-ended carton may then be filled and, subsequently, closed and sealed. Closure or sealing involves the upper minor and major flaps and is accomplished by the identical steps employed in closing and sealing the lower minor and major flaps.

As shown more clearly in FIG. 4, the pre-applied adhesive on each of the upper and lower inner major flaps is parallel with and towards the outer edge of the flap to accommodate the shied flap construction. Were the major flaps to extend the full width of the packaging, i.e, the height of the major flaps be the same as the width of the side panels, then the adhesive would be more centered or more towards the folds 54 and 55 on the inner major flaps. FIG. 4 also shows that the pre-applied adhesive is preferably in the form of a continuous strip that begins close to the leading edge of the seam flap and the inner major flaps and ending some distance from the trailing edge—reference here to leading and trailing edge is in relation to an automated formation and assembly process whereby the blank is carried on a conveyor means with the leading edge being that portion of the blank which first enters each work station. The adhesive is pre-applied in this pattern to accommodate the fact that the preferred activator means actually lifts the pre-applied adhesive from the surface of the flaps and subsequently deposits the activated adhesive some distance from the point at which it first encounters the adhesive, as discussed in more detail below.

Those skilled in the art will readily recognize that the packaging blanks of FIG. 3 are readily useful in high-speed, high-volume package formation, filling and closing operations using conventional apparatus with the exception that the apparatus will have an activator means, as described in more detail below, instead of traditional adhesive applicators and/or heaters. Furthermore, because the encapsulated adhesives cure very quickly, if not instantaneously (i.e., within a second or two, preferably less than a second, most preferably less than one-half second), there is no need to have long conveyor lines or cooling means to allow sufficient cooling before the semi-finished good can be employed in the next step of the forming, filling and closing process as found with traditional packaging adhesives. In this respect, cure may not be 100% completed, but sufficient cure has taken place in this time frame that the flaps remain bonded in spite of the natural flex or tendency of the flaps to open once the mating pressure or forces are removed. It should be noted that once activation is achieved, the bond area is subject to compressive forces to ensure contact between the activated adhesive and the mating surface. Apparatus for achieving this are well known in the art and are employed with conventional packaging adhesives. However, in accordance with the present invention, the time for which such compressive forces must be applied is less, preferably substantially less, than with such conventional adhesives due to the quick cure capabilities of the adhesives of the present invention.

As noted earlier, activation of the pre-applied adhesive or sealant is achieved through a high shear mixing or, in the case of a carrier which flows upon exposure to low temperature heat, moderate shear mixing combined with heating. Because of the unique physical characteristics of the carrier, most conventional processes for activation pre-applied adhesive and sealants (e.g., press fit, finger pressure, single roll or blade press) will not be sufficient to expose or make available sufficient amounts of the curative to effectuate adequate cure of the curable composition. While some release and cure may be found, such would likely be only sufficient to provide a tack bond or a slight viscosity increase in the curable composition. Instead, there must be sufficient kneading of the carrier complex and the curable components to ensure full activation. By creating and using pre-applied adhesives that require a higher threshold of mixing to activate, one is able to avoid problems of premature curing, unintended bonding and the like oftentimes found with conventional pre-applied materials.

Activation of the pre-applied adhesive may be accomplished manually or, preferably, automatically by an activator means, i.e., an apparatus or machinery. If manual, a blade or other like instrument will have to be repeatedly scored over the pre-applied adhesive composition with sufficient pressure to rupture the microcapsules and mash or masticate the carrier so that sufficient curative is exposed to and intermixed with the liquid curable components. Whichever means is employed, it is important that the surface of the stock material being acted upon is planar or substantially so or, if non-planar, is of a contour that matches the shape or contour of the activator means.

In the preferred embodiment, activation of the pre-applied adhesive will be achieved through an automated activator means, either a stand alone apparatus or machinery that activates the pre-applied adhesive or one that is integrated into a larger industrial assembly or manufacturing process. Though there is a large zone of overlap in terms of when each may be used, where the cure speed of the activated curable composition is very fast, on the order a second or less, in-line automated activation and assembly will be needed. Slow cure speeds, e.g., where there is a long open time, are especially beneficial when the activator means is a stand-alone apparatus or where the subsequent assembly step is a manual step as opposed to an automated step or where in an automated system, the activator means must be retracted from the activation site before the surfaces to be bonded may be mated.

With an in-line activator means, the activator means may be stationary or attached to or part of a robotic arm or like apparatus. In the latter situation, which is especially suited to allow for its use with stock packaging materials that have an obstructed path, the activator means is capable of movement from an active mode where it is in-line in the activation workstation and an idle mode where it is off-line and retracted from the actual working site of the activation work station. Alternatively, the latter situation may be such that the activator means, during the activation step, is not stationary relative to the assembly line apparatus but moves such that the activator passes over or swipes across those sections of the stock material to which the pre-applied adhesive is applied as the stock material passes through the work station, either in a continuous or discontinuous fashion. In either respect, these apparatus are directly integrated into the assembly line and, for existing lines, can replace those workstations that previously applied a liquid or flowable adhesive and, if present, cured the same or, where appropriate, the heating stations employed with conventional pre-applied packaging adhesives.

An especially preferred embodiment of the present invention is that where the stock material is flat or is such that it allows for the activator means to act upon the pre-applied adhesive without movement thereof, even as the stock packaging material traverses through the activator workstation. In this instance, the process is a continuous whose speed or level of output is only limited by the speed or output of the remaining steps of the packaging formation and, if appropriate, filling and closing operations. In essence, the present invention provides processes where the adhesive application and/or bonding steps are no longer the bottlenecks.

Thus, stock packaging materials made in accordance with the teaching of the present invention are especially suited for high-speed, including extremely high-speed operations. Exemplary of such an operation would be a packaging operation where the paperboard blanks traverse through the assembly line at speeds of up to 300 feet per minute and higher. Even with less than optimal activation, rates of up to 250 feet per minute or more can be successfully attained. Such high rates of assembly are in marked contrast to most traditional, automated assembly operations that only achieve rates on the order of 150 feet per minute or so.

Perhaps the key aspect of the activator means is that portion thereof which directly contacts and activates the pre-applied adhesive or sealant, i.e., the activator head. The design, construction and nature of the activator head may vary widely depending upon the composition and properties of the carrier and the cure characteristics, composition and make-up of the pre-applied adhesive or sealant. For example, if the carrier is a hot melt, a wax material or another heat sensitive material, the activator head will be heated, either by conductance from an adjoining heating element or through the integration into the activator head itself of a heating element, so that the carrier may be transformed to a melt or softened or flowable state. In this state, the curative in the carrier is more readily available to the remainder of the curable composition such that only moderate shear and/or mixing is needed to effectuate cure of the curable composition.

In its simplest of embodiments, the activator head will comprise a blade or series of blades where the edge of the blade is at a slight angle to the surface of the stock material upon which the adhesive or sealant is pre-applied such that as the blade traverses the stock material, or in the case of a stationary blade(s) the stock material passes the blade(s), the microcapsules containing the curable components and the carrier complex are crushed and mashed. Preferably, to ensure proper activation, the blade(s) vibrates, reciprocates or oscillates such that there is rapid lateral or circular motion relative to the path of the blade or the stock material, as appropriate. This supplemental motion of the activator blade is especially important where a single blade is employed, but is also beneficial when two or more successive blades are employed. Preferably, as the line speed increases, the frequency or speed of the supplemental motion is also increased to ensure adequate mixing.

The preferred activator head is one whose work face, i.e., that surface of the activator head facing the surface of the stock material to which the pre-applied adhesive or sealant has been applied, has a plurality of features protruding from the surface thereof, which features, in operation, essentially lifts the pre-applied adhesive from the surface of the packaging material, disrupts and fractures the microcapsules containing the adhesive while intimately mixing and/or subsequently intimately mixing the components of the adhesive before collecting and depositing the activated adhesive on the surface of the packaging. Such features may comprise a series of ridges, dams, pyramids, and/or bumps and the like. The dams serve to mobilize, knead and mix the components of the adhesive composition as well as direct the placement of the activated adhesive. In essence, the action of these elements is much like that of a plow blade on a snowplow when plowing a snowy surface. The other protrusions, e.g., bumps, ridges, pyramids and the like, which typically follow the initial dams, create flow shear, redirecting the movement of the adhesive or sealant in a defined area; thus, increasing the kneading and mixing thereof. Following these mixer elements will be another dam or series of dams that amasses and, if appropriate, divides the activated adhesive or sealant, leaving the same in a raise bead or a series of parallel raised beads on the surface of the stock material. Should it be desired to have a broader band of adhesive or sealant, the work face may be constructed so that it is at a slight angle to the surface of the stock material so that the gap between workface and the stock material is larger at the front, i.e. where the adhesive first contacts the work face, than at the tail, where the adhesive leaves the work face. Thus, as the adhesive passes along the last dam, the work face flattens out the bead to form a band of activated adhesive or sealant. Alternatively, this same result may be achieved by the use of a series of channels in the work surface that collect and amass the activated adhesive or sealant composition. These channels may have a high peak or their depth may taper so as to provide a broader bead or band of adhesive or sealant. Similarly the width of the channels may be varied to provide wider or narrower beads or bands of activated adhesive or sealant. A suitable activator means is disclosed in the U.S. patent application of John Lazar et. al. entitled "Activator Means for Pre-Applied Adhesive" filed on the same date as this application, the contents of which are hereby incorporated herein by reference.

The activator head, especially the work face thereof, will also vary in its dimensions. Certainly, to optimize the use of the pre-applied adhesive material, the width of activator head will be at least that needed to ensure that all of the pre-applied adhesive is subjected to the work face. The depth or length of the activator head, and thus the work face, will depend upon the residence time desired for the given curable composition, i.e., that length of time that the curable composition is to be subjected to the kneading and mixing forces. This residence time also determines the distance between that point on the packaging substrate from which the adhesive was first collected from the packaging surface and the starting point from which the bead of activated adhesive will be deposited.

A key parameter to be considered when designing the activator head and, thus, the work face, will be the properties of the carrier and the amount of shear and mixing needed to ensure that sufficient curative will be exposed to and made available to the liquid curable components. Of course, for automated assembly line operations, the speed of the assembly line, especially of the stock materials through the activator means, will also play a role in determining the final, optimal design for the work face. It is preferred to design activator heads whose work face is as short as efficacious so as to minimize the extent to which the activated adhesive is shifted from the point at which it had been pre-applied. In essence, a shorter work face translates into a shorter residence time and, thus, a shorter shift in the adhesive.

Generally speaking, the activator means will be such that it maintains contact with or a constant or substantially constant gap or distance between it and the surface of the stock packaging material upon which it acts. Most preferably this gap will be zero or nearly so. Preferably, though, it is desirable that there be no or substantially no interference between the peaks of the protrusions on the workface and the surface of the stock packaging materials. Otherwise, the activator means may catch on the packaging causing a disruption in the automated process or movement of the packaging on the conveyor means whereby proper activation and assembly is adversely affected.

In order to address such issues, the activator means may have a means for sensing variations in the thickness or height of the stock material on the conveyor means so that a corresponding vertical movement of the activator means is made to keep the work face in its proper alignment with the surface of the stock material. For example, it may be possible to employ tension means e.g., springs, to maintain contact or near contact of the activator head and the stock material surface. This is especially important in those apparatus where activation involves the mobilization of the pre-applied adhesive or sealant on the surface of the stock material. If, for example, the distance between the tops of the dams and the surface of the stock material is greater than the height of the pre-applied adhesive or sealant there will be no mixing or activation of the adhesive or sealant. If the distance is more than half the thickness of the pre-applied adhesive or sealant, there may be insufficient mixing to provide a good bond or seal. Thus, it is desired and intended to maintain contact or as close proximity as possible between the work face of the activator means and the surface of the stock material.

As noted previously, the activator means, particularly the activator head may be heated where the curable composition and/or the carrier, as appropriate, is heat sensitive, i.e., requires heat to cure or release the curative, respectively. However, such heated activator means may also be advantageous in all applications, regardless of the heat sensitivity of the curable composition or carrier. Specifically, it has been found that heat in the activator means, preferably localized at the activator head, most preferably at the workface, helps prevent accumulation and/or agglomeration of the curable composition on the activator head itself. Not intending to be bound by any theory; however, it is believed that the heat helps lower the viscosity of the liquid components so as to improve the flow of the curable composition past and through the various elements of the activator head. In this respect, it is conceivable that the pulverized binder materials and/or the shell walls act as a filler in the liquid components, thickening the same, which thickening effect is counteracted by increasing the temperature of the same. Heating in this respect may be by such means as previously mentioned or through other means including induction heating and/or ultrasonic heating, e.g., by use of an ultrasonic horn. It is to be noted, however, that the improvement in flow with ultrasonic energy may be solely due to the vibrations, irrespective of whether any heat is generated. Furthermore, because the residence time in the activation station is so short, it is likely that any heat that may be transferred to the adhesive is restricted to that layer, in essence the monolayer, of adhesive directly in contact with the surface of the workface.

The use of activator means as described above enables one to apply the pre-applied adhesive in broad bands of minimal height to the stock packaging materials. The width of the band is essentially only limited by the width of the packaging surface to which it is to be applied. Of course to avoid the waste of adhesive, the width is also, as a practical matter, limited to the width of the active face of the activator means, i.e., the maximum width of the structures on the active face of the activator means engaged in essentially lifting or scraping the pre-applied adhesive from the packaging surface. The height of the band in combination with the practical width of the band defines the amount of adhesive material that is available for affecting the bond. In accordance with the practice of the present invention, one is able to tailor the activated adhesive bead by selecting the appropriate activator means and band width and height of the pre-applied adhesive. For example, a 3 mil, one-half inch wide pre-applied bead can easily be transformed into a 10 mil, 0.15 inch wide bead of activated adhesive material. Thus, as noted above, one is able to generate a bead of substantial height to accommodate surface variations in the bonding substrates to address gaps and the like. However, given the short residence time of the adhesive material in the active zone of the activator means, it is preferred to minimize the distance the adhesive must traverse perpendicular to the centerline of the pre-applied adhesive band during activation. Otherwise, the angle of the ridges or dams of the activator surface responsible for lifting the pre-applied adhesive from the packaging surface to the centerline of the pre-applied adhesive band becomes so low that poor movement or flow of the adhesive is realized, resulting in a build-up of adhesive in front of the ridges or dams, which build-up can cause the face of the activator means to rise relative to surface of the packaging substrate upon which is acting. The consequence of this will likely be an uneven and irregular bead of activated adhesive, including gaps therein, as well as areas of un-activated pre-applied adhesive. Preferably, the angle of the dams or ridges relative to the centerline of the pre-applied adhesive band will be from about 30° to about 70°, preferably from about 45° to about 60°.

Additional benefits associated with or arising from the use of stock packaging materials in accordance with the practice of the present invention in conjunction with the use of such activator means, or any activator means that is capable of producing a bead of activated adhesive higher than the pre-applied bead, include the ability to use pre-applied adhesive with stock packaging materials whose bonding surfaces are irregular, i.e., vary in surface smoothness, contours, and the like. Perhaps more importantly, because the present invention allows for the application of a thin, broad bands of the pre-applied adhesive, preferably less than 5 mil thickness, most preferably less than 3 mil thickness, the pre-applied adhesive will have little, if any, adverse impact on the ability to stack the stock packaging materials, even to substantial heights, or to create bulk rolls of the stock packaging materials. Specifically, if a stock packaging material were to have the pre-applied adhesive on one edge thereof, as one stacked the stock materials one on top of the other, the edge with the adhesive would rise faster than the opposing edge causing the stack to lean, and possibly fall over. This effect is lessened with the thinner, broad bands allowed with the present invention.

In addition to the activator means discussed above, the apparatus of the activation workstation or the immediately following workstation of the automated assembly line may be further modified to include a heating means which applies heat to the work surface of the stock materials, preferably from that side opposite the surface carrying the adhesive, to help accelerate cure or effectuate cure in the case of adhesive compositions that are heat activated/cured. The heating means may comprise an anvil that acts as a back support to that portion of the stock material where the adhesive is being worked during and subsequent to activation. In packaging applications, the heating means may also be incorporated into the guide elements that help fold and close the flaps of the packaging material and bring them into contact for effectuating closure of the same. Yet another alternative would be to include a heating means that heats air that is then directed to the work surface or the opposing side of the work surface so as to heat that portion of the stock material underlying the adhesive. Generally speaking, any number of heating means, including those often used for in-line printing, may be incorporated into the activation and assembly apparatus employed in the practice of the present invention and will be readily recognized by those skilled in the art. Preferably, though, in these instances, the heat to be applied is low level merely to warm the adhesive system to accelerate cure but is not of the high activation/melt temperatures needed with respect the prior art packaging adhesives. Generally temperatures on the order of less than 200° C., preferably less than 100° C., most preferably less than 50° C., which temperatures are insufficient to adversely affect the packaging or any coatings, print, etc. that may be contained on the surface thereof or the contents of the packaging, if employed in a forming, filling and closing operation.

The stock packaging materials of the present invention and the methods for the production and use thereof have a number of improved attributes and benefits as compared to like stock materials using conventional pre-applied adhesive as well as compared to other assembly and manufacturing processes using other conventional adhesive, whether pre-applied or not. Many of these have been discussed or mentioned previously or are readily apparent and inherent from this specification. For example, the relative rigidity of the carrier microcapsules and/or their general resistance to light compressive forces due to the properties of the carrier material allow the carrier microcapsules to serve as spaces and protectors for the microcapsules containing the liquid curable components.

Thus, problems with premature fracturing of the microcapsules containing the liquid curable components, as found with traditional pre-applied encapsulated adhesive systems, due to compressive weight of stacked materials or other forces impacted upon such stock material in industrial handling and processing operations, are no longer of concern or, certainly, are of less concern. This allows for the use of thinner walled microcapsules and, thus, more curable materials for a given weight of pre-applied adhesive composition.

From the perspective of the stock materials, it is clear that as a result of the use of the carrier complex, many stock materials not suited for use with traditional encapsulated adhesives and sealants may not be used in a pre-applied context. Furthermore, in all stock material applications, these stock materials are more stable due to the rigidity or stiffness of the encapsulated carrier complex and the lack of release of the therein-contained curative even upon rupture of the shell wall. Thus, these stock materials may be employed in applications and handled in ways that would not be possible for traditional encapsulated adhesives without cure or pre-mature activation. Finally, because of the higher strength or rigidity/stiffness of the encapsulated carrier complex, these microcapsules serve as a spatial protector for other encapsulated components of the curable composition. This allows one to use thinner shell walls for the liquid curable components, thus, providing more liquid curable material for a given amount of adhesive or sealant.

The following non-limiting working examples exemplify and provide additional scope and understanding to the present invention.

A number of novel pre-applied adhesive compositions comprising the encapsulated curative complex, encapsulated liquid curable materials and the binder for adhering the microcapsules to the stock packaging material surface were prepared for demonstrating the utility of the present invention. Table 1 sets forth a listing of the various materials employed in making the pre-applied adhesives.

Encapsulated Curative Complex

The key component of the pre-applied adhesives used in the practice of the present invention, the encapsulated curative complexes (hereinafter also referred to as "ECC"s), were made in a multi-step process which involved the preparation of the internal phase of the ECC microcapsules, i.e., the carrier material or, if the carrier were to be polymerized in-situ, the precursors therefore and the curative contained therein, followed by one or more wall forming or encapsulation steps. Generally speaking, the internal phase was prepared by adding the plasticizers, polymeric thickeners and/or tackifier resins to the polymerizable monomer in an appropriate vessel or beaker and stirring the combination at room temperature until all solids were dissolved in the monomer. Thereafter, the more thermally sensitive components, especially the curatives to be incorporated into the carrier, e.g., the peroxide and azo initiators, were then added to the mixture under constant agitation or mixing and at an elevated temperature, generally 45° C., until all solids were fully dissolved, or substantially so. The first mixing step was performed at room temperature as dissolving the resin in the monomer does not appear to be temperature dependent and is quite lengthy. On the other hand, the mixing of the curatives is more temperature dependent and, thus, here the elevated temperature is preferred. Of course, one could add all ingredients at an elevated temperature and in a different sequence; however, due to the slow rate at which the resins dissolve in the monomer, such higher temperatures for extended periods may adversely affect the potency or efficacy of the curatives.

Encapsulation of the ECC internal phase was accomplished by a one-, two- or three-phase, multi-step process, preferably, the two-phase, multi-step process. Unless otherwise indicated, all encapsulation processes were conducted in a jacketed steel vessel or reactor under a nitrogen blanket having integrated agitation means for ensuring good mixing of the components therein.

The two-phase encapsulation process involved the following general steps:

An intimate mixture of a colloidal polyacrylic acid (C-121 . . . ), sodium hydroxide (5% solution) and water was prepared in the reaction vessel.

Thereafter a partially methylated methylol melamine resin solution (Cymel 385) was added to the above mixture under constant agitation. Due to the high viscosity of this material, its addition was typically accomplished over a four-minute period.

TABLE 1

Materials Guide

| Tradename | Acronym | Chemical Description | Source Company | |
|---|---|---|---|---|
| Acrysol TT-615 | | acrylic alkali thickener | Rohm & Haas | Philadelphia, PA |
| C-121 | PAA | polyacrylic acid colloid | | |
| | CHP | cumene hydroperoxide | Atofina Chemicals | Philadelphia, PA |
| CN 104 | | epoxy acrylate | Sartomer Company | Eaton, PA |
| CN 307 | | polybutadiene diacrylate | " | " |
| CN 551 | | amine modified polyether acrylate oligomer | " | " |
| CN 501 | | amine modified polyether acrylate oligomer | " | " |
| CN 2404 | | metallic acrylate oligomer | " | " |
| Cycat 500 | | sulfonic acid catalyst | Cytec Industries | West Patterson, NJ |
| CYM M-100 | | 3,4-epoxycyclohexylmethyl methacrylate | Daicel Chemical | |
| Cymel 385 | | partially methylated methylol melamine resin sol'n | " | " |
| CALFAX DBA-70 | | dodecyldiphenyloxide disulfonic acid | Pilot Chemicals | Sante Fe Springs, CA |
| | DEGDMA | diethylene glycol dimethacrylate | | |
| Disparion 6650 | | polyamide thixotropic agent | King Industries | Norwalk, CT |
| | DNNDSA | dinonyl naphthalene disulfonic acid | | |
| | EHDMAB | ethylhexyl dimethylamino benzoate | | |
| | EDMABA | ethyl dimethylamino benzoate | | |
| Escorez 5300 | | hydrogenated hydrocarbon resin | Exxon Mobil | Houston, TX |
| Indopol H-100 | | polybutene resin plasticizer | Innovene | Naperville, IL |
| Indopol H-300 | | " | " | " |
| Indopol H-1900 | | " | " | " |

TABLE 1-continued

Materials Guide

| Tradename | Acronym | Chemical Description | Source Company | |
|---|---|---|---|---|
| I6-B | | red carbonless coloring agent | | |
| Jayflex DIOP | | di-isooctyl phthalate | Exxon Mobil | Houston, TX |
| Joncryl 1680 | | RC acrylic emulsion | Johnson Polymer | Sturtevant, WI |
| Joncryl 3050 | | styrene acrylic latex emulsion | " | " |
| K-702 | | polyacrylic acid/butyl acrylate (~6%) copolymer | Noveon | Cleveland, OH |
| KXP 312 | | polyacrylic acid (~60K MW) | " | " |
| Luperox A-75 (75% BPO) | | benzoyl peroxide wetted with water | Arkema, Inc. | Philadelphia, PA |
| Luperox A-75FP (75% BPO) | | USP hydrous benzoyl peroxide | " | " |
| Luperox P | t-BPB | t-butyl peroxybenzoate | " | " |
| | MEHQ | methyl ethyl hydroquinone | | |
| Norpar 12 | | aliphatic hydrocarboin fluid | Exxon Mobil | Houston, TX |
| Norsolene A-110 | | aliphatic modified C-9 hydrocarbon resin | Sartomer Company | Eaton, PA |
| Norsolene A-90 | | " | " | " |
| Norsolene S-105 | | aromatic hydrocarbon resin | " | " |
| Norsolene S-85 | | " | " | " |
| | PHZBSA | para-hydrazinobenzene sulfonic acid | | |
| | PHBSA | para-hydroxybenzene sulfonic acid | | |
| | PVA | polyvinylalcohol | | |
| SR213 | BDDA | 1,4-butanediol diacrylate | " | " |
| SR238 | HDDA | 1,6-hexanediol diacrylate | " | " |
| SR256 | EEEA | 2-(2-ethoxyethoxy)-ethyl acrylate | " | " |
| SR257 | SA | stearyl acrylate | " | " |
| SR295 | PETTA | pentaerythritol tetraacrylate | " | " |
| SR351 | TMPTA | trimethylolpropane triacrylate | " | " |
| | TMPTA/I6-B | 1% I6-B in SR351 | | |
| SR355 | DTMPTTA | di-trimethylolpropane tetraacrylate | " | " |
| SR 395 | IDA | isodecyl acrylate | | |
| SR399 | DPEPA | dipentaerythritol pentaacrylate | " | " |
| SR440 | IOA | iso-octyl acrylate | " | " |
| SR444 | PETA | pentaerythritol triacrylate | " | " |
| SR495 | CLA | caprolactone acrylate | " | " |
| SR506 | IBA | isobornyl acrylate | " | " |
| SR604 | PPGMMA | polypropylene glycol monomethacrylate | " | " |
| Sarcure SR1135 | | photoinitiator | " | " |
| Sylvares ZT105LT | | styrenated terpene resin | Arizona Chemical | Jacksonville, FL |
| Sylvalite RE 105L | | resin ester tackifier | " | |
| Tinuvin 234 | | benztriazole UV absorber | Ciba Specialty Chemical | Tarrytown, NY |
| Tinuvin 328 | | " | " | " |
| TT-615 | | polyacrylate | Rohm & Haas | Philadelphia, PA |
| Vazo 52 | | 2,2'-azobis (2,4-dimethyl valeronitrile) | DuPont | Wilmington, DE |
| Wingtak 10 | | liquid hydrocarbon tackifier | Goodyear Chemical | Beaumont, TX |

Following completion of the addition of the melamine resin, the ECC internal phase material was then added to the mixture under constant agitation.

Once the ECC internal phase material was intimately mixed in, generally after about 16 minutes or so, the reaction mix was subjected to high shear conditions at room temperature or, preferably, at a slightly elevated temperature to achieve the desired particle size for the droplets of the ECC internal phase material. High shear or emulsification conditions were achieved by the use of an integrated or inserted impeller mechanism. Particle size determinations were made periodically to assess the progress of the emulsification.

Shortly before the completion of the emulsification process, generally about five minutes before, the wall forming composition for the second phase encapsulation process was prepared. As before, the second phase wall forming composition was prepared by adding the partially methylated methylol melamine resin to a mixture comprising the colloidal polyacrylic acid, sodium hydroxide and water.

Approximately five minutes following cessation of the emulsification process, the prepared second phase wall forming composition was added to the mixture, which, all the while, is maintained under constant agitation.

Following the addition of the second phase wall forming composition a salt, preferably sodium sulfate, was then added to the mixture to complete the encapsulation process.

Thereafter, the temperature of the reaction mix was gradually elevated to the desired reaction temperature over a period of about two hours or less, preferably about an hour or less, and maintained at the elevated temperature for an extended period of time to ensure complete formation of the capsule walls as well as polymerization of the ECC internal phase materials.

Obviously, the foregoing sequence is but one of many that could be applied to the practice of the present invention and those skilled in the art will readily recognize that many modifications and variations thereto could also be employed successfully. For example, the wall forming material and the ECC internal phase materials could be added concurrently or in reverse sequence. However, the specified sequence is especially desirable as it is believed that the wall forming material may aid in the emulsification process of the internal phase materials. Furthermore, the timing of the emulsification process will vary depending upon a number of factors including the type, size and shape of the impeller blade itself, and the speed of the same. While higher shear provides for smaller particle size, those skilled in the art will readily recognize that after a given point in time, continued high shear mixing will not lead to any further material change in particle size. Particle size determinations were made during and following the encapsulation process using an Accusizer model 780 particle size instrument made by Particle Sizing Systems.

Table 2 sets forth the specific formulations of the internal phase and the shell or capsule walls for each of the ECCs employed in the following examples of the present application: all amounts are presented in grams. In each of these examples the carrier of the internal phase was polymerized in-situ concurrent with or following encapsulation. With the exception of ECC 6, the ECC microcapsules were prepared in accordance with the aforementioned two-phase encapsulation process using the cell wall forming materials of Table 2 under the reaction conditions and times of Table 3. In the case of ECC 6, the shell/in-situ formed carrier was formed by a two-stage polymerization wherein the initial stage was conducted at 65° C. for a period of 6 hours, following which the temperature was elevated to 80° C. and the reaction continued for another 6 hour period. Table 3 also sets forth the physical attributes, namely the average particle size and cell wall content, of the microcapsules formed.

Encapsulated Curable Material

The second component of the pre-applied adhesives used in the examples of the present invention is the encapsulated curable material

TABLE 2

| | ECC No. | | | | | | | |
|---|---|---|---|---|---|---|---|---|
| | 1 | 2 | 3 | 4 | 5 | 6 | 7 | 8 |
| ECC Internal Phase | | | | | | | | |
| Iso-decyl acrylate | | | | | | | 60 | 61.5 |
| iso-octyl acrylate | 123 | 291.8 | 62.5 | 107.2 | 401.9 | 103 | | |
| Iso-butyl acrylate | | | | | | | 15 | 15 |
| PPGMMA | | 145.9 | 50 | 15 | 58.2 | 14.6 | | |
| stearyl acrylate | | 145.9 | 37.5 | | | | 15 | 15 |
| caprolactone acrylate | | | | | | | 15 | 15 |
| TMPTA | 2.5 | 1.16 | | 4.5 | 8.12 | 2.04 | | |
| CN 307 | | | | | | | 6 | 4.5 |
| ion exchange resin | | 20 | | | 20 | | | |
| Triacetin | | | | | | | | |
| Sylvares ZT105LT | 125 | | | | | | | |
| Norsolene A-110 | | | 100 | | | | 148.5 | 148.5 |
| Norsolene S-105 | | 400 | | 103 | 400 | 100 | | |
| Indopol H-300 | | | | | | 116.5 | 29.1 | |
| di(iso-octyl) phthalate | | | | | | 30 | | |
| Luperox A-75 (75% BPO) | | 40 | 33.3 | 10.3 | 40 | | | |
| Luperox A-75FP (75% BPO) | | | | | | | 10.5 | 10.5 |
| benzoyl peroxide | 4 | | | | | | | |
| Luperox P | | | | | | | 30 | 30 |
| cumen hydroperoxide | | 120 | | 60 | 120 | | | |
| Vazo 52 | | | | | | 9.76 | | |
| EDMAB | | | | | | 2.33 | | |
| total wt. (grams) | 254 | 1165 | 283.3 | 300 | 1165 | 291 | | |
| Cell wall Phase I | | | | | | | | |
| Cymel 385* | 4 | 40 | 6 | 10 | 40 | 10 | 4.6 | 4.1 |
| C-121 | 5 | 88 | 7 | 22 | 88 | 22 | | |
| KXP 213 | | | | | | | 15.6 | 15.6 |
| Sodium hydroxide (5%) | 2 | 80 | 5.5 | 11 | 80 | 20 | | |
| Sodium hydroxide (20%) | | | | | | | 7.3 | 7.5 |
| Sodium sulfate | | | | | 32 | | | |
| Water | 163 | 100 | 250 | 275 | 1000 | 275 | 185 | 185 |
| Cell wall Phase II | | | | | | | | |
| Cymel 385 | 24 | 100 | 16 | 25 | 100 | 25 | 22.1 | 23.1 |
| C-121 | 5 | 20 | 7 | 5 | 20 | 5 | | |
| KXP 213 | | | | | | | 5.6 | 5.1 |
| Sodium hydroxide (5%) | 0.5 | | 2.5 | 1 | | | | |
| Sodium hydroxide (20%) | | | | | | | 1.8 | 1.8 |
| Sodium sulfate | 3 | 32 | 4 | 8 | | 8 | | |
| Water | 300 | 280 | 50 | 100 | 200 | 100 | 55 | 55 |

TABLE 3

| | Example | | | | | | | |
|---|---|---|---|---|---|---|---|---|
| | 1 | 2 | 3 | 4 | 5 | 6 | 7 | 8 |
| Milling | | | | | | | | |
| temp (° C.) | 25 | 45 | 45 | 45 | 45 | 25 | 45 | 45 |
| Time (min) | 75 | 15 | 75 | 17 | 35 | 25 | 20 | 20 |
| Rate (rpm) | 1100 | 1800 | 2000 | 2250 | 1750 | 2400 | 2950 | 2950 |

TABLE 3-continued

|  | Example | | | | | | | |
| --- | --- | --- | --- | --- | --- | --- | --- | --- |
|  | 1 | 2 | 3 | 4 | 5 | 6 | 7 | 8 |
| Ramp up of Reaction | | | | | | | | |
| initial temp (° C.) | 25 | 45 | 45 | 45 | 45 | 25 | | |
| end temp (° C.) | 90 | 68 | 65 | 68 | 65 | 65 | | |
| time (hrs)** | 2 | | | | | | | |
| Reacting | | | | | | | | |
| temp (° C.) | 90 | 68 | 65 | 68 | 65 | 65 | 68 | 68 |
| time (hrs) | 16 | 8 | 8 | 8 | 8 | 6 | 8 | 8 |
| Secondary Reaction | | | | | | | | |
| temp (° C.) | | | | | | 80 | | |
| time (hrs) | | | | | | 6 | | |
| Average microcapsule size (microns) | 47 | 13 | 18 | 29 | 19.5 | 32 | 31 | 31 |
| weight percent cell wall | 7.9 | 8.4 | 5.9 | 8.2 | XX | 8.4 | | |

**unless indicated, generally about 1 hour or less.

(hereinafter also referred to as "ECM"s). The ECMs were prepared according to the following general process:

- the components for the ECM internal phase were mixed under nitrogen blanket until all components were dissolved and held for subsequent use;
- all components of the cell wall phase 1, excluding the melamine resin, were added to a steel reactor at 25° C. and mixed under low shear, i.e., 300 rpm; thereafter the melamine resin was added and mixed at low shear for an additional 4 minutes.
- the prepared ECM internal phase formulation was then added to the reactor and intimately mixed at 300 rpm for an additional 16 minutes;
- the mixture was then subjected to high shear emulsification of 3000 rpm at 25° C. for 75 minutes. During this time, the second phase wall forming materials were prepared with the melamine being added to the remaining components of the second phase wall composition about five minutes prior to the completion of the emulsification step of the aforementioned reactor mix;
- once the emulsification was completed, the mixture in the reactor was continually mixed with a flat paddle mixer at low shear, i.e., 300 rpm, approximately five minutes following cessation of the emulsification step, the second wall forming composition was added to the mixture followed by the sodium sulfate, if used;
- thereafter, the reactor temperature was gradually raised to 65° C. over about two hours and the reaction mix maintained at 65° C. with low shear mixing for an additional 8 hours before the ECM microcapsules were recovered.

Table 4 sets forth the specific formulations of the internal phase, i.e., the curable material, and the shell or capsule walls for each of the ECMs employed in the following examples: all amounts are presented in grams. With the exception of ECM I and ECM K, these ECM microcapsules were prepared in accordance with the aforementioned two-phase encapsulation process using the cell wall forming materials of Table 4 under the above-mentioned reaction conditions. In the case of ECM I, the cell wall was formed by a three-phase process. In the case of ECM K, the mixture of the wall forming materials and the internal phase were emulsified at 45° C. at 4000 rpm for 20 minutes and subsequently reacted at 68° C. for 8 hours.

Binder Composition

The final component of the pre-applied adhesive compositions employed in the examples of the present specification is the binder. Several

TABLE 4

|  | ECM microcapsule | | | | | | | | | | |
| --- | --- | --- | --- | --- | --- | --- | --- | --- | --- | --- | --- |
|  | A | B | C | D | E | F | G | H | I | J | K |
| ECM Internal Phase | | | | | | | | | | | |
| butyl ferrocene | 5 | 25 | 5 | | | | | | | | |
| Ferrocene | | | | 10 | 50 | 10 | 10 | | 10 | | |
| TMPTA | 245 | | | | 1100 | | | | 212.5 | | |
| DTMPTTA | | | | 220 | | | | | | | |
| PPGMMA | | | 25 | 12.5 | 62.5 | 12.5 | 12.5 | 12.5 | 12.5 | | |
| PETTA | | | | | | | 220 | | | | |
| PETA | | | | | | | | 220 | 228.13 | 268.5 | 117 |
| TMPTA/I6-B | | 1212.5 | 217.5 | | | | | | | | |
| CN 104 | | | | | | | | | | | 180 |
| MEHQ | | | 125 | 2.5 | | | | | | | |
| EHDMAB | | | | | | | | | 1.88 | | |
| EDMAB | | | | | | | | | | | 3 |
| CHP | | | | | | | | | | 30 | |

TABLE 4-continued

| | ECM microcapsule | | | | | | | | | | |
|---|---|---|---|---|---|---|---|---|---|---|---|
| | A | B | C | D | E | F | G | H | I | J | K |
| PHBSA | | | | | | | | | | 1.5 | |
| tetramethyl analine | | | | | | | | | | | |
| Disparlon 6650 | | | | | | | | | | 7.5 | |
| Tinuvin 234 | | | | 3.75 | 18.75 | 3.75 | 3.75 | 3.75 | 3.75 | | |
| Tinuvin 328 | | | | 3.75 | 18.75 | 3.75 | 3.75 | 3.75 | 3.75 | | |
| Cell wall Phase I | | | | | | | | | | | |
| Cymel 385* | 4 | 70 | 14 | 14 | 70 | 14 | 14 | 14 | 14 | 16.34 | 14 |
| C-121 | 5 | 25 | 5 | 5 | 25 | 5 | 5 | 7.5 | 30 | | 5.2 |
| K-702 | | | | | | | | | | 25.65 | |
| sodium hydroxide (5%) | 2.5 | 1100 | 2.25 | 2.25 | 11.25 | 2.25 | 2.25 | 3.85 | 17.1 | | |
| sodium hydroxide (20%) | | | | | | | | | | 8.19 | 1.5 |
| sodium sulfate | | | | 3 | | 3 | | 3 | | 5 | |
| Water | 163 | 815 | 163 | 163 | 815 | 163 | 163 | 163 | 275 | 291.75 | 175 |
| Cell wall Phase II | | | | | | | | | | | |
| Cymel 385 | 24 | 70 | 14 | 14 | 70 | 14 | 14 | 14 | 14 | 16.34 | 14.1 |
| C-121 | 5 | 25 | 3 | 5 | 25 | 5 | 5 | 5 | 5 | | |
| K-702 | | | | | | | | | | 5.84 | 5.3 |
| sodium hydroxide (5%) | 1.57 | 5 | 1 | 1 | 5 | 1 | 1 | 0.85 | 0.8 | | |
| sodium hydroxide (20%) | | | | | | | | | | 1.04 | 0.8 |
| sodium sulfate | 3 | 15 | 3 | | 15 | | 3 | | 3 | | |
| Water | 163 | 500 | 100 | 100 | 500 | 100 | 100 | 75 | 100 | 116.7 | 100 |
| Cell wall Phase III | | | | | | | | | | | |
| Cymel 385 | | | | | | | | | | 22.4 | |
| C-121 | | | | | | | | | | 8.75 | |
| sodium hydroxide (5%) | | | | | | | | | | 0.9 | |
| sodium sulfate | | | | | | | | | | 3 | |
| Average microcapsule size (microns) | 5 | 12.6 | | 13.7 | 12.1 | 11.6 | 11.6 | 12.5 | 19.5 | | 16 | different binder systems were employed to further demonstrate the broad concept of the present invention: three aqueous based solutions and seven 100% solids UV curable coatings. The formulations for two of the aqueous based binders and each of the UV curable binder systems are set forth in Table 5: all amounts are presented as parts by weight. These binder systems were prepared under ambient conditions using traditional mixing equipment, with care to preclude exposure to UV light in the case of the UV curable systems.

EXAMPLE 1

An aqueous based pre-applied adhesive composition was prepared by mixing together Binder B1 (6 parts total), 20 parts by weight ECM A, and 74 parts by weight ECC 1. A piece of chipboard was pretreated with a coating of a 5% solution of polyvinyl alcohol using a #16 rod. The treated surface was then coated with the adhesive composition using a #50 rod. The coating was allowed to dry and then activated manually using a razor blade by stoking the edge of the blade with hand pressure quickly across the pre-applied adhesive 10 times. The chipboard was then folded on itself and held under hand pressure for 10 seconds. The chipboard remained bonded following release of the hand pressure.

EXAMPLE 2

A second aqueous based pre-applied adhesive composition was prepared by mixing together Binder B2 (18.9 parts total), 52 parts by weight ECC 3, 14.2 parts by weight ECM B, and 14.2 parts by weight ECM C. The composition was applied as a thin film (0.006") to the clay side of clay-coated news back stock. The coating was allowed to dry and then activated manually using a razor blade by stoking the edge of the blade with hand pressure quickly across the pre-applied adhesive 10 times. The news back stock was then folded on itself using finger pressure to mimic the closure of a cereal carton flap. The news back stock remained bonded following release of the hand pressure and was found to have a strong bond when pulled apart after one minute. Fiber tear was observed upon pulling apart assemblies allowed to cure for 5 minutes and for one hour.

TABLE 5

| | Binder System | | | | | | | | |
|---|---|---|---|---|---|---|---|---|---|
| | B1 | B2 | B3 | B4 | B5 | B6 | B7 | B8 | B9 |
| polyvinyl alcohol* | 2 | | | | | | | | |
| Benzoyl peroxide* | 2 | | | | | | | | |
| p-TSA | 2 | | | | | | | | |
| Joncryl 3050 | | 15 | | | | | | | |
| Sodium bicarbonate | | 3.5 | | | | | | | |
| TT-615 polyacrylate | | 0.4 | | | | | | | |

TABLE 5-continued

| | Binder System | | | | | | | | |
|---|---|---|---|---|---|---|---|---|---|
| | B1 | B2 | B3 | B4 | B5 | B6 | B7 | B8 | B9 |
| Sarcure SR1135 | | | 7.5 | 7.5 | 7.5 | 7.5 | 7.5 | 7.5 | 6.3 |
| Norsolene A-110 | | | 40 | 40 | 40 | 40 | 40 | 40 | |
| BDDA | | | | | | | | | 10.1 |
| EEEA | | | | | | | | | 6.8 |
| SA | | | 35 | 26 | 28 | 5 | 27 | 5 | |
| TMPTA | | | 5 | | | | | | |
| PPGMMA | | | | 10 | 10 | | 10 | | |
| HDDA | | | | 9 | 7 | | 8 | | |
| PETA | | | | | | | | | |
| IBA | | | | | | 15 | | 15 | 34.8 |
| CLA | | | | | | | | 5 | |
| CN2404 oligomer | | | 20 | 15 | 15 | | 15 | | |
| CN551 | | | | | | 25 | | 25 | |
| CN501 | | | | | | | | | 15.8 |
| Jayflex DIOP | | | | | | 10 | | 10 | |
| CYM M-100 | | | | | | 5 | | | 3.4 |
| Indopol H-100 | | | | | | | | | |
| Wingtak 10 | | | | | | | | | 19.1 |
| glyceryl tribenzoate | | | | | | | | | |
| Norpar 12 | | | | | | | | | 10 |

*added as a total of 4 parts of an aqueous solution containing 5% by weight of each additive

EXAMPLES 3-11

A series of pre-applied adhesive compositions in UV curable binders were also prepared for evaluation in the practice of the present invention. The make-up of these pre-applied compositions were as set forth in Table 6, with the composition of the encapsulated curable material (ECM) as set forth in Table 4, the composition of specific binder system as set forth in Table 5 and the selection of the encapsulated curative complex (ECC) as set forth in Table 2: all amounts in Table 6 are set forth in weight percents.

TABLE 6

| | Example | | | | | | | | |
|---|---|---|---|---|---|---|---|---|---|
| | 3 | 4 | 5 | 6 | 7 | 8 | 9 | 10 | 11 |
| Composition | | | | | | | | | |
| Binder B3 | 43 | 43 | | 43 | | | | | |
| Binder B4 | | | 43 | | | | | | |
| Binder B5 | | | | | 43 | | | | |
| Binder B6 | | | | | | 43 | | | |
| Binder B7 | | | | | | | 43 | | |
| Binder B8 | | | | | | | | 43 | |
| Binder B9 | | | | | | | | | 51 |
| ECC Cap 2 | 37 | 32 | 37 | 37 | 37 | | | | |
| ECC Cap 4 | | | | | | 37 | | | |
| ECC Cap 5 | | | | | | | 32 | | |
| ECC Cap 6 | | | | | | | | 37 | |
| ECC Cap 7 | | | | | | | | | 33.32 |
| ECM Cap D | | | | | 20 | | | | |
| ECM Cap E | | | 20 | | | | | | |
| ECM Cap F | | | | 25 | | | | | |
| ECM Cap G | 20 | 25 | | | | | | | |
| ECM Cap H | | | | | | 20 | | | |
| ECM Cap I | | | | | | | 25 | | |
| ECM Cap J | | | | | | | | 20 | |
| ECM Cap K | | | | | | | | | 15.68 |
| Peel Adhesion (lbs) | 4.4 | 4.4 | 3.5 | 3.5 | 3.74 | 4.9 | 3.5 | 4.9 | 4.2 |
| Shear Adhesion (lbs) | 101.1 | 93.4 | 46 | 87.5 | 50.6 | 70.7 | 45.3 | 48.7 | 55.0 |

In each of these examples, the adhesive composition was applied as a thin film strip, 0.5" wide by 0.006" thick along the centerline of the major axis of 3" wide by 5" long cards cut from paperboard cereal box stock. The adhesive was applied to the fiber side of the cards and cured under UV light. The adhesive was activated and the card bonded to a like card using a custom-made activator apparatus as described in co-filed U.S. patent application of John Lazar et. al. entitled "Activator Means for Pre-Applied Adhesives," the contents of which are hereby incorporated herein by reference. The apparatus comprised an insertion station, an activator station and a bonding station with a rail extending from the insertion station, through the activation station and ending at the bonding station and a sled movable along the rail. In testing the prepared samples, a card with the adhesive pre-applied thereto is set on a sled, which is equipped with a vacuum, adhesive side up, with the major axis parallel with that of the rail. The sled then traverses along the rail at a rate of between 150 and 250 feet per minute, through the activator station where a stationary activator means having a face with one or more ridges, dams, or other structures which lift/scrape the adhesive from the card, thereby fracturing the microcapsules and mixing the contents thereof, and redeposit the activated adhesive on the card. The sled then traverses to the bonding station where a matching card is mated with the activated card at a pressure of about 5 psi applied for about 2 seconds. The bonded card assemblies were then allowed to sit for four weeks following which the ultimate peel adhesion and ultimate shear adhesion of each were determined. Tests were performed on five assemblies of each adhesive system and the results averaged and presented on Table 6.

Peel Adhesion and Shear Adhesion tests were performed under Tappi conditions using a Thwing-Albert EJA materials Tensile Tester with a 200 pound load cell. Instrument settings were as follows: test speed—12 inches per minute, sensitivity—0.5 pounds and gage length—1.75 inches. For testing, each sample was placed in a clamp, a modified vise grip, whose jaws extended the length of the card and overlaid the bond area, parallel to the bond, so as to stabilize the bond area prior to testing. The clamp was tensioned to provide an interference fit, but not pressure on the bondline. The clamped assemblies were then folded to prepare to the specific tests as follows:

Peel Test: For conducting the peel test, the exposed, unbonded "flaps" of the assembled cards extending from the clamp were folded back along the clamp edge, in opposite directions, and 90° to the assembled card in the clamp. An end view of the so folded card would give the image of a "T". The assembly is then centered in the jaws of the tensile tester, with each flap in opposing jaws. The assembly was then ready for testing.

Shear Test: For conducting the shear test, a corner of one of the exposed, unbonded "flaps" of the assembled cards was dog-eared and folded 90° to the card assembly: this produced a triangular dog ear on the card. A similar dog ear was then formed on the other card at the opposite end of the card assembly with that dog ear extending 90° to the card assembly, in the opposite direction of the first dog ear. Each jaw of the tensile tester was then attached to one of the dog ears. The assembly was then ready for testing.

EXAMPLE 12

In order to demonstrate the applicability of the present invention to stock packaging materials comprising aluminum, especially aluminum foil laminates, a pre-applied adhesive composition was prepared comprising 30% by weight of ECC 8, 60% by weight ECM K and 10% of a latex binder, Joncryl 1680. The formulation was applied to the lengthwise centerline of a 3 inch by 5 inch aluminum plates as a ½ inch wide strip of 6 mil thickness. The coating was dried using a hot air gun to expedite evaporation of the aqueous solvent and activated using the lab activator of Examples 3-11 having a configuration which provided two beads of activated adhesive. Once activated, a second aluminum plate of the same size was laid on the adhesive beads of the first plate with moderate hand pressure. The adhesive was allowed to cure, about two days, and the two plates were found to be bonded together.

EXAMPLE 13

To demonstrate the applicability of the present invention to various cellulosics based packaging materials, a pre-applied coating composition comprising 60% by weight ECC 8, 30% by weight ECM K and 10% latex binder, Joncryl 1680, was applied as a ½ inch wide strip of 6 mil thickness to rectangular cut-outs of envelope paper and paperboard envelopes, similar to a Postal Express Mailer, measuring approximately 8 inches wide by 5 inches long. The adhesive was applied along the length about 2 inches from one edge. In the case of the paperboard envelope, two sets of examples were prepared, one having the adhesive was applied to the fiber side for fiber side to fiber side bonding and the other to the varnish side for varnish side to varnish side bonding. The adhesive was dried using a hot air gun and subsequently activated using the activator means of Examples 3-11 resulting in two beads of activated adhesive. Once the adhesive was activated, the rectangular cut out was then folded upon itself, lengthwise, mimicking a closure flap, forming essentially a 4 inch by 5 inch rectangle. Finger pressure was then applied along the bond line for a few seconds to ensure good contact between the mated surfaces. The adhesive was allowed to cure and a bond was found to have formed.

EXAMPLE 14

To demonstrate the applicability of the present invention to plastic packaging surfaces, the pre-applied coating composition of Example 13 was applied as a ½ inch wide strip of 6 mil thickness to a rectangular cut-out of a Tyvek® polyethylene envelope measuring approximately 8 inches wide by 5 inches long. The adhesive was applied along the length about 2 inches from one edge. The adhesive was dried using a hot air gun and subsequently activated using the activator means of Examples 3-11 resulting in two beads of activated adhesive. Once activated the rectangular cut out was then folded upon itself, lengthwise, forming essentially a 4 inch by 5 inch rectangle. Finger pressure was then applied along the bond line for a few seconds to ensure good contact between the mated surfaces. The adhesive was allowed to cure and a bond was found to have formed.

While the present invention has been described with respect to aforementioned specific embodiments and examples, it should be appreciated that other embodiments utilizing the concept of the present invention are possible without departing from the scope of the invention. The present invention is defined by the claimed elements and any and all modifications, variations, or equivalents that fall within the spirit and scope of the underlying principles embraced or embodied thereby.

We claim:

1. Stock packaging materials having a substantially dry-to-the-touch, curable, pre-applied adhesive composition on at least one bonding surface thereof wherein said pre-applied adhesive composition comprises an encapsulated liquid curable material and a separately encapsulated curative complex, said curative complex being encased in a polymer capsule and comprising an in-situ formed carrier material and an effective amount of a curative or combination of curatives contained in the carrier material and capable of effecting, directly or indirectly, the cure of the aforementioned liquid curable material, said carrier material being a natural or synthetic material or composition that is substantially non-flowing in the absence of external forces, elevated temperatures or both impacting upon said curative complex wherein the in-situ formed carrier material is formed by the action of a curative with or on a precursor composition for said carrier material and either (i) the curative for the in-situ formed carrier material is different from and in addition to the curative contained in said carrier material or (ii) the curative for the in-situ polymerized carrier material is the same as the curative contained in the carrier and the amount of the curative prior to in-situ polymerization of the carrier material is at least 1.6 weight % based on the weight of the carrier material and the amount of curative remaining after polymerization of the carrier material is effective for effecting cure of the liquid curable material.

2. The stock packaging materials of claim 1 wherein the stock packaging material is in the form of sheets or bulk rolls from which packaging blanks will be cut.

3. The stock packaging materials of claim 2 wherein the pre-applied adhesive is applied in a repetitive pattern to said sheets or bulk rolls wherein the surface area to which the pre-applied adhesive has been applied corresponds to a seam, flap, tab, flange or closure member of the finished package.

4. The stock packaging materials of claim 1 wherein the stock packaging material is in the form of packaging blanks or semi-finished packaging wherein the pre-applied adhesive is applied to one or more flaps, seams, tabs or closure members.

5. The stock packaging materials of claim 1 wherein the stock packaging material is to be used in the production of a container selected from the group consisting of cartons, boxes, cases, trays, envelopes, bags, mailers, tubes, cores and cups.

6. The stock packaging materials of claim 5 wherein the tubes and cores are wound from one or more strips of the stock packaging material having the pre-applied adhesive along one or both edges of the strips.

7. The stock packaging materials of claim 1 comprising a synthetic material.

8. The stock packaging materials of claim 7 wherein the synthetic material is selected from the group consisting of polyesters, polypropylenes, polyethylenes, low density polyethylenes, high density polyethylenes, linear low density polyethylenes, styrene, and polyamides.

9. The stock packaging materials of claim 8 wherein the synthetic material is in the form of non-woven fabrics or sheets of synthetic fibers.

10. The stock packaging materials of claim 1 comprising a cellulosic material.

11. The stock packaging materials of claim 10 wherein the cellulosic material is selected from the group consisting of paper, paperboard, corrugated paperboard, chipboard, boxboard, cardboard, paperboard laminates, multiply paperboard, and chemically modified cellulosics.

12. The stock packaging materials of claim 11 wherein the cellulosic material is paperboard.

13. The stock packaging materials of claim 11 wherein the cellulosic material is a paperboard laminate having one or more layers of paperboard and one or more layers of a synthetic polymer film or sheet or a metal foil or both.

14. The stock packaging materials of claim 10 comprising rayon or cellulose acetate fibers.

15. The stock packaging materials of claim 1 further comprising a synthetic film or sheet or a metal foil or both.

16. The stock packaging materials of claim 1 further comprising a coating.

17. The stock packaging materials of claim 1 wherein the coating is selected from the group consisting of thermoplastic coatings, thermoset coatings, clays, and varnishes.

18. The stock packaging materials of claim 16 wherein the coating is a thermoplastic coating selected from the group consisting of polyethylene, polypropylene, Mylar, polyvinylidene chloride, ethylene vinyl acetate, and waxes.

19. The stock packaging materials of claim 1 wherein the carrier material is (a) of a soft, putty-like or gel-like character or (b) a solid or semi-solid that is (i) soluble in the liquid curable material, (ii) softened by the liquid curable material, (iii) softened by the reaction conditions for effecting cure of the liquid curable material, (iv) softened by the environmental conditions under which liquid curable material is to be cured, (v) is softened by the method or process by which the curative is to be made available to other components of the curable composition, (vi) rendered flowable by the liquid curable material, (vii) rendered flowable by the reaction conditions for effecting cure of the liquid curable material, (viii) rendered flowable by the environmental conditions under which the liquid curable material is cured, (ix) is rendered flowable by the method or process by which the curative is to be made available to other components of the curable composition with which they are to be used.

20. The stock packaging materials of claim 1 wherein the carrier material is of a soft putty-like or gel-like character and comprises a thixotropic or thickened composition of monomers, oligomers or pre-polymers, or a combination thereof, which composition is substantially non-reactive with the curative in the encapsulated state.

21. The stock packaging materials of claim 1 wherein the carrier material includes or comprises one or more thixotropic agents or one or more thixotropic or non-thixotropic gelling or thickening agents that are generated in-situ or act latently concurrent with or following encapsulation of the carrier material.

22. The stock packaging materials of claim 1 wherein the carrier material is selected from the group consisting of hot melts, pressure sensitive adhesives, rubber materials, elastomer/tackifier compositions, a polymer whose Tg is less than 35° C., semi-solid and solid resins, starches and starch-based polymers, hydrogels, low temperature waxes and a thickened or gel-like mass of one or more monomers, oligomers, prepolymers or combinations thereof.

23. The stock packaging materials of claim 1 wherein the carrier material is an adhesive or has latent adhesive properties.

24. The stock packaging materials of claim 1 wherein the carrier material does not flow or deform except when subjected to forces of at least 1 psi.

25. The stock packaging materials of claim 1 wherein the carrier material is formed concurrent with the encapsulation of the curative complex.

26. The stock packaging materials of claim 1 wherein liquid curable material comprises one or more liquid curable monomers, oligomers or prepolymers or combinations thereof.

27. The stock packaging material of claim 1 wherein the liquid curable material is selected from the group consisting of monomers, oligomers and/or prepolymers that undergo vinyl polymerization; unsaturated polyesters; urethanes; epoxy resins; polysulfides; isocyanates; silicones; polyethers, polyurethanes and polyolefins having silanol moieties capable of undergoing silanol condensation or hydrosilation reactions; and phenoxy resins.

28. The stock packaging material of claim 1 wherein both the encapsulated liquid polymerizable material and the encapsulated curative complex are discrete microcapsules held to the surface of the stock packaging material by a binder material.

29. The stock packaging material of claim 28 wherein the binder material is an adhesive or a coating material.

30. The stock packaging material of claim 28 wherein the binder material is an actinic radiation cured composition.

31. The stock packaging material of claim 28 wherein the binder material is an aqueous emulsion.

32. The stock packaging materials of claim 1 wherein the carrier material is formed subsequent to the encapsulation of the curative complex.

\* \* \* \* \*